United States Patent
Osako

(10) Patent No.: US 8,705,869 B2
(45) Date of Patent: Apr. 22, 2014

(54) COMPUTER-READABLE STORAGE MEDIUM, IMAGE RECOGNITION APPARATUS, IMAGE RECOGNITION SYSTEM, AND IMAGE RECOGNITION METHOD

(75) Inventor: Satoru Osako, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 280 days.

(21) Appl. No.: 13/196,299

(22) Filed: Aug. 2, 2011

(65) Prior Publication Data

US 2012/0219226 A1    Aug. 30, 2012

(30) Foreign Application Priority Data

Feb. 24, 2011 (JP) .................. 2011-039031

(51) Int. Cl.
*G06K 9/46* (2006.01)
*G06K 9/68* (2006.01)

(52) U.S. Cl.
USPC ............ 382/199; 382/201; 382/217; 382/287

(58) Field of Classification Search
None
See application file for complete search history.

(56) References Cited

U.S. PATENT DOCUMENTS

| | | | |
|---|---|---|---|
| 4,783,829 A * | 11/1988 | Miyakawa et al. ........... | 382/199 |
| 5,420,971 A | 5/1995 | Westerink et al. | |
| 5,572,603 A | 11/1996 | Koike | |
| 5,870,501 A | 2/1999 | Kim | |
| 6,005,976 A | 12/1999 | Naoi et al. | |
| 6,094,508 A | 7/2000 | Acharya et al. | |
| 6,366,358 B1 | 4/2002 | Satou et al. | |
| 7,274,380 B2 | 9/2007 | Navab et al. | |
| 7,519,218 B2 | 4/2009 | Takemoto et al. | |
| 7,676,079 B2 | 3/2010 | Uchiyama et al. | |
| 7,812,871 B2 | 10/2010 | Takemoto et al. | |
| 7,881,560 B2 | 2/2011 | John | |

(Continued)

FOREIGN PATENT DOCUMENTS

| | | |
|---|---|---|
| JP | 61-201385 | 9/1986 |
| JP | 3-99377 | 4/1991 |

(Continued)

OTHER PUBLICATIONS

Hirokazu Kato, Mark Billinghurst, Koichi Asano, and Keihachiro Tachibana, "An Augmented Reality System and its Calibration based on Marker Tracking", Journal of the Virtual Reality Society of Japan, vol. 4, No. 4, 1999, partial English translation, 13 pages.

(Continued)

*Primary Examiner* — Jon Chang
(74) *Attorney, Agent, or Firm* — Nixon & Vanderhye, P.C.

(57) ABSTRACT

First, it is determined whether or not a contour or vertices have been detected from a certain image. Then, when it is determined that a contour or vertices have been detected from the certain image, a pattern matching process is performed on, in the image, an area surrounded by the contour or the vertices detected from the image. Then, when it is determined that a predetermined object or a predetermined design is displayed in the area, detection position information indicating a position related to the area is stored in a storage area. On the other hand, when it is determined that a contour or vertices have not been detected from the certain image, a pattern matching process is performed on the image on the basis of the detection position information stored in the storage area.

20 Claims, 43 Drawing Sheets

(56) References Cited

U.S. PATENT DOCUMENTS

| | | |
|---|---|---|
| 8,073,201 B2 | 12/2011 | Satoh et al. |
| 2002/0051570 A1* | 5/2002 | Inagaki .................. 382/181 |
| 2002/0106051 A1 | 8/2002 | Menhardt |
| 2004/0234124 A1 | 11/2004 | Nakai et al. |
| 2005/0036673 A1 | 2/2005 | Ohba et al. |
| 2005/0041871 A1 | 2/2005 | Abe |
| 2005/0094900 A1 | 5/2005 | Abe |
| 2005/0248580 A1 | 11/2005 | Osako |
| 2006/0264746 A1 | 11/2006 | Frisa et al. |
| 2007/0040800 A1 | 2/2007 | Forlines et al. |
| 2007/0139321 A1 | 6/2007 | Takemoto et al. |
| 2007/0146325 A1 | 6/2007 | Poston et al. |
| 2007/0206875 A1* | 9/2007 | Ida et al. .................. 382/242 |
| 2009/0079740 A1 | 3/2009 | Fitzmaurice et al. |
| 2009/0085911 A1 | 4/2009 | Fitzmaurice et al. |
| 2009/0110241 A1 | 4/2009 | Takemoto et al. |
| 2010/0048290 A1 | 2/2010 | Baseley et al. |
| 2010/0188344 A1 | 7/2010 | Shirakawa et al. |
| 2011/0081048 A1 | 4/2011 | Woo et al. |
| 2011/0090252 A1 | 4/2011 | Yoon et al. |
| 2011/0157179 A1 | 6/2011 | Fahn et al. |
| 2011/0305368 A1 | 12/2011 | Osako |

FOREIGN PATENT DOCUMENTS

| | | |
|---|---|---|
| JP | 5-324830 | 12/1993 |
| JP | 09-079847 | 3/1997 |
| JP | 10-116344 | 5/1998 |
| JP | 2962556 | 8/1999 |
| JP | 2001-319239 | 11/2001 |
| JP | 2003-281504 | 10/2003 |
| JP | 2004-206672 | 7/2004 |
| JP | 2005-242600 | 9/2005 |
| JP | 2009-20614 | 1/2009 |
| JP | 2010-267113 | 11/2010 |

OTHER PUBLICATIONS

Mar. 27, 2013 Office Action in U.S. Appl. No. 13/196,372, 10 pages.

Feiner et al., "Windows on the World: 2D Windows for 3D Augmented Reality", Proceedings of the 6$^{th}$ Annual ACM Symposium on User Interface Software and Technology, UIST'93, Jan. 1, 1993, pp. 145-155, 11 pages.

Park et al., "Jitter Suppression in Model-based Camera Tracking", Virtual Systems and Multimedia (VSMM), 2010 16$^{th}$ International Conference on, IEEE, Oct. 20, 2010, pp. 204-211, 8 pages.

Ohshima et al., "AR$^2$Hockey: A Case Study of Collaborative Augmented Reality", Virtual Reality Annual International Symposium, 1998, Proceedings, IEEE, Mar. 14-18, 1998, IEEE Computer Society, Mar. 14, 1998, pp. 268-275, 8 pages.

Salti et al., "SVR-Based Jitter Reduction for Markerless Augmented Reality", Image Analysis and Proceeding A ICIAP, 2009, Sep. 8, 2009, pp. 24-33, 10 pages.

Gordon et al., "What and Where: 3D Object Recognition with Accurate Pose", Jan. 1, 2007, Toward Category—Level Object Recognition Lecture Notes in Computer Science; LNCS, pp. 67-82, 16 pages.

U.S. Appl. No. 13/194,559.
U.S. Appl. No. 13/193,876.
U.S. Appl. No. 13/193,895.
U.S. Appl. No. 13/196,372.
U.S. Appl. No. 13/198,140.

Jun. 8, 2012 Japanese Office Action for JP2011-039030, 2 pages.
Office Action dated Jun. 24, 2013, for U.S. Appl. No. 13/193,895, 31 pages.
Office Action dated Aug. 9, 2013, for U.S. Appl. No. 13/193,876, 20 pages.

Wu et al., "Research of quickly identifying markers on augmented reality", IEEE ICAMS 2010, vol. 3, pp. 671-675, Jul. 2010, 5 pages.

May 20, 2013 Office Action in U.S. Appl. No. 13/198,140, 17 pages.
Apr. 26, 2013 Office Action in U.S. Appl. No. 13/194,559, 13 pages.
Mar. 26, 2013 Japanese Office Action (4 pages) for JP 2012-11774, with English translation (5 pages).

Kato, "ARToolKit Library for Vision-based Augmented Reality", The Institute of Electronics, Information and Communication Engineers, Technical Report of IEICE issued on Feb. 14, 2002, vol. 101, No. 652, pp. 79-86, PRMU 2001-232, 9 pages.

* cited by examiner

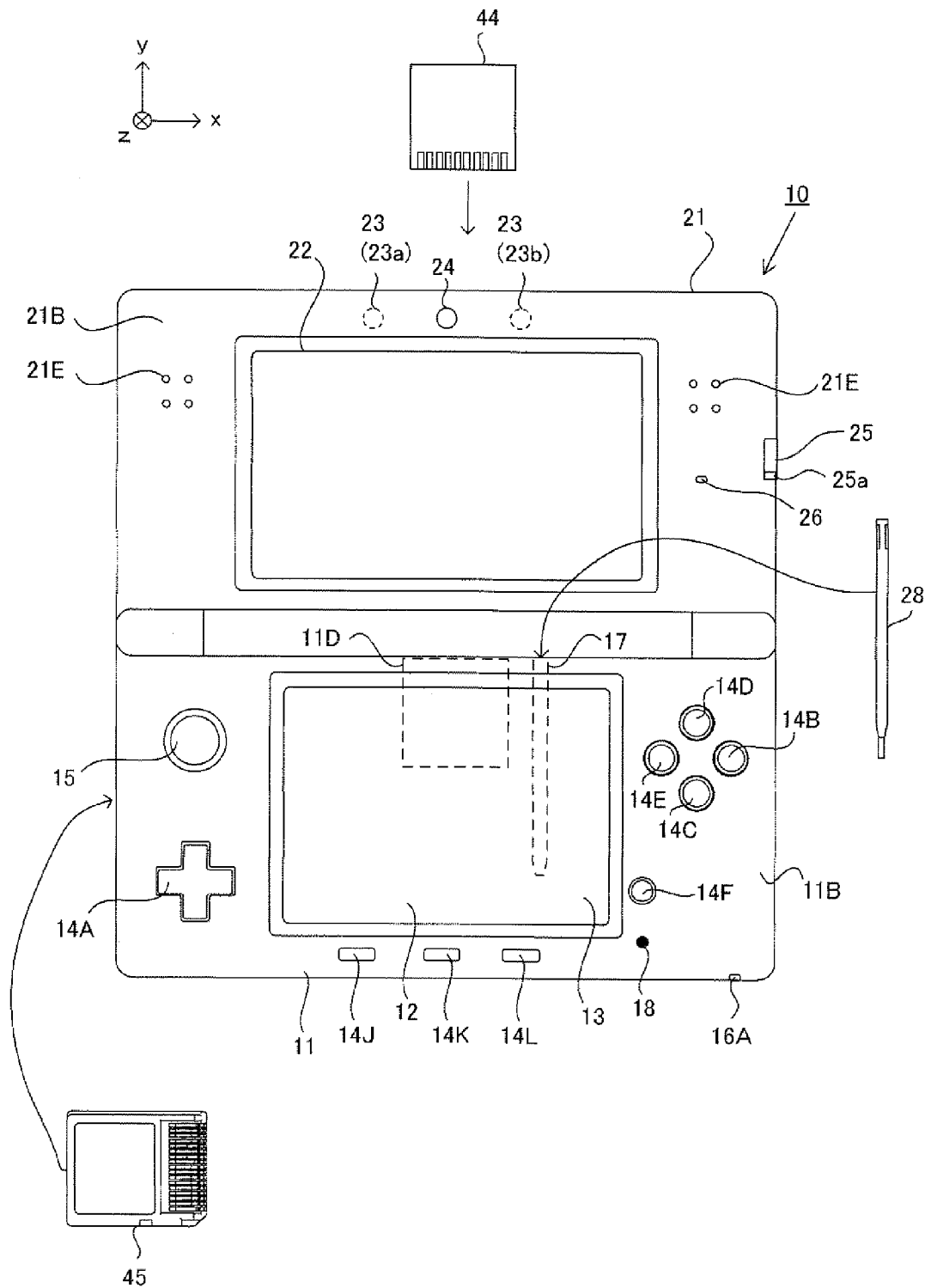

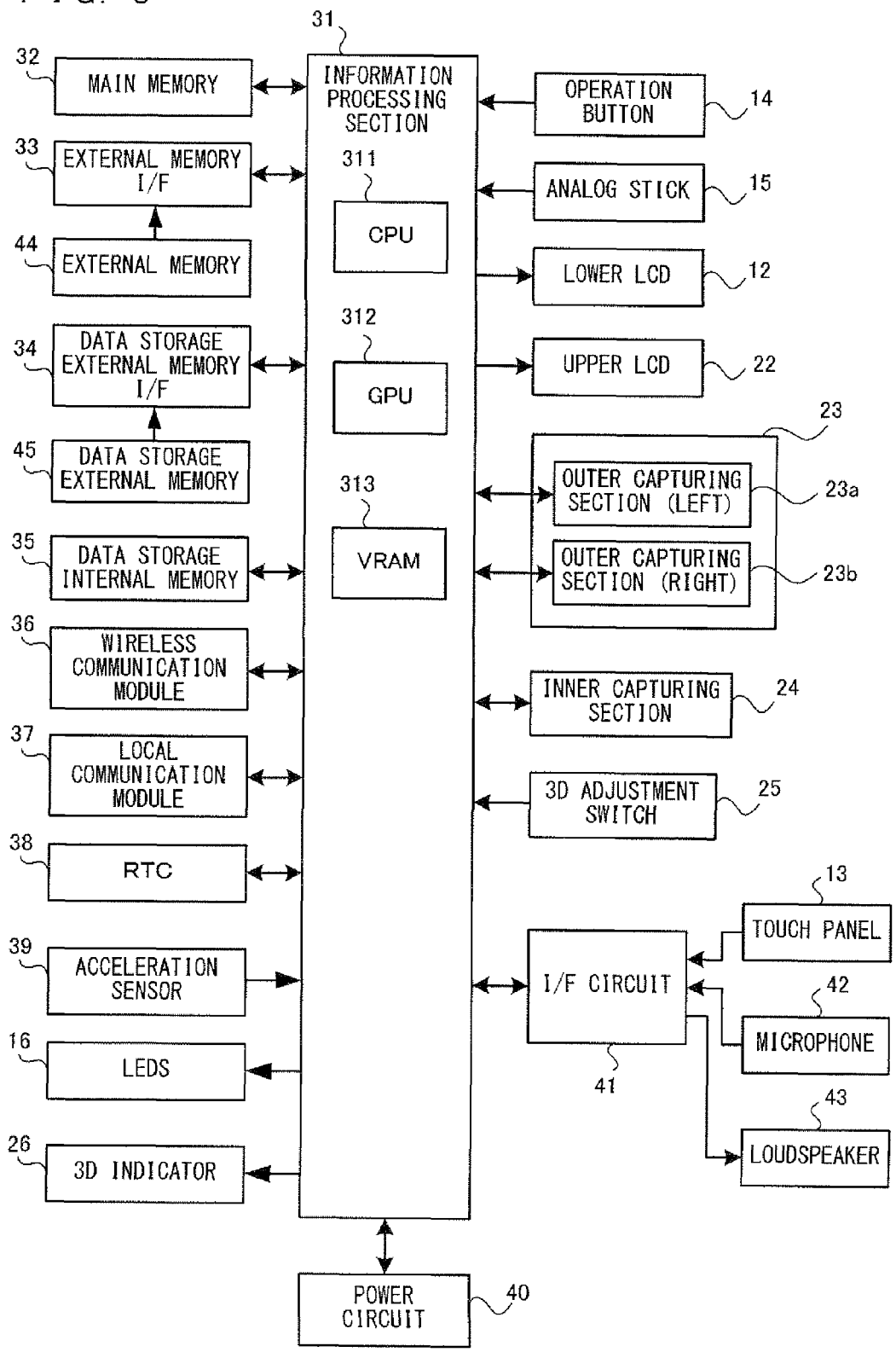

F I G. 1 8
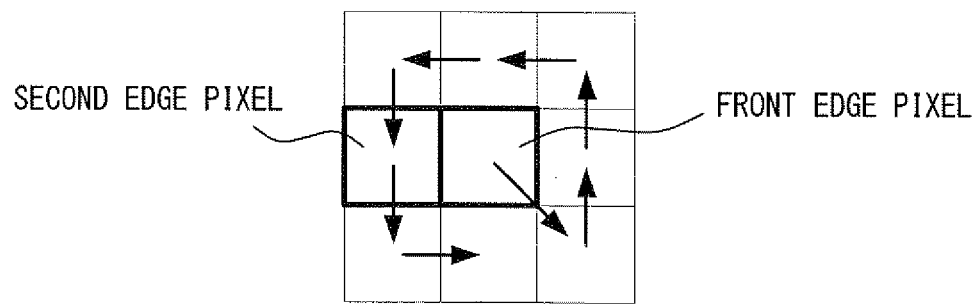
F I G. 1 9
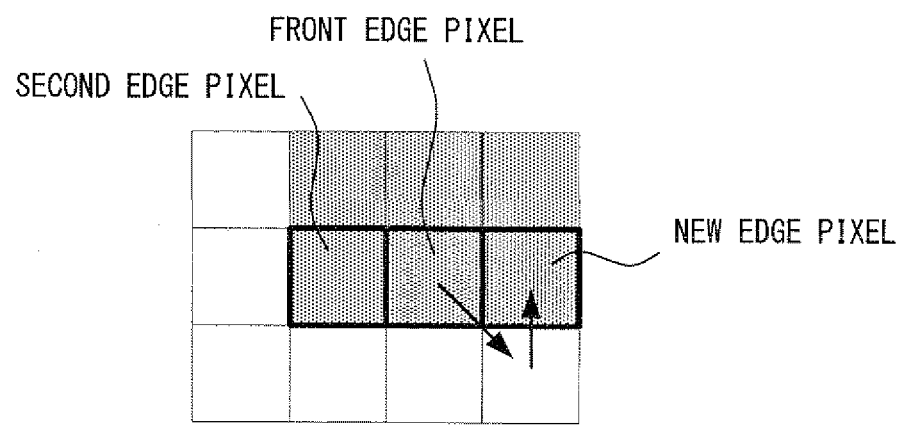

PROVISIONAL STRAIGHT LINE

F I G. 3 0
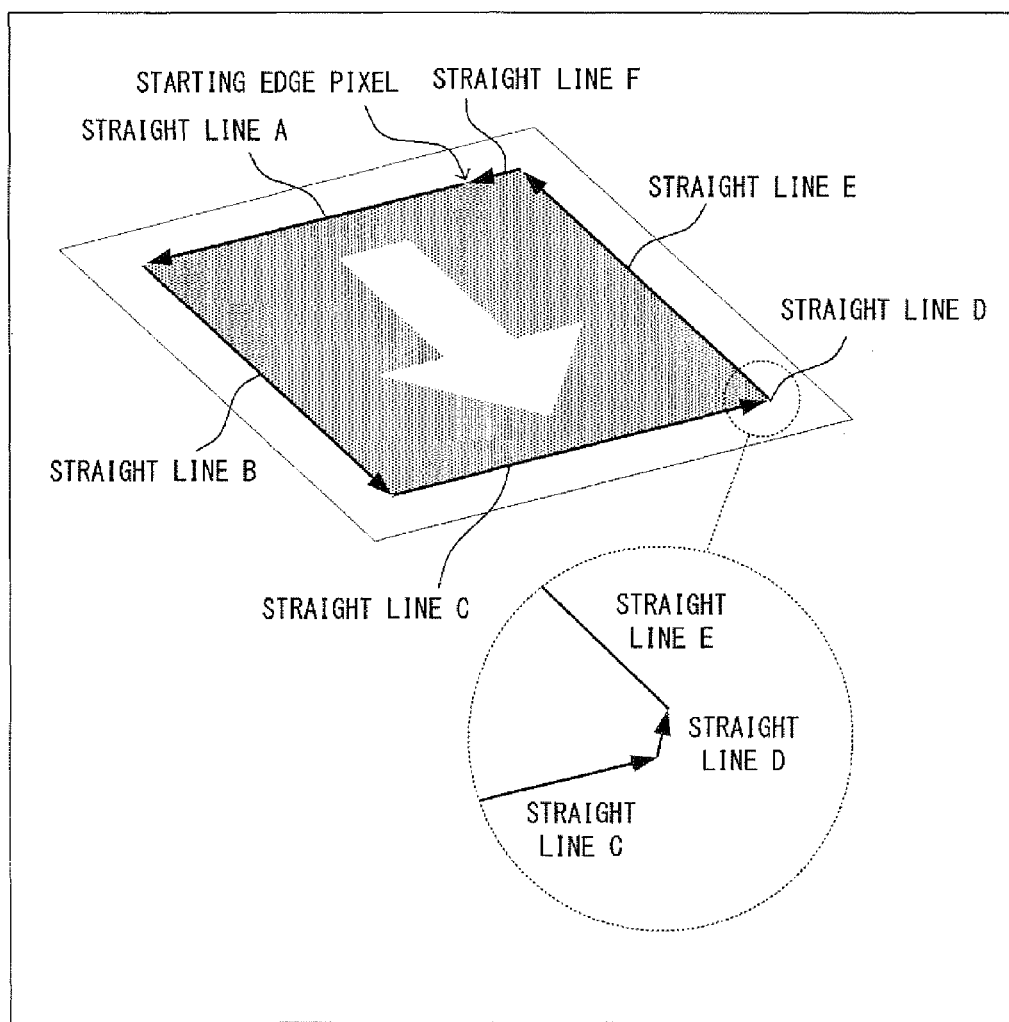

| SAMPLE POINT | PIXEL VALUE |
|---|---|
| S(1, 1) | BLACK |
| S(1, 2) | BLACK |
| S(1, 3) | BLACK |
| ⋮ | ⋮ |
| S(8, 2) | BLACK |
| S(8, 3) | WHITE |
| ⋮ | ⋮ |
| S(8, 13) | WHITE |
| ⋮ | ⋮ |
| S(15, 14) | BLACK |
| S(15, 15) | BLACK |

| AMOUNT OF MOVEMENT OF MARKER $(a^2+b^2+c^2+d^2)$ | VALUE OF CORRECTED Vc |
|---|---|
| 0 OR GREATER BUT LESS THAN D1 | Vp |
| D1 OR GREATER BUT LESS THAN D2 (D1<D2) | $Vp \times A + Vc \times (1-A)$ $(0<A<1)$ |
| D2 OR GREATER | Vc |

| SIZE OF MARKER IN CAPTURED REAL IMAGE | D1 |
|---|---|
| LARGE | LARGE |
| SMALL | SMALL |

| SIZE OF MARKER IN CAPTURED REAL IMAGE | D2 |
|---|---|
| LARGE | LARGE |
| SMALL | SMALL |

| AMOUNT OF MOVEMENT OF MARKER | VALUE OF CORRECTED Vc |
|---|---|
| 0 OR GREATER BUT LESS THAN D3 | Vp |
| D3 OR GREATER | Vc |

| AMOUNT OF MOVEMENT OF MARKER | VALUE OF CORRECTED Vc |
|---|---|
| 0 OR GREATER BUT LESS THAN D4 | $Vp \times A + Vc \times (1-A)$ $(0 < A < 1)$ |
| D4 OR GREATER | Vc |

COMPUTER-READABLE STORAGE MEDIUM, IMAGE RECOGNITION APPARATUS, IMAGE RECOGNITION SYSTEM, AND IMAGE RECOGNITION METHOD

CROSS REFERENCE TO RELATED APPLICATION

The disclosure of Japanese Patent Application No. 2011-039031, filed on Feb. 24, 2011, is incorporated herein by reference.

BACKGROUND OF THE INVENTION

1. Field of the Invention

The present invention relates to a computer-readable storage medium, an image recognition apparatus, an image recognition system, and an image recognition method, for detecting a predetermined capturing target from an image captured by capturing means.

2. Description of the Background Art

Conventionally, there is a technique of detecting a predetermined capturing target from an image captured by capturing means such as a camera (a captured image). For example, Non-Patent Literature 1 states that in augmented reality technology, an image recognition process is performed on a marker included in an image captured by a camera. Non-Patent Literature 1 states that connected regions are extracted by binarizing the captured image using a fixed threshold, and regions of appropriate sizes and shapes are selected, from among the extracted connected regions, to be marker candidates. Then, the marker is detected by performing pattern matching on the marker candidates.

[Non-Patent Literature 1] Hirokazu Kato, Mark Billinghurst, Koichi Asano, Keihachiro Tachibana, "An Augmented Reality System and its Calibration based on Marker Tracking", Journal of the Virtual Reality Society of Japan, vol. 4, no. 4, 1999

The detection method of a marker described in Non-Patent Literature 1 cannot necessarily detect a marker with high accuracy or a small processing load in various states (e.g., a bright state; a dark state; the state where part of the marker is hidden by, for example, a user's finger; the state where the marker does not face the camera in a full-face manner; and the state where a strong light is reflected by the marker).

In addition, the detection method of a marker described in Non-Patent Literature 1 cannot prevent a slight deviation of the position of the detected position of the marker.

SUMMARY OF THE INVENTION

Therefore, it is an object of the present invention to provide a computer-readable storage medium, an image recognition apparatus, an image recognition system, and an image recognition method that are capable of detecting a predetermined object or design from an image with high accuracy or a small processing load, and to provide a computer-readable storage medium, an image recognition apparatus, an image recognition system, and an image recognition method that are capable of preventing or reducing a slight deviation of the position of a predetermined object or design that has been detected.

To achieve the above object, the present invention may employ the following configurations.

A first configuration example is a computer-readable storage medium having stored thereon an image recognition program causing a computer of an information processing apparatus to function as image acquisition means, detection means, first determination means, second determination means, storage control means, and third determination means.

The image acquisition means sequentially acquires images. The detection means sequentially detects a contour or vertices from the images. The first determination means determines whether or not a contour or vertices have been detected from a certain image by the detection means. The second determination means, when the first determination means has determined that a contour or vertices have been detected from the certain image, performs the pattern matching process on, in the certain image, an area surrounded by the contour or the vertices detected from the certain image, to determine whether or not a predetermined object or a predetermined design is displayed in the area. The storage control means, when the second determination means has determined that the predetermined object or the predetermined design is displayed in the area, stores, in an storage area, detection position information indicating a position related to the area. The third determination means, when the first determination means has determined that a contour or vertices have not been detected from the certain image, performs the pattern matching process on the certain image on the basis of the detection position information stored in the storage area, to determine whether or not, in the certain image, the predetermined object or the predetermined design is displayed in an area corresponding to the detection position information.

Based on the first configuration example, even when a contour or vertices cannot be detected from an image, it is likely to detect a predetermined object or a predetermined design.

It should be noted that as a variation, when the first determination means has determined that a contour or vertices have not been detected from the certain image, the third determination means may perform a pattern matching process on the certain image on the basis of the detection position information stored in the storage area on the basis of an image acquired by the image acquisition means immediately before the certain image.

Based on the variation, it is likely to detect the predetermined object or the predetermined design with a low processing load.

In addition, as another variation, when the first determination means has determined that a contour or vertices have not been detected from the certain image, the third determination means may perform a pattern matching process on the certain image by, in addition to the detection position information stored in the storage area, shifting a position indicated by the detection position information.

Based on the variation, it is more likely to detect the predetermined object or the predetermined design.

In addition, as another variation, the image recognition program may further cause the computer to function as: virtual camera setting means for, on the basis of the detection position information stored in the storage area, setting a virtual camera placed in a virtual space; and display control means for displaying on a display device a virtual space image obtained by capturing the virtual space with the virtual camera.

It should be noted that the image recognition program can be stored in a given computer-readable storage medium (e.g., a flexible disk, a hard disk, an optical disk, a magnetic optical disk, a CD-ROM, a CD-R, a magnetic tape, a semiconductor memory card, a ROM, and a RAM).

A second configuration example is an image recognition apparatus including: image acquisition means for sequentially acquiring images; detection means for sequentially detecting a contour or vertices from the images; first determination means for determining whether or not a contour or vertices have been detected from a certain image by the detection means; second determination means for, when the first determination means has determined that a contour or vertices have been detected from the certain image, performing a pattern matching process on, in the certain image, an area surrounded by the contour or the vertices detected from the certain image, to determine whether or not a predetermined object or a predetermined design is displayed in the area; storage control means for, when the second determination means has determined that the predetermined object or the predetermined design is displayed in the area, storing, in an storage area, detection position information indicating a position related to the area; and third determination means for, when the first determination means has determined that a contour or vertices have not been detected from the certain image, performing a pattern matching process on the certain image on the basis of the detection position information stored in the storage area, to determine whether or not, in the certain image, the predetermined object or the predetermined design is displayed in an area corresponding to the detection position information.

A third configuration example is an image recognition method including: an image acquisition step of sequentially acquiring images; a detection step of sequentially detecting a contour or vertices from the images; a first determination step of determining whether or not a contour or vertices have been detected from a certain image in the detection step; a second determination step of, when it is determined in the first determination step that a contour or vertices have been detected from the certain image, performing a pattern matching process on, in the certain image, an area surrounded by the contour or the vertices detected from the certain image, to determine whether or not a predetermined object or a predetermined design is displayed in the area; a storage control step of, when it is determined in the second determination step that the predetermined object or the predetermined design is displayed in the area, storing, in an storage area, detection position information indicating a position related to the area; and a third determination step of, when it is determined in the first determination step that a contour or vertices have not been detected from the certain image, performing a pattern matching process on the certain image on the basis of the detection position information stored in the storage area, to determine whether or not, in the certain image, the predetermined object or the predetermined design is displayed in an area corresponding to the detection position information.

A fourth configuration example is an image recognition system including: image acquisition means for sequentially acquiring images; detection means for sequentially detecting a contour or vertices from the images; first determination means for determining whether or not a contour or vertices have been detected from a certain image by the detection means; second determination means for, when the first determination means has determined that a contour or vertices have been detected from the certain image, performing a pattern matching process on, in the certain image, an area surrounded by the contour or the vertices detected from the certain image, to determine whether or not a predetermined object or a predetermined design is displayed in the area; storage control means for, when the second determination means has determined that the predetermined object or the predetermined design is displayed in the area, storing, in an storage area, detection position information indicating a position related to the area; and third determination means for, when the first determination means has determined that a contour or vertices have not been detected from the certain image, performing a pattern matching process on the certain image on the basis of the detection position information stored in the storage area, to determine whether or not, in the certain image, the predetermined object or the predetermined design is displayed in an area corresponding to the detection position information.

A fifth configuration example is an image recognition system including an image recognition apparatus and a marker in which a design is drawn. The image recognition apparatus includes: a capturing section for capturing the marker; image acquisition means for sequentially acquiring images from the capturing section; detection means for sequentially detecting a contour or vertices of the marker or of the design from the images; first determination means for determining whether or not the contour or the vertices have been detected from a certain image by the detection means; second determination means for, when the first determination means has determined that the contour or the vertices have been detected from the certain image, performing a pattern matching process on, in the certain image, an area surrounded by the contour or the vertices, to determine whether or not the marker or the design is displayed in the area; storage control means for, when the second determination means has determined that the marker or the design is displayed in the area, storing, in an storage area, detection position information indicating a position related to the area; and third determination means for, when the first determination means has determined that the contour or the vertices have not been detected from the certain image, performing a pattern matching process on the certain image on the basis of the detection position information stored in the storage area, to determine whether or not, in the certain image, the marker or the design is displayed in an area corresponding to the detection position information.

Based on the above configuration examples, it is possible to detect a predetermined object or design from an image with high accuracy.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a front view of a game apparatus 10 in an open state;

FIG. 3 is a block diagram showing the internal configuration of the game apparatus 10;

FIG. 18 is a diagram illustrating the edge tracking process;

FIG. 19 is a diagram illustrating the edge tracking process;

FIG. 30 is a diagram illustrating the straight line calculation process;

Figure 2A:
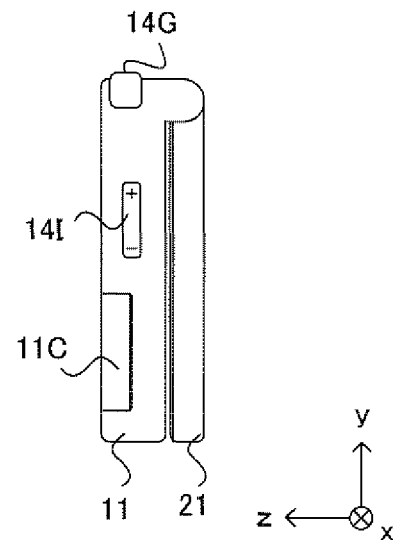
FIG. 2A is a left side view of the game apparatus 10 in a closed state.

DESCRIPTION OF THE PREFERRED EMBODIMENTS (Configuration of Game Apparatus)

A description is given below of a game apparatus according to an embodiment of the present invention. A game apparatus 10 is a hand-held game apparatus. As shown in FIG. 1 and FIGS. 2A through 2D, the game apparatus 10 includes a lower housing 11 and an upper housing 21. The lower housing 11 and the upper housing 21 are connected to each other so as to be openable and closable in a folding manner (foldable).

(Description of Lower Housing)

As shown in FIG. 1 and FIGS. 2A through 2D, the lower housing 11 includes a lower liquid crystal display (LCD) 12, a touch panel 13, operation buttons 14A through 14L, an analog stick 15, LEDs 16A and 16B, an insertion slot 17, and a microphone hole 18.

The touch panel 13 is mounted on the screen of the lower LCD 12. The insertion slot 17 (a dashed line shown in FIGS. 1 and 2D) is provided on the upper side surface of the lower housing 11 so as to accommodate a stylus 28.

The cross button 14A (direction input button 14A), the button 14B, the button 14C, the button 14D, the button 14E, the power button 14F, the select button 14F, the home button 14K, and the start button 14L are provided on the inner surface (main surface) of the lower housing 11.

The analog stick 15 is a device for indicating a direction.

The microphone hole 18 is provided on the inner surface of the lower housing 11. Underneath the microphone hole 18, a microphone 42 (see FIG. 3) is provided as the sound input device described later.

Figure 2B:
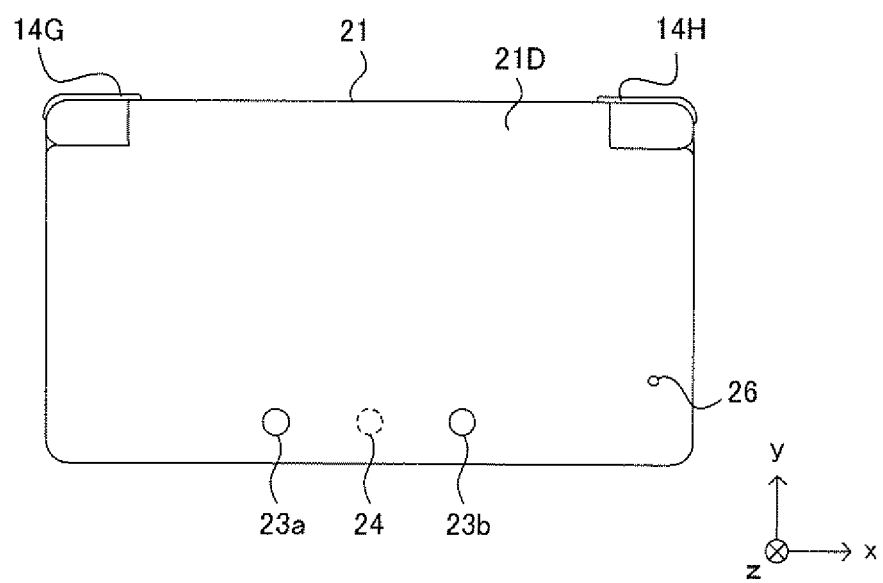
FIG. 2B is a front view of the game apparatus 10 in the closed state.
Figure 2C:
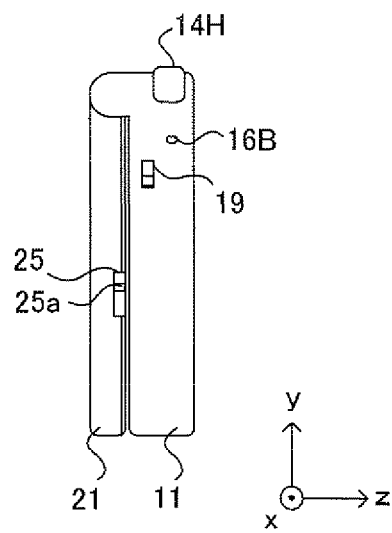
FIG. 2C is a right side view of the game apparatus 10 in the closed state.
Figure 2D:
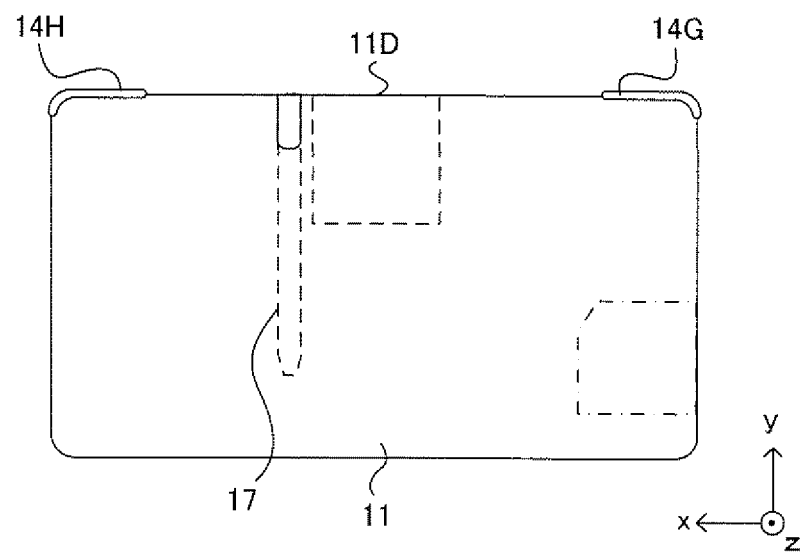
FIG. 2D is a rear view of the game apparatus 10 in the closed state.

As shown in FIGS. 2B and 2D, the L button 14G and the R button 14H are provided on the upper side surface of the lower housing 11. Further, as shown in FIG. 2A, the sound volume button 14I is provided on the left side surface of the lower housing 11 so as to adjust the sound volume of a loudspeaker 43 of the game apparatus 10.

As shown in FIG. 2A, a cover section 11C is provided on the left side surface of the lower housing 11 so as to be openable and closable. Inside the cover section 11C, a connector is provided for electrically connecting the game apparatus 10 and a data storage external memory 45.

As shown in FIG. 2D, on the upper side surface of the lower housing 11, an insertion slot 11D is provided, into which an external memory 44 is to be inserted.

As shown in FIGS. 1 and 2C, the first LED 16A is provided on the lower side surface of the lower housing 11 so as to notify a user of the on/off state of the power supply of the game apparatus 10. Further, the second LED 16B is provided on the right side surface of the lower housing 11 so as to notify the user of the establishment state of the wireless communication of the game apparatus 10. The game apparatus 10 is capable of wirelessly communicating with other devices, and a wireless switch 19 is provided on the right side surface of the lower housing 11 so as to enable/disable the function of the wireless communication (see FIG. 2C).

(Description of Upper Housing)

As shown in FIG. 1 and FIGS. 2A through 2D, the upper housing 21 includes an upper liquid crystal display (LCD) 22, an outer capturing section 23 (an outer capturing section (left) 23a and an outer capturing section (right) 23b), an inner capturing section 24, a 3D adjustment switch 25, and a 3D indicator 26.

The upper LCD 22 is a display device capable of displaying a stereoscopically visible image. Specifically, the upper LCD 22 is a parallax barrier type display device capable of displaying an image stereoscopically visible with the naked eye. The upper LCD 22 allows the user to view the left-eye image with their left eye, and the right-eye image with their right eye, using the parallax barrier. This makes it possible to display an image giving the user a stereoscopic effect (a stereoscopic image). Further, the upper LCD 22 is capable of disabling the parallax barrier. When disabling the parallax barrier, the upper LCD 22 is capable of displaying an image in a planar manner. Thus, the upper LCD 22 is a display device capable of switching between: a stereoscopic display mode for displaying a stereoscopic image; and a planar display mode for displaying an image in a planar manner (displaying a planar view image). The switching of the display modes is performed by, for example, the 3D adjustment switch 25 described later.

The "outer capturing section 23" is the collective term of the two capturing sections (23a and 23b) provided on an outer surface 21D of the upper housing 21. The outer capturing section (left) 23a and the outer capturing section (right) 23b can be used as a stereo camera, depending on the program executed by the game apparatus 10.

The inner capturing section 24 is provided on the inner surface 21B of the upper housing 21, and functions as a capturing section having a capturing direction that is the same as the inward normal direction of the inner surface.

The 3D adjustment switch 25 is a slide switch, and is used to switch the display modes of the upper LCD 22 as described above. The 3D adjustment switch 25 is also used to adjust the stereoscopic effect of a stereoscopically visible image (stereoscopic image) displayed on the upper LCD 22. A slider 25a of the 3D adjustment switch 25 is slidable to a given position in a predetermined direction (the up-down direction), and the display mode of the upper LCD 22 is set in accordance with the position of the slider 25a. Further, the view of the stereoscopic image is adjusted in accordance with the position of the slider 25a.

The 3D indicator 26 is an LED that indicates whether or not the upper LCD 22 is in the stereoscopic display mode.

In addition, speaker holes 21E are provided on the inner surface of the upper housing 21. A sound from the loudspeaker 43 described later is output through the speaker holes 21E.

(Internal Configuration of Game Apparatus 10)

Next, with reference to FIG. 3, a description is given of the internal configuration of the game apparatus 10. As shown in FIG. 3, the game apparatus 10 includes, as well as the components described above, electronic components, such as an information processing section 31, a main memory 32, an external memory interface (external memory I/F) 33, a data storage external memory I/F 34, a data storage internal memory 35, a wireless communication module 36, a local communication module 37, a real-time clock (RTC) 38, an acceleration sensor 39, a power circuit 40, and an interface circuit (I/F circuit) 41.

The information processing section 31 includes a central processing unit (CPU) 311 that executes a predetermined program, a graphics processing unit (GPU) 312 that performs image processing, and a video RAM (VRAM) 313. The CPU 311 executes a program stored in a memory (e.g., the external memory 44 connected to the external memory I/F 33, or the data storage internal memory 35) included in the game apparatus 10, and thereby performs processing corresponding to the program. It should be noted that the program executed by the CPU 311 may be acquired from another device by communication with said another device. The GPU 312 generates an image in accordance with an instruction from the CPU 311, and draws the image in the VRAM 313. The image drawn in the VRAM 313 is output to the upper LCD 22 and/or the lower LCD 12, and the image is displayed on the upper LCD 22 and/or the lower LCD 12.

The external memory I/F 33 is an interface for establishing a detachable connection with the external memory 44. The data storage external memory I/F 34 is an interface for establishing a detachable connection with the data storage external memory 45.

The main memory 32 is a volatile storage device used as a work area or a buffer area of (the CPU 311 of) the information processing section 31.

The external memory 44 is a nonvolatile storage device for storing the program and the like executed by the information processing section 31. The external memory 44 is composed of, for example, a read-only semiconductor memory.

The data storage external memory 45 is composed of a readable/writable non-volatile memory (e.g., a NAND flash memory), and is used to store given data.

The data storage internal memory 35 is composed of a readable/writable non-volatile memory (e.g., a NAND flash memory), and is used to store predetermined data. For example, the data storage internal memory 35 stores data and/or programs downloaded by wireless communication through the wireless communication module 36.

The wireless communication module 36 has the function of establishing connection with a wireless LAN by, for example, a method based on the IEEE 802.11.b/g standard. Further, the local communication module 37 has the function of wirelessly communicating with another game apparatus of the same type by a predetermined communication method (e.g., communication using an independent protocol, or infrared communication).

The acceleration sensor 39 detects the magnitudes of accelerations in the directions of straight lines along three axial (x, y, and z axes) directions (linear accelerations), respectively. The information processing section 31 can receive data representing the accelerations detected by the acceleration sensor 39 (acceleration data), and detect the orientation and the motion of the game apparatus 10.

The RTC 38 counts time, and outputs the counted time to the information processing section 31. The information processing section 31 calculates the current time (date) on the basis of the time counted by the RTC 38. The power circuit 40 controls the power from the power supply (a rechargeable battery) of the game apparatus 10, and supplies power to each component of the game apparatus 10.

The touch panel 13, the microphone 42, and the loudspeaker 43 are connected to the I/F circuit 41. The I/F circuit 41 includes: a sound control circuit that controls the microphone 42 and the loudspeaker 43 (amplifier); and a touch panel control circuit that controls the touch panel 13. For example, the sound control circuit performs A/D conversion and D/A conversion on a sound signal, and converts the sound signal to sound data in a predetermined format. The touch panel control circuit generates touch position data in a predetermined format on the basis of a signal from the touch panel 13, and outputs the touch position data to the information processing section 31. The information processing section 31 acquires the touch position data, and thereby recognizes the position at which an input has been provided on the touch panel 13.

An operation button 14 includes the operation buttons 14A through 14L described above, and operation data is output from the operation button 14 to the information processing section 31, the operation data indicating the states of inputs provided to the respective operation buttons 14A through 14I (indicating whether or not the operation buttons 14A through 14I have been pressed).

The lower LCD 12 and the upper LCD 22 are connected to the information processing section 31. Specifically, the information processing section 31 is connected to an LCD controller (not shown) of the upper LCD 22, and causes the LCD controller to set the parallax barrier to on/off. When the parallax barrier is on in the upper LCD 22, the right-eye image and the left-eye image that are stored in the VRAM 313 of the information processing section 31 are output to the upper LCD 22. More specifically, the LCD controller repeatedly alternates the reading of pixel data of the right-eye image for one line in the vertical direction, and the reading of pixel data of the left-eye image for one line in the vertical direction, and thereby reads the right-eye image and the left-eye image from the VRAM 313. Thus, the right-eye image and the left-eye image are each divided into strip images, each of which has one line of pixels arranged in the vertical direction, and an image including the divided left-eye strip images and the divided right-eye strip images alternately arranged is displayed on the screen of the upper LCD 22. The user views the images through the parallax barrier of the upper LCD 22, whereby the right-eye image is viewed with the user's right eye, and the left-eye image is viewed with the user's left eye. This causes the stereoscopically visible image to be displayed on the screen of the upper LCD 22.

The outer capturing section 23 and the inner capturing section 24 each capture an image in accordance with an instruction from the information processing section 31, and output data of the captured image to the information processing section 31.

The 3D adjustment switch 25 transmits to the information processing section 31 an electrical signal in accordance with the position of the slider.

The information processing section 31 controls whether or not the 3D indicator 26 is to be lit on. When, for example, the upper LCD 22 is in the stereoscopic display mode, the information processing section 31 lights on the 3D indicator 26.

(Overview of Image Processing)

Figure 4:
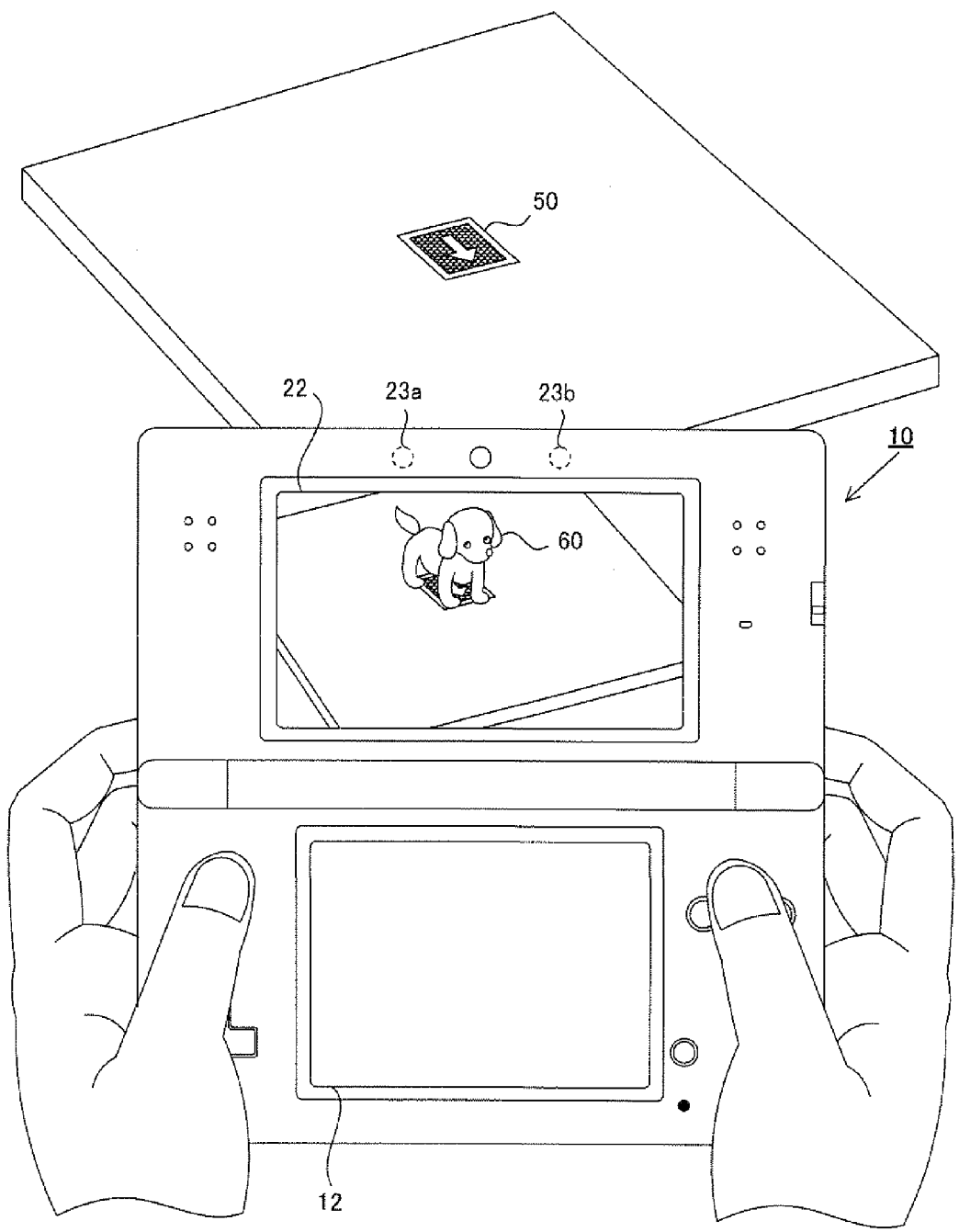
FIG. 4 is a diagram showing an image displayed on an upper LCD 22.
Figures 70, 71, 72:
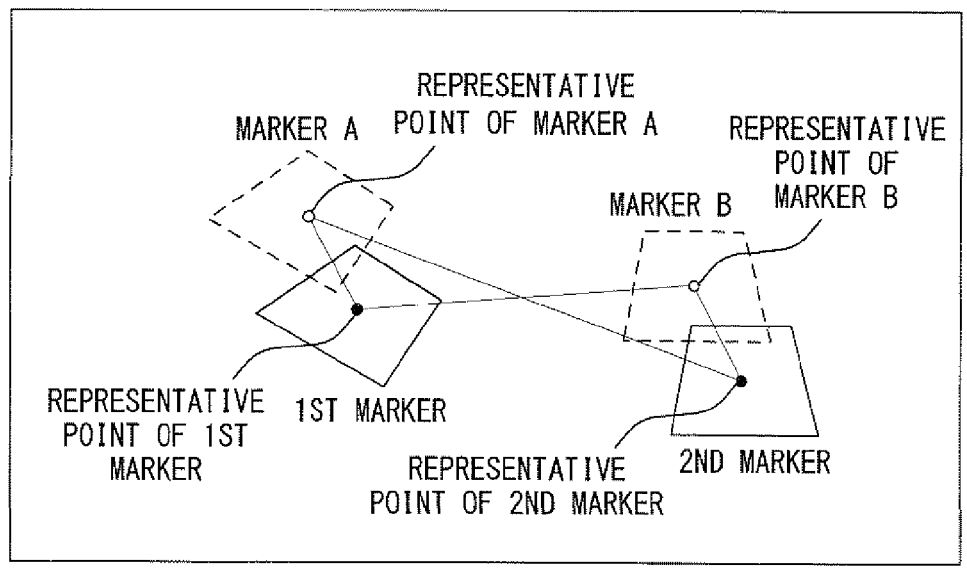
FIG. 70 is a diagram illustrating a variation of the marker position correction process.
FIG. 71 is a diagram illustrating another variation of the marker position correction process.
FIG. 72 is a diagram illustrating a determination method of the correspondence relationships between markers.

Next, with reference to FIGS. 4 through 72, a description is given of an overview of image processing performed by the game apparatus 10. The image processing performed by the game apparatus 10 includes an image recognition process and an image generation process.

The image recognition process is a process of detecting the position of a marker included in an image captured by a camera (the outer capturing section (left) 23a or the outer capturing section (right) 23b) (a captured real image). The image generation process is a process of generating an image to be displayed on the upper LCD 22, using the result of the image recognition process.

Using the result of the image recognition process, the CPU 311 of the game apparatus 10 can display on the upper LCD 22 an image as if a virtual object actually exists in the vicinity of the marker (e.g., on the marker) in the real world. For example, in the example of FIG. 4, an image is displayed on the upper LCD 22 of the game apparatus 10, as if a virtual object 60 representing a dog actually exists on a marker 50 placed on a table. Such an image is obtained by combining a captured real image captured by the camera with an image of the virtual object 60 (a virtual space image). The virtual space image is drawn on the basis of a virtual camera placed in a virtual space, and the positional relationship between (the relative positions and orientations of) the virtual object and the virtual camera in the virtual space is controlled in real time so as to coincide with the positional relationship between the camera (the outer capturing section (left) 23a or the outer capturing section (right) 23b) and the marker 50 in real space. Consequently, an image is obtained as if the virtual object 60 actually exists in real space.

Figure 5:
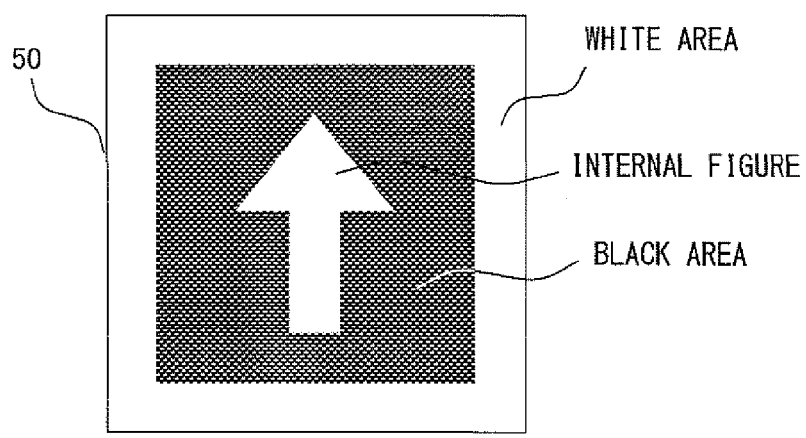
FIG. 5 is a diagram showing a marker 50.

As shown in FIG. 5, the marker 50 is rectangular, and has a white area along its periphery and a black area surrounded by the white area. Within the black area, a predetermined internal figure (here, an arrow as an example) is drawn. It should be noted that in the present embodiment, the marker 50 as shown in FIG. 5 is used; however, this is merely illustrative. Alternatively, a marker having another shape, another pattern, or another color may be used. For example, the white area may be provided within the black area provided along the periphery of the marker. Yet alternatively, areas of different colors may be provided instead of the white area and the black area. For a contour detection process described later, however, the combination of highly contrasting colors is preferably used.

Figure 6:
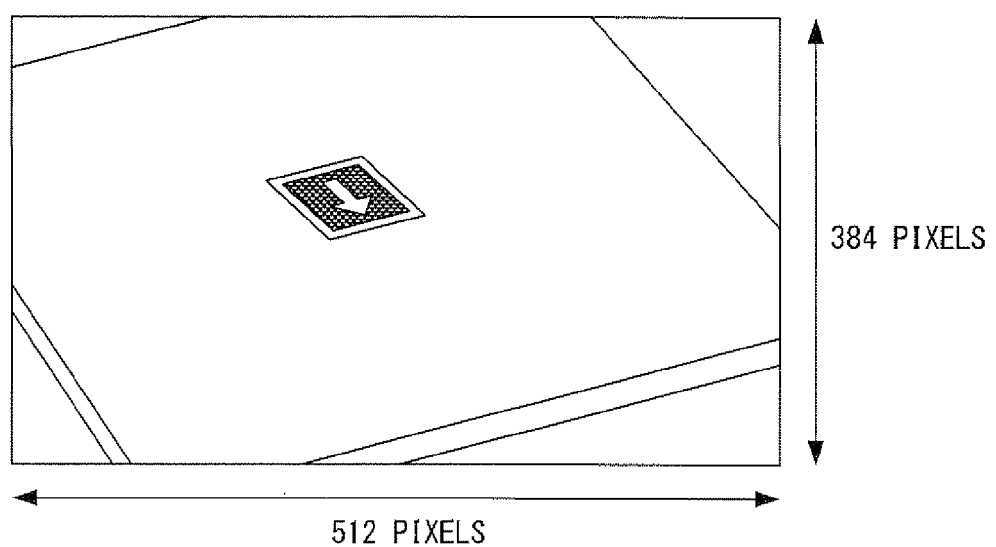
FIG. 6 is a diagram showing a captured real image captured by an outer capturing section (left) 23a or an outer capturing section (right) 23b.

FIG. 6 is an example of the image captured by the camera (the outer capturing section (left) 23a or the outer capturing section (right) 23b) (the captured real image). The captured real image includes, for example, 512 pixels (horizontal direction)×384 pixels (vertical direction).

To detect the position of the marker 50 from the captured real image as shown in FIG. 6, the following processes are performed in the present embodiment.

(1) Contour detection process
(2) Vertex detection process
(3) Rough distinction process
(4) Design distinction process
(5) Marker position correction process
(Contour Detection Process)

First, the contour detection process is described. The contour detection process is a process of detecting in the captured real image the contour of a design drawn in the marker 50 (the boundary between the white area and the black area shown in FIG. 5).

Figure 7:
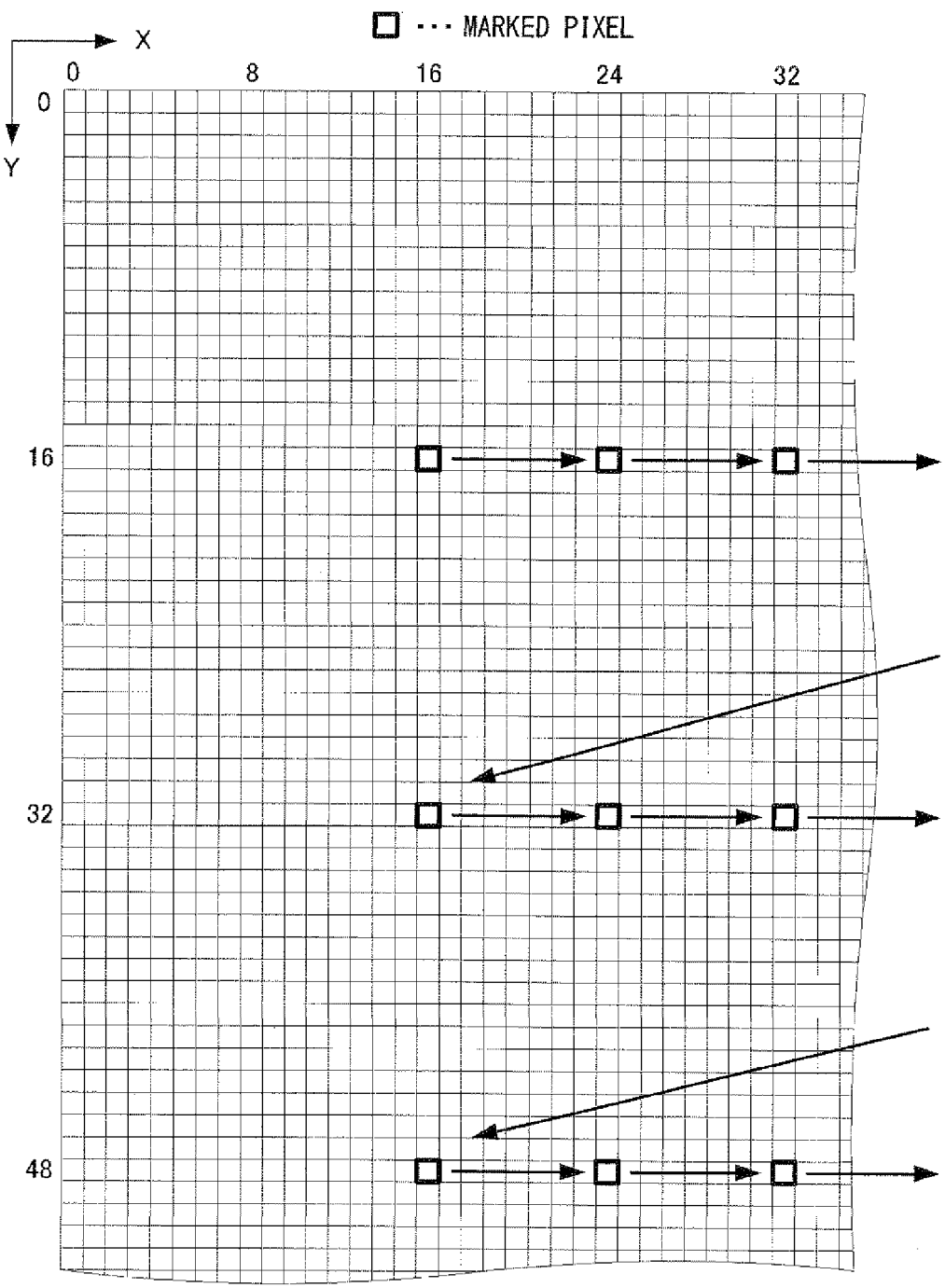
FIG. 7 is a diagram showing the order of selecting a marked pixel in the captured real image.

In the present embodiment, in the captured real image, first, the pixel represented by the coordinates (16, 16) is defined as a marked pixel. Then, on the basis of the luminance value of the marked pixel and the luminance value of the eighth pixel (8, 16) to the left counting from the marked pixel, it is determined whether or not an edge (an edge with the white area on the left and the black area on the right) is present anywhere between the two pixels (the determination method will be described in detail later). When it is determined that an edge is not present, the eighth pixel (24, 16) to the right counting from the currently marked pixel (16, 16) is, as shown in FIG. 7, defined as a newly marked pixel. Then, on the basis of the luminance value of the newly marked pixel and the luminance value of the eighth pixel to the left (i.e., the most recently marked pixel (16, 16)) counting from the newly marked pixel, it is determined whether or not an edge is present anywhere between the two pixels. Thereafter, similar processes are performed while sequentially updating the marked pixel. It should be noted that when the processes on the line having a Y-coordinate value of 16 are completed, similar processes are performed on the sixteenth line below (i.e., the line having a Y-coordinate value of 32) counting from the line having a Y-coordinate value of 16. It should be noted that such a manner of selecting the marked pixel is merely illustrative, and the present invention is not limited to this.

In the following descriptions, the marked pixel is represented as a pixel P(n); the kth pixel to the left from the marked pixel is represented as a pixel P(n−k); and the kth pixel to the right from the marked pixel is represented as a pixel P(n+k). Further, the luminance value of the marked pixel is represented as L(n); the luminance value of the kth pixel to the left from the marked pixel is represented as L(n−k); and the luminance value of the kth pixel to the right from the marked pixel is represented as L(n+k).

Figure 8:
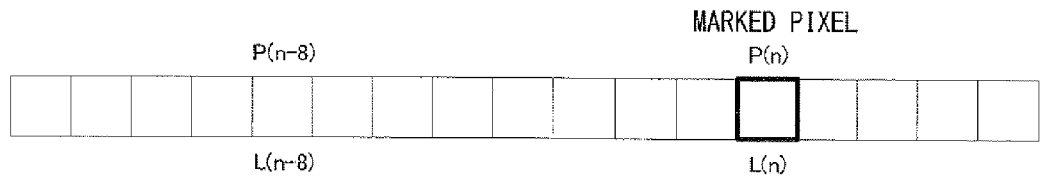
FIG. 8 is a diagram illustrating a determination method of an edge determination threshold.
Figure 9:
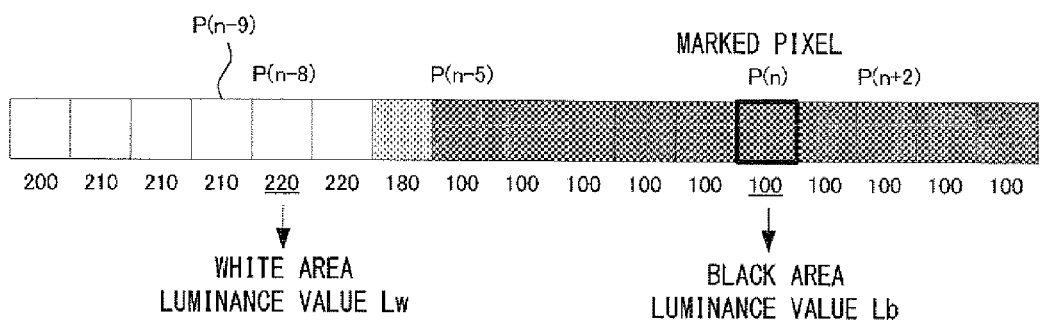
FIG. 9 is a diagram illustrating the determination method of the edge determination threshold.

As shown in FIG. 8, the determination of whether or not an edge is present anywhere between the marked pixel (i.e., the pixel P(n)) and the eighth pixel to the left (i.e., a pixel P(n−8)) from the marked pixel, is made on the basis of L(n−8) and L(n). Specifically, the determination is made on the basis of whether or not L(n−8)−L(n) is equal to or greater than a predetermined value. When L(n−8)−L(n) is equal to or greater than the predetermined value, it is determined that an edge is present somewhere between these pixels. It should be noted that in the present embodiment, the luminance value of each pixel is represented by a value of from 0 to 255, and the predetermined value is 60. It should be noted that these numbers are merely illustrative, and the present invention is not limited to these.

When it is determined that an edge is present somewhere between the pixel P(n) and the pixel P(n−8), subsequently, an edge determination threshold used to detect the position of the edge is calculated on the basis of the luminance values of these two pixels and pixels near (around) these pixels. With reference to FIGS. 9 through 12, a description is given below of the calculation method of the edge determination threshold.

First, as shown in FIGS. 9 through 12, a white area luminance value Lw is determined on the basis of the luminance values of the pixel P(n−8) and pixels near the pixel P(n−8). A description is given below of an example of the determination method of the white area luminance value Lw.

First, it is determined whether or not the luminance value of a pixel P(n−9) is smaller than the luminance value of the pixel P(n−8). If smaller, the luminance value of the pixel P(n−8) serves as the white area luminance value Lw. For example, in the examples of FIGS. 9, 11, and 12, the luminance value of the pixel P(n−9) is 210, and the luminance value of the pixel P(n−8) is 220. Thus, the luminance value of the pixel P(n−8), namely 220, serves as the white area luminance value Lw.

When the luminance value of the pixel P(n−9) is equal to or greater than the luminance value of the pixel P(n−8), subsequently, it is determined whether or not the luminance value of a pixel P(n−10) is smaller than the luminance value of the pixel P(n−9). If smaller, the luminance value of the pixel P(n−9) serves as the white area luminance value Lw.

When the luminance value of the pixel P(n−9) is equal to or greater than the luminance value of the pixel P(n−8), and also the luminance value of the pixel P(n−10) is equal to or greater than the luminance value of the pixel P(n−9), subsequently, it is determined whether or not the luminance value of a pixel P(n−11) is smaller than the luminance value of the pixel P(n−10). If smaller, the luminance value of the pixel P(n−9)

serves as the white area luminance value Lw. For example, in the example of FIG. 10, the luminance value of the pixel P(n−11) is 210, and the luminance value of the pixel P(n−10) is 220. Thus, the luminance value of the pixel P(n−10), namely 220, serves as the white area luminance value Lw.

Figure 10:
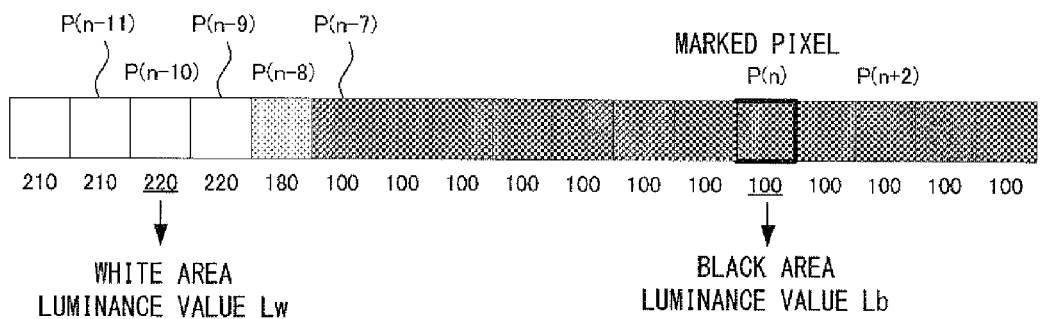
FIG. 10 is a diagram illustrating the determination method of the edge determination threshold.

The process as described above can be rephrased as a process of sequentially referring to the luminance values of pixels leftward from the pixel P(n−8) and finding a local maximum value of the luminance values (the local maximum value that first appears). The process can also be rephrased as a process of detecting a local maximum value from among the luminance values of the pixel P(n−8) and pixels around the pixel P(n−8). Such a process makes it possible that even when, as shown in FIG. 10, the pixel P(n−8) is placed at the boundary between the white area and the black area of the marker 50 (is displayed in gray in the captured real image), the luminance value of the white area of the marker 50 is correctly set as the white area luminance value Lw.

It should be noted that in the present embodiment, the white area luminance value Lw is determined as described above; however, this is merely illustrative, and the determination method of the white area luminance value Lw is not limited to this. For example, the luminance value of the pixel P(n−8) and the luminance value of any pixel around the pixel P(n−8) may be compared with each other. When the luminance value of the pixel around the pixel P(n−8) is greater, the white area luminance value Lw may be calculated on the basis of the luminance value of the pixel around the pixel P(n−8). Alternatively, for example, in the middle of the process of sequentially referring to the luminance values of pixels leftward from the pixel P(n−8) and finding a local maximum value of the luminance values (the local maximum value that first appears), when the luminance value of a referred-to pixel has exceeded a predetermined value (e.g., 250), the process of finding a local maximum value of the luminance values may be suspended, and the white area luminance value Lw may be calculated on the basis of the luminance value of the referred-to pixel.

Next, as shown in FIGS. 9 through 12, a black area luminance value Lb is determined on the basis of the luminance values of the pixel P(n) and pixels near the pixel P(n). A description is given below of an example of the determination method of the black area luminance value Lb.

First, it is determined whether or not the luminance value of a pixel P(n+2) is equal to or less than the luminance value of the pixel P(n). If equal to or less than the luminance value of the pixel P(n), the luminance value of the pixel P(n) serves as the black area luminance value Lb. For example, in the examples of FIGS. 9 and 10, the luminance value of the pixel P(n+2) is 100, and the luminance value of the pixel P(n) is 100. Thus, the luminance value of the pixel P(n), namely 100, serves as the black area luminance value Lb.

When the luminance value of the pixel P(n+2) is greater than the luminance value of the pixel P(n), subsequently, it is determined whether or not the value obtained by subtracting the luminance value of the pixel P(n+2) from the white area luminance value Lw (i.e., Lw−L(n+2)) is equal to or greater than the predetermined value (i.e., 60). When the obtained value is equal to or greater than 60, the luminance value of the pixel P(n+2) serves as the black area luminance value Lb. When the obtained value is less than 60, the luminance value of the pixel P(n) serves as the black area luminance value Lb.

Figure 11:
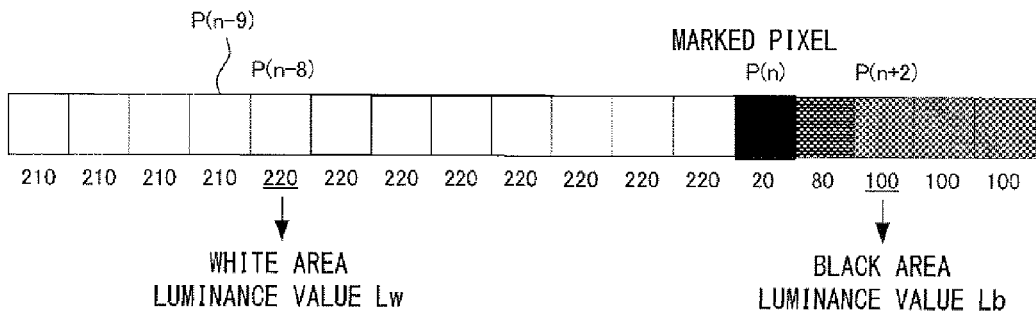
FIG. 11 is a diagram illustrating the determination method of the edge determination threshold.

For example, in the example of FIG. 11, the luminance value of the pixel P(n) is 20; the luminance value of the pixel P(n+2) is 100; and the white area luminance value Lw is 220. Then, Lw−L(n+2)=120, and therefore, the luminance value of the pixel. P(n+2), namely 100, serves as the black area luminance value Lb. In a captured real image subjected to an edge enhancement process (a contour enhancement process or a sharpness process), the luminance values of black area pixels adjacent to the white area may occasionally be, as shown in FIG. 11, significantly smaller than intrinsic luminance values of the black area. In response to this, in the present embodiment, the luminance value of the pixel P(n+2) serves as the black area luminance value Lb when the conditions as described above are satisfied, so that it is possible to determine an appropriate black area luminance value Lb even in such a case.

Figure 12:
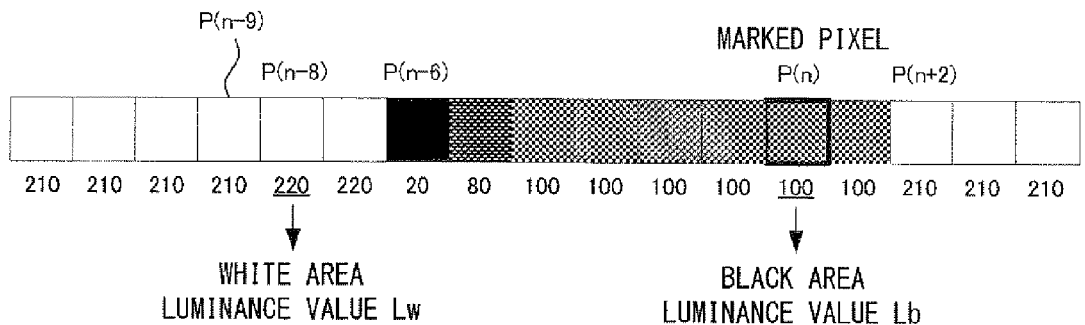
FIG. 12 is a diagram illustrating the determination method of the edge determination threshold.

On the other hand, in the example of FIG. 12, the luminance value of the pixel P(n) is 100; the luminance value of the pixel P(n+2) is 210; and the white area luminance value Lw is 220. Then, Lw−L(n+2)=10, and therefore, the luminance value of the pixel P(n), namely 100, serves as the black area luminance value Lb.

It should be noted that in the present embodiment, the black area luminance value Lb is determined as described above; however, this is merely illustrative, and the determination method of the black area luminance value Lb is not limited to this.

When the white area luminance value Lw and the black area luminance value Lb have been determined as described above, subsequently, the edge determination threshold is calculated on the basis of the white area luminance value Lw and the black area luminance value Lb. In the present embodiment, the average value of the white area luminance value Lw and the black area luminance value Lb is determined as the edge determination threshold. For example, in each of the examples of FIGS. 9 through 12, the edge determination threshold is 160. This is, however, merely illustrative, and the calculation method of the edge determination threshold is not limited to this.

When the edge determination threshold has been determined as described above, the position where the edge is present between the pixel P(n) and the pixel P(n−8) is detected, using the edge determination threshold. Specifically, it is determined that a pixel having a luminance value greater than the edge determination threshold is the white area, and it is determined that a pixel having a luminance value smaller than the edge determination threshold is the black area. Then, it is determined that the boundary between the white area and the black area is the edge. It should be noted that in the present embodiment, a black area pixel adjacent to the white area is detected as an "edge pixel" placed on the edge (or adjacent to the edge). For example, in the example of FIG. 9, it is determined that a pixel P(n−5) is an edge pixel. In the example of FIG. 10, it is determined that a pixel P(n−7) is an edge pixel. In the example of FIG. 11, it is determined that the pixel P(n) is an edge pixel. In the example of FIG. 12, it is determined that a pixel P(n−6) is an edge pixel. It should be noted that in another embodiment, a white area pixel adjacent to the black area may be detected as an "edge pixel" placed on the edge.

Each pixel of the captured real image is associated with a flag indicating whether or not the pixel is an edge pixel (an edge flag). The edge flag of a pixel determined as an edge pixel is set to on.

The edge pixel detected as described above is referred to as a "starting edge pixel" in the following descriptions. The starting edge pixel is estimated as a part of the contour of the design drawn in the marker 50 (the boundary between the white area and the black area shown in FIG. 5). If the starting edge pixel is a part of the contour of the design drawn in the marker 50, it is possible to detect the contour of the design drawn in the marker 50 (the boundary between the white area and the black area shown in FIG. 5), by sequentially tracking adjacent edge pixels such that the starting point is the starting edge pixel.

A description is given below of a process of sequentially tracking adjacent edge pixels such that the starting point is the starting edge pixel (an edge tracking process).

Figure 13:
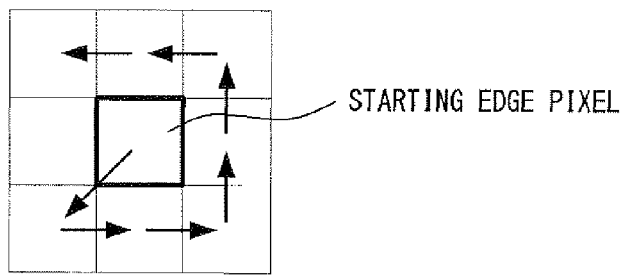
FIG. 13 is a diagram illustrating an edge tracking process.

First, as shown in FIG. 13, black area pixels are searched for in the order of, with the starting edge pixel as a reference, the lower left adjacent pixel, the lower adjacent pixel, the lower right adjacent pixel, the right adjacent pixel, the upper right adjacent pixel, the upper adjacent pixel, and the upper left adjacent pixel (i.e., counterclockwise around the starting edge pixel, starting from the left adjacent pixel). The first detected black area pixel is detected as a new edge pixel subsequent to the starting edge pixel. The determination of whether or not each adjacent pixel is a black area pixel is made on the basis of the edge determination threshold used when the starting edge pixel has been detected. More specifically, when the luminance value of an adjacent pixel is smaller than the edge determination threshold, it is determined that the adjacent pixel is a black area pixel.

Figure 14:
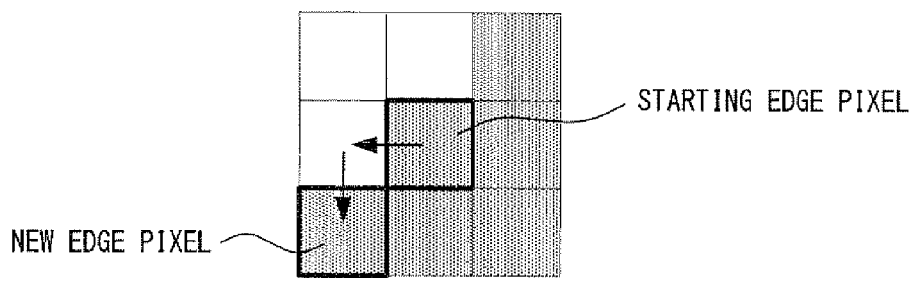
FIG. 14 is a diagram illustrating the edge tracking process.
Figure 15:
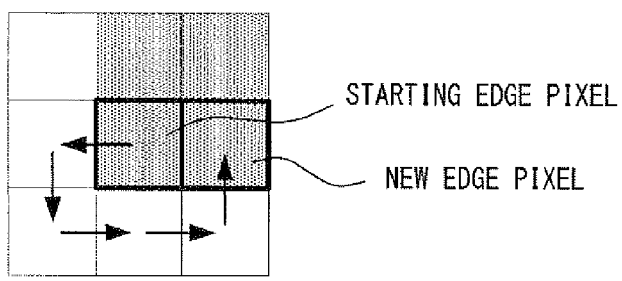
FIG. 15 is a diagram illustrating the edge tracking process.

For example, in the example of FIG. 14, the lower left adjacent pixel is detected as a new edge pixel. In the example of FIG. 15, the right adjacent pixel is detected as a new edge pixel.

When, in the edge tracking process, edge pixels have been sequentially detected such that the starting point is the starting edge pixel, the coordinate values of the detected edge pixels are sequentially stored in the main memory 32 as a series of edge pixels. It should be noted that in the following descriptions, the edge pixel last detected in the edge tracking process is referred to as a "front edge pixel", and the edge pixel detected immediately before the front edge pixel is referred to as a "second edge pixel".

A new edge pixel subsequent to the front edge pixel is detected by searching for a black area pixel counterclockwise around the front edge pixel, such that the starting point is the adjacent pixel placed in the direction shifted 135 degrees counterclockwise from the direction of the second edge pixel as viewed from the front edge pixel (in another embodiment, the starting point may be the adjacent pixel placed in the direction shifted 45 degrees counterclockwise, or may be the adjacent pixel placed in the direction shifted 90 degrees counterclockwise). Then, the black area pixel first detected in the search is detected as a new edge pixel (i.e., a new front edge pixel).

Figure 16:
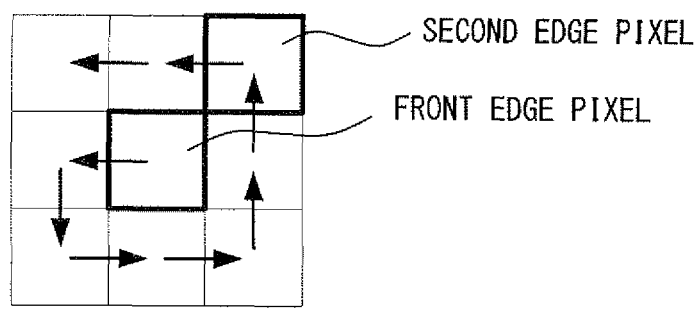
FIG. 16 is a diagram illustrating the edge tracking process.
Figure 17:
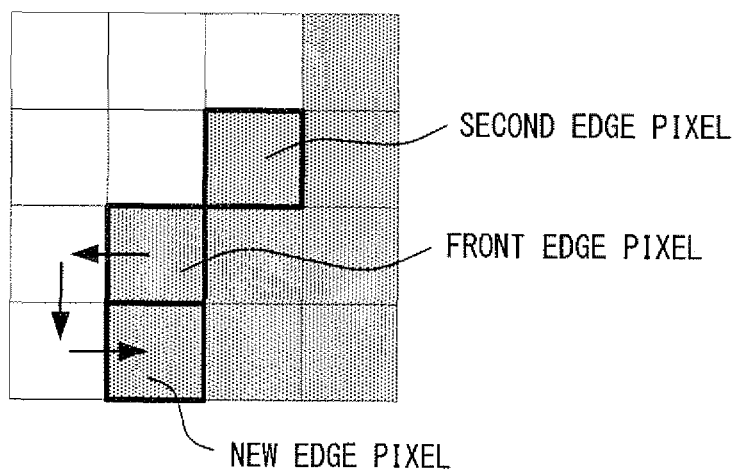
FIG. 17 is a diagram illustrating the edge tracking process.

For example, as shown in FIG. 16, when the second edge pixel is the upper right adjacent pixel to the front edge pixel, a black area pixel is searched for counterclockwise around the front edge pixel, starting from the left adjacent pixel. Accordingly, in the example of FIG. 17, the lower adjacent pixel to the front edge pixel is detected as a new edge pixel.

In addition, for example, as shown in FIG. 18, when the second edge pixel is the left adjacent pixel to the front edge pixel, a black area pixel is searched for counterclockwise around the front edge pixel, starting from the lower right adjacent pixel. Accordingly, in the example of FIG. 19, the right adjacent pixel to the front edge pixel is detected as a new edge pixel.

New edge pixels are sequentially detected by repeating the process as described above. Then, ultimately, the front edge pixel reaches the starting edge pixel, whereby the detection of the contour of the black area is completed (i.e., data concerning a series of an edge pixel group indicating the contour of the black area is stored in the main memory 32).

It should be noted that in the present embodiment, each time a new edge pixel is detected in the edge tracking process, it is determined, on the basis of the edge flag, whether or not the new edge pixel is included in the series of an edge pixel group that has already been detected. When it is determined three consecutive times that the new edge pixel is included in the series of an edge pixel group that has already been detected, the edge tracking process is suspended.

Figure 20:
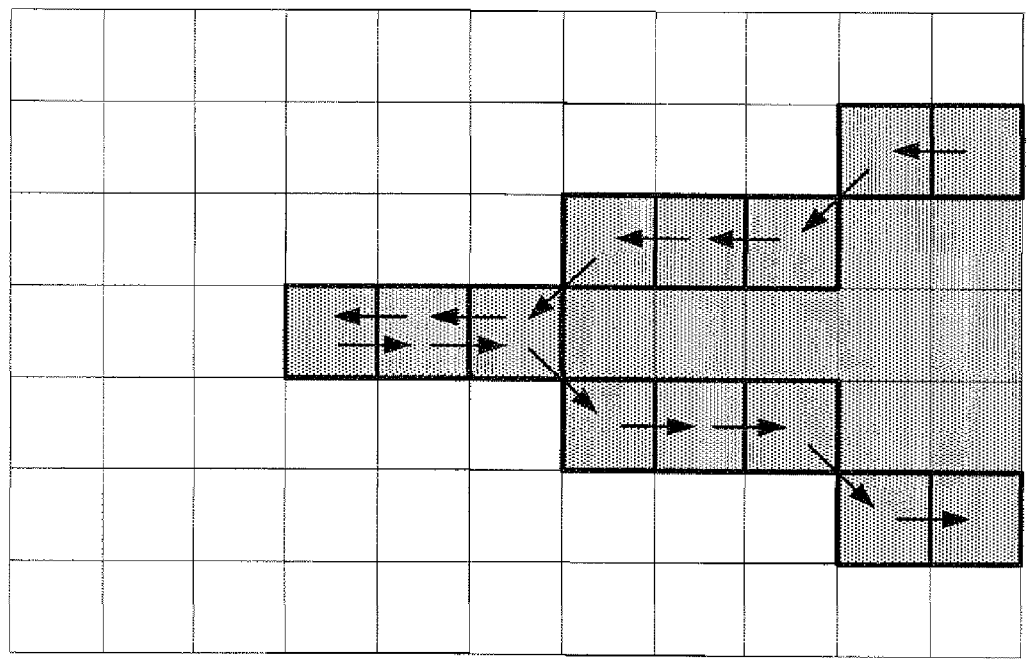
FIG. 20 is a diagram illustrating the edge tracking process.

For example, as shown in FIG. 20, when it is determined only two consecutive times that the new edge pixel is included in the series of an edge pixel group that has already been detected, the edge tracking process is not suspended.

Figure 21:
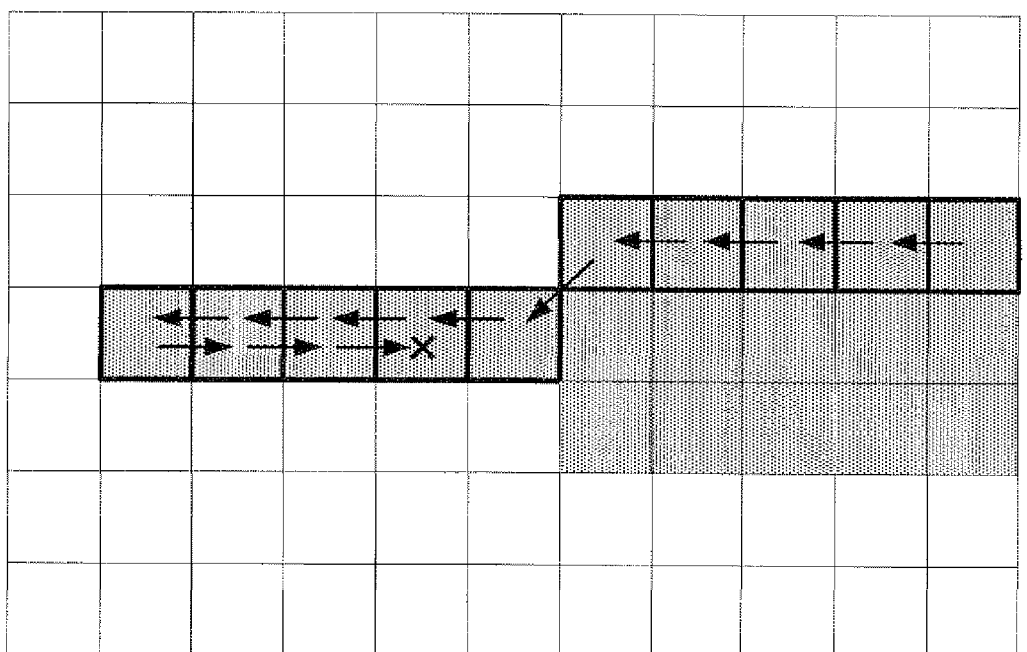
FIG. 21 is a diagram illustrating the edge tracking process.

As shown in FIG. 21, however, when it is determined three consecutive times that the new edge pixel is included in the series of an edge pixel group that has already been detected, the edge tracking process is suspended. This is because there is a high possibility that the black area as shown in FIG. 21 is not the contour of the design drawn in the marker 50 (i.e., is the contour of an object other than the marker 50). Further, even if the black area is the contour of the design drawn in the marker 50, it is highly unlikely to be able to normally perform a pattern matching process described later and the like. This makes it possible to avoid unnecessary processes. It should be noted that the number of times, namely three times, is merely illustrative, and may be another number of times.

It should be noted that in the above description, as an example, the contour of the black area is tracked counterclockwise such that the starting point is the starting edge pixel. Alternatively, in another embodiment, the contour of the black area may be tracked clockwise such that the starting point is the starting edge pixel.

As described above, in the contour detection process, the white area luminance value Lw and the black area luminance value Lb are determined, and the edge determination threshold is calculated on the basis of the white area luminance value Lw and the black area luminance value Lb. Accordingly, even when the brightness of a captured real image has entirely or partially changed, and the luminances of the white area and the black area of the marker 50 in the captured real image have changed in accordance with the change, it is possible to perform the contour detection process using an appropriate edge determination threshold. This improves the accuracy of recognizing the marker 50.

It should be noted that in the contour detection process, the contour is extracted on the basis of the luminance values of pixels; however, the present invention is not limited to luminance values. Alternatively, the contour may be detected on the basis of other given pixel values (typically, color values).

In addition, in the contour detection process, first, it is determined whether or not an edge is present between two pixels separate in the horizontal direction (the pixel P(n) and the pixel P(n−8)); however, the manner of selecting two pixels is not limited to this. For example, it may be determined whether or not an edge is present between two pixels separate in the vertical direction. Alternatively, it may be determined whether or not an edge is present between two pixels separate in a diagonal direction.

In addition, in the contour detection process, when L(n−8)−L(n) is equal to or greater than a predetermined value, it is determined that an edge is present between the pixel P(n) and the pixel P(n−8) (in this case, it is possible to find an edge with the white area on the left and the black area on the right). Alternatively, in another embodiment, when the absolute value of L(n−8)−L(n) is equal to or greater than a predetermined value, it may be determined that an edge is present between the pixel P(n) and the pixel P(n−8). In this case, it is possible to find not only an edge with the white area on the left and the black area on the right, but also an edge with the black area on the left and the white area on the right.

In addition, in the contour detection process, the edge determination threshold used when the starting edge pixel has been detected is used in the edge tracking process. Alternatively, in another embodiment, the edge determination threshold may be used to detect an edge pixel from a given area in the captured real image (e.g., the entire captured real image). For example, the following may be detected on the basis of the edge determination threshold: an edge pixel on the line placed one line lower than the line including the starting edge pixel; and an edge pixel of a contour other than the contour including the starting edge pixel.

(Vertex Detection Process)

Next, the vertex detection process is described. The vertex detection process is a process of detecting the four vertices of the black area of the marker 50 in the captured real image, and includes the following processes.

Straight line calculation process
Straight line integration process
Straight line selection process
Vertex calculation process In the straight line calculation process, a plurality of straight lines are calculated on the basis of the data concerning the series of an edge pixel group indicating the contour of the black area, the data stored in the main memory 32 in the contour detection process described above. With reference to FIGS. 22 through 36, the straight line calculation process is described in detail below.

In the data concerning the series of an edge pixel group stored in the main memory 32, a plurality of edge pixels are ordered. In the following descriptions, for convenience, the direction of tracking the contour of the black area counterclockwise (i.e., the left direction as viewed from the black area in the direction of the white area) is defined as forward, and the direction of tracking the contour of the black area clockwise (i.e., the right direction as viewed from the black area in the direction of the white area) is defined as backward.

Figure 22:
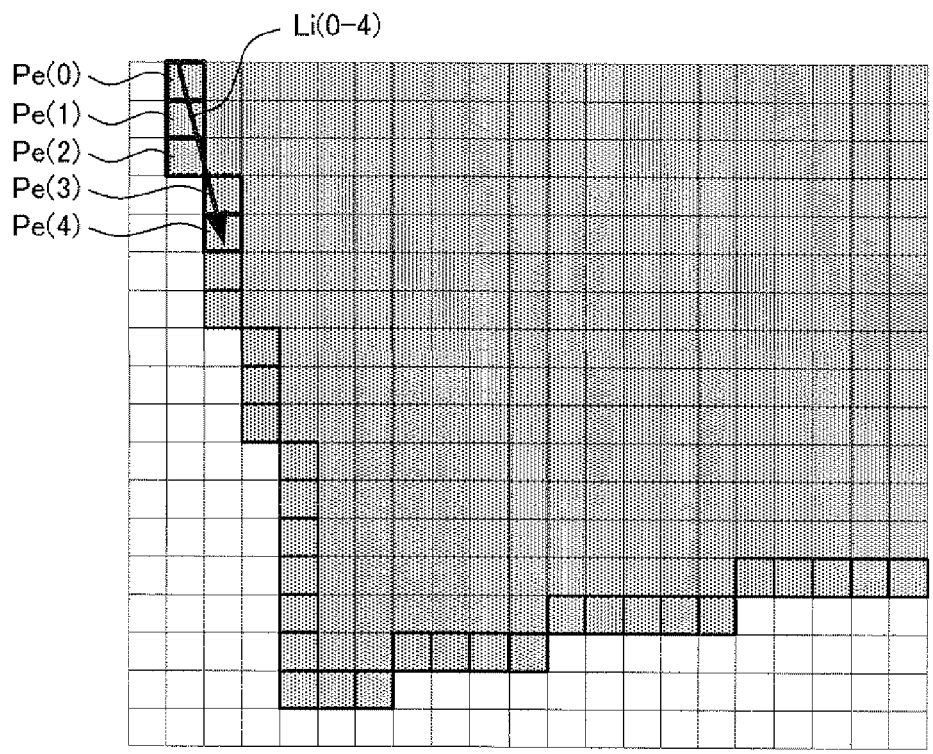
FIG. 22 is a diagram illustrating a straight line calculation process.

First, as shown in FIG. 22, a first straight line Li(0-4) is generated on the basis of five edge pixels Pe(0) through Pe(4), starting from the starting edge pixel Pe(0) to the edge pixel Pe(4), which is four pixels ahead of the starting edge pixel Pe(0), and data indicating the straight line Li(0-4) is stored in the main memory 32. It should be noted that it is possible to employ various methods as a method of generating a straight line on the basis of a plurality of edge pixels. In the present embodiment, a straight line is generated by a least squares method.

Figure 23:
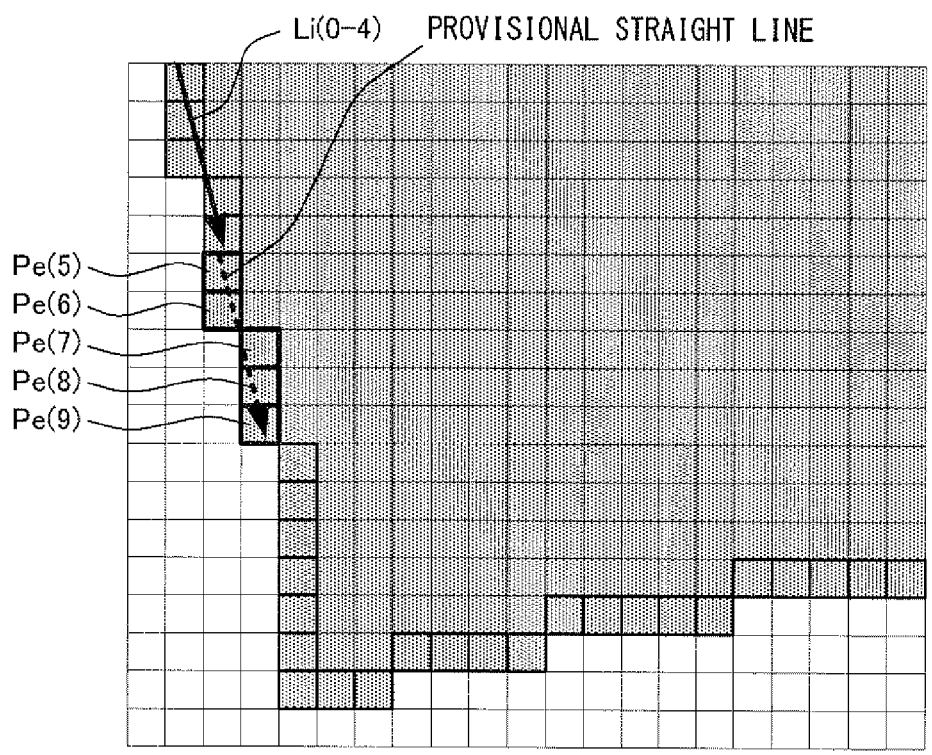
FIG. 23 is a diagram illustrating the straight line calculation process.
Figure 24:
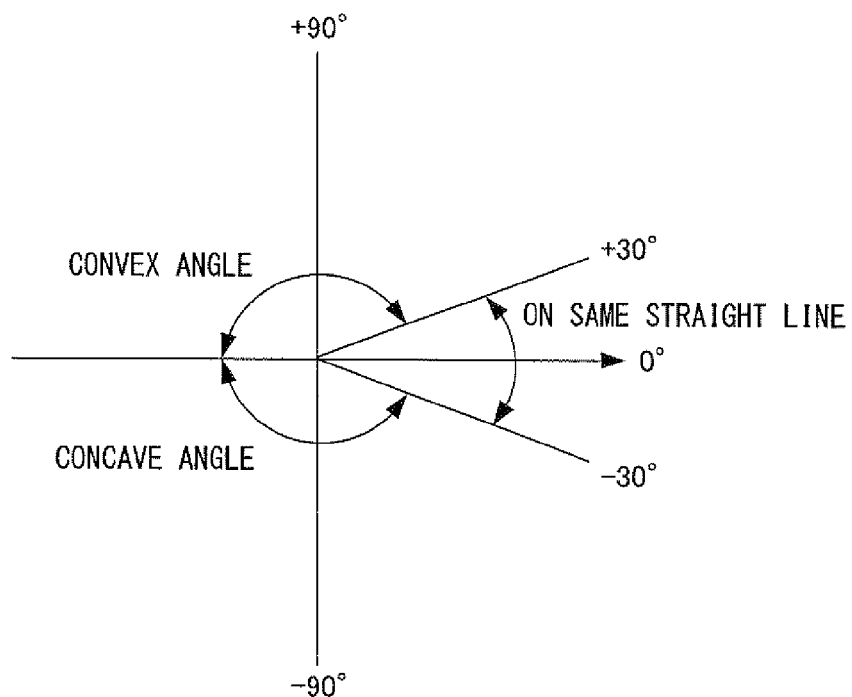
FIG. 24 is a diagram illustrating the straight line calculation process.

Next, as shown in FIG. 23, a provisional straight line is generated by, for example, a least squares method on the basis of five edge pixels Pc(5) through Pe(9) immediately ahead of the straight line Li(0-4), and it is determined whether or not the straight line Li(0-4) and the provisional straight line are placed on the same straight line. The determination is made on the basis of, for example, the angle of the provisional straight line with respect to the straight line Li(0-4). In the present embodiment, as shown in FIG. 24, when the angle of the provisional straight line with respect to the straight line Li(0-4) (on the assumption that the counterclockwise direction is positive) is in the range from −30° to +30°, it is determined that the straight line Li(0-4) and the provisional straight line are placed on the same straight line. It should be noted that the values such as −30° and +30° are merely illustrative, and the present invention is not limited to these.

Figure 25:
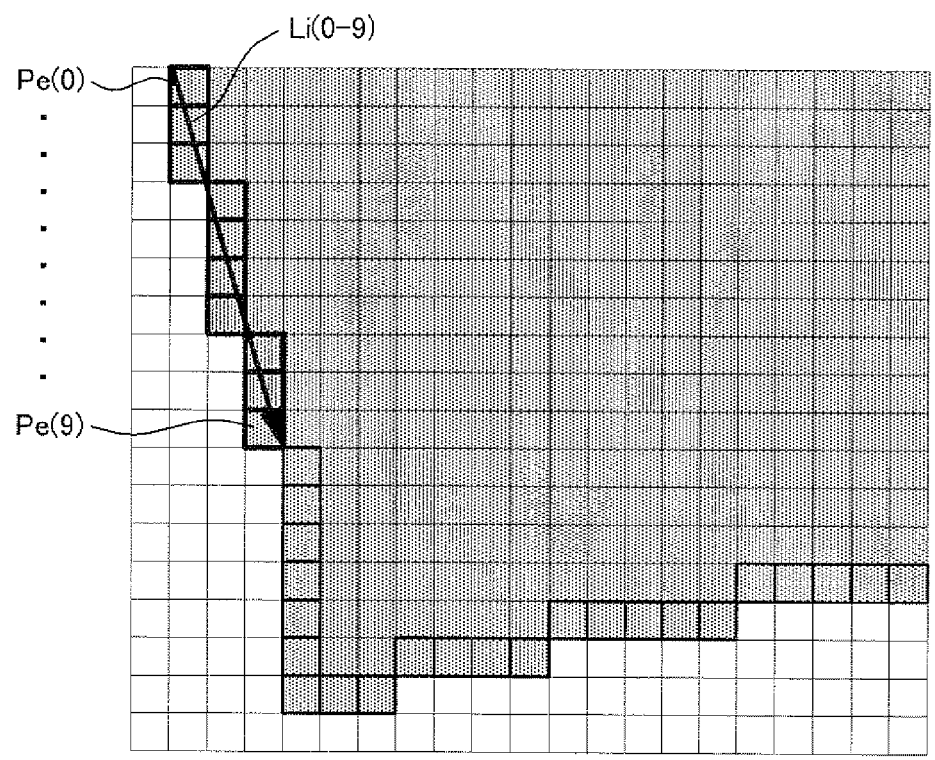
FIG. 25 is a diagram illustrating the straight line calculation process.

When it is determined that the straight line Li(0-4) and the provisional straight line are placed on the same straight line, a straight line Li(0-9) is calculated as shown in FIG. 25 by, for example, a least squares method on the basis of 10 edge pixels, namely the edge pixels Pe(0) through Pe(4) corresponding to the straight line Li(0-4) and the edge pixels Pe(5) through Pe(9) corresponding to the provisional straight line, and the data indicating the straight line Li(0-4) stored in the main memory 32 is updated to data indicating the straight line Li(0-9). Such a process is repeated, whereby the straight line is sequentially updated (extended). It should be noted that in the present embodiment, a provisional straight line is generated every five edge pixels; however, this is merely illustrative, and the present invention is not limited to this.

Figure 26:
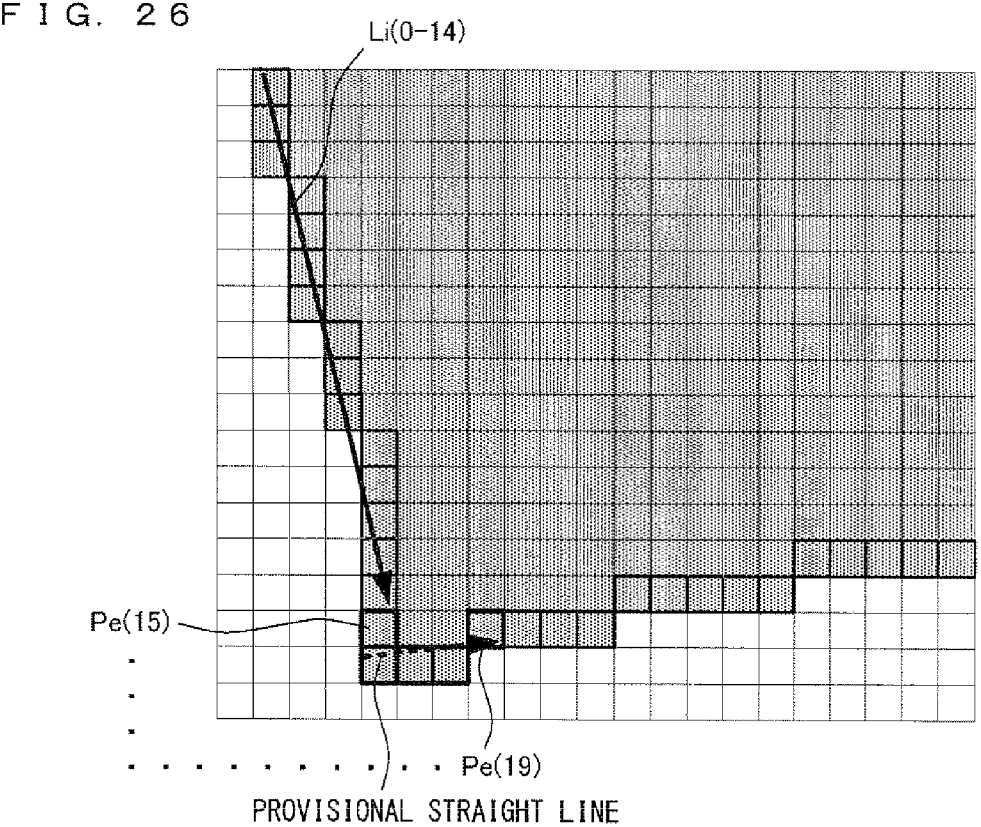
FIG. 26 is a diagram illustrating the straight line calculation process.
Figure 27:
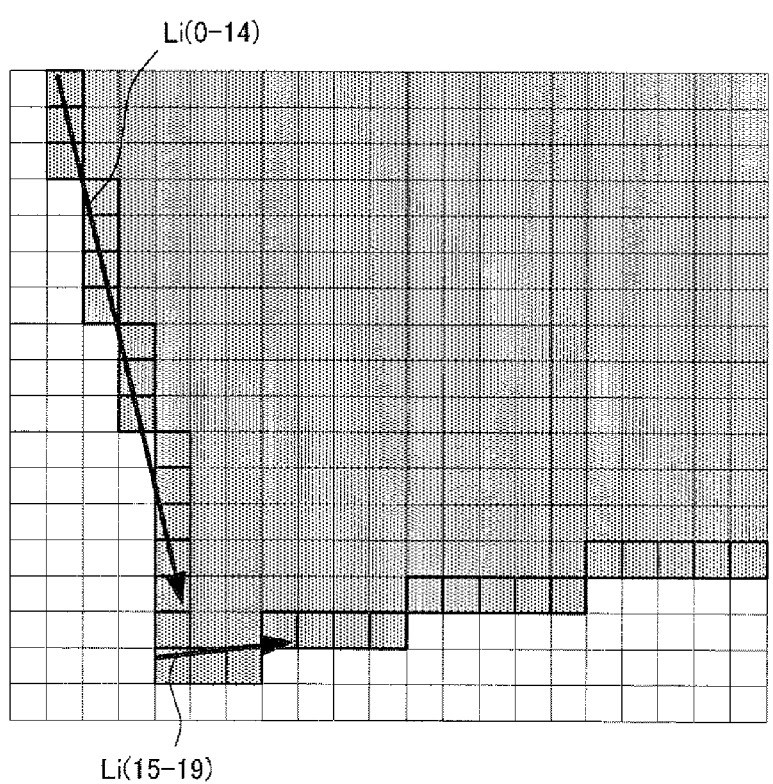
FIG. 27 is a diagram illustrating the straight line calculation process.

In the example of FIG. 26, the angle of a provisional straight line (i.e., a provisional straight line generated on the basis of five edge pixels Pe(15) through Pe(19) ahead of a straight line Li(0-14)) with respect to the straight line Li(0-14) exceeds +30°, and therefore, it is determined that the black area has a convex angle near the intersection of the straight line Li(0-14) and the provisional straight line (i.e., the black area is pointed outward near the intersection of the straight line Li(0-14) and the provisional straight line) (see FIG. 24). In this case, it is determined that the provisional straight line is a new straight line different from the straight line Li(0-14). Then, a new straight line Li(15-19) corresponding to the provisional straight line is generated (see FIG. 27). In this case, data indicating the straight line Li(0-14) is held as it is in the main memory 32, and data indicating the straight line Li(15-19) is newly stored in the main memory 32.

Figure 28:
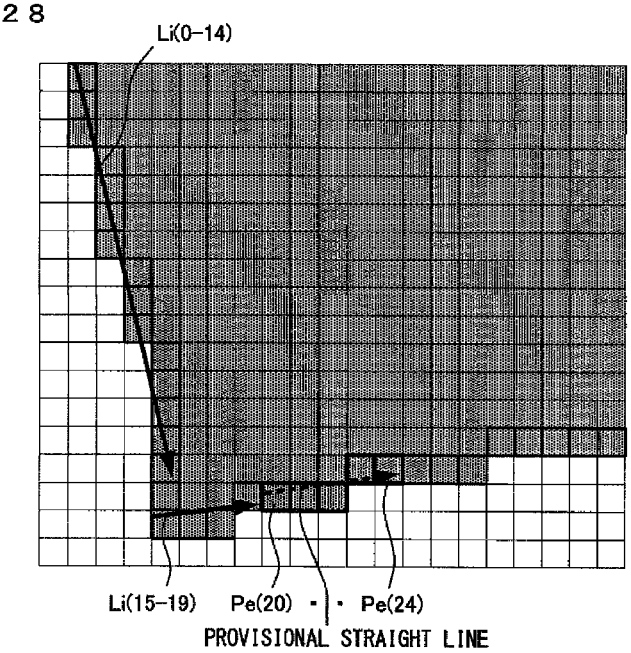
FIG. 28 is a diagram illustrating the straight line calculation process.
Figure 29:
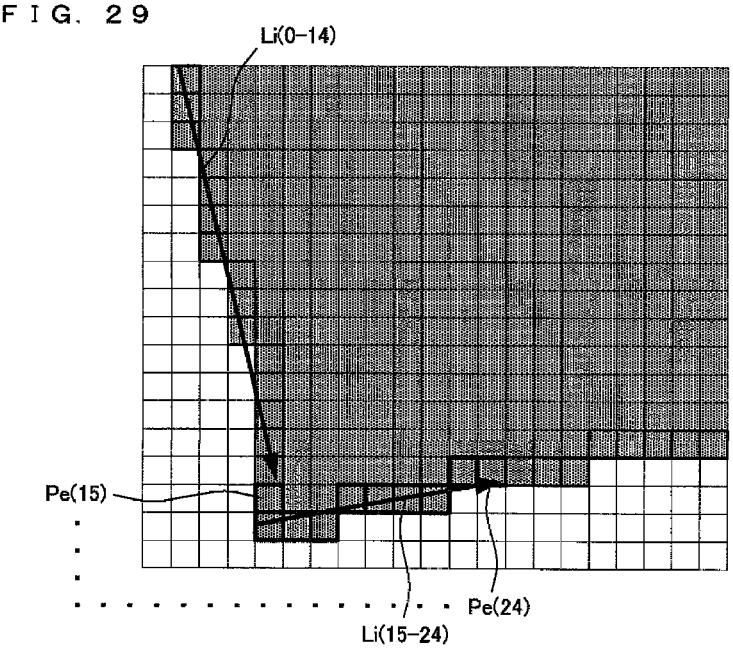
FIG. 29 is a diagram illustrating the straight line calculation process.

Subsequently, as shown in FIG. 28, it is determined whether or not the straight line Li(15-19) and a provisional straight line generated on the basis of five edge pixels Pe(20) through Pe(24) ahead of the straight line Li(15-19) are placed on the same straight line. When it is determined that these lines are placed on the same straight line, the straight line Li(15-19) is updated to a straight line Li(15-24) on the basis of the edge pixels Pe(15) through Pe(24), as shown in FIG. 29.

The process as described above is repeated, whereby a plurality of straight lines are ultimately calculated as shown in FIG. 30 (six straight lines, namely straight lines A through F, in the example of FIG. 30). It should be noted that these lines may include a short straight line, such as the straight line D.

As described above, in the straight line calculation process, each straight line is calculated from, among a series of edge pixels, some edge pixels placed on the same straight line.

It should be noted that in the straight line calculation process, a straight line is generated or updated such that the starting point is the starting edge pixel Pe(0); however, the present invention is not limited to this. Alternatively, a straight line may be generated or updated such that a given edge pixel other than the starting point is the starting edge pixel Pe(0).

In addition, in the straight line calculation process, a straight line is generated or updated counterclockwise; however, the present invention is not limited to this. Alternatively, a straight line may be generated or updated clockwise.

In addition, in the straight line calculation process, it is determined whether or not an already generated straight line and a provisional straight line adjacent thereto are placed on the same straight line, and when it is determined that these lines are placed on the same straight line, a straight line is calculated on the basis of a plurality of edge pixels corresponding to the straight line and the provisional straight line. Alternatively, in another embodiment, after numerous provisional straight lines are generated first, a straight line may be calculated on the basis of a plurality of edge pixels corresponding to, among the numerous provisional straight lines, a plurality of provisional straight lines placed on the same straight line.

Figure 31:
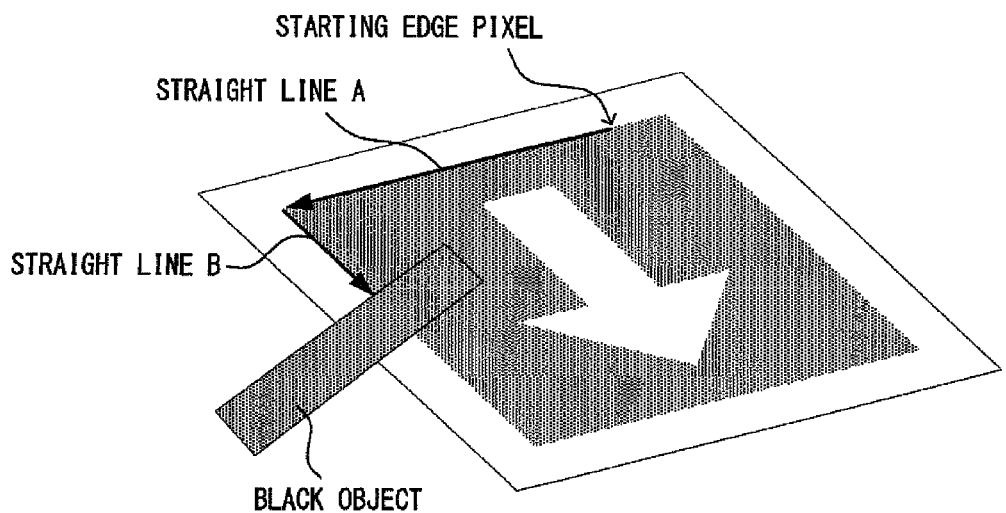
FIG. 31 is a diagram illustrating the straight line calculation process.
Figure 32:
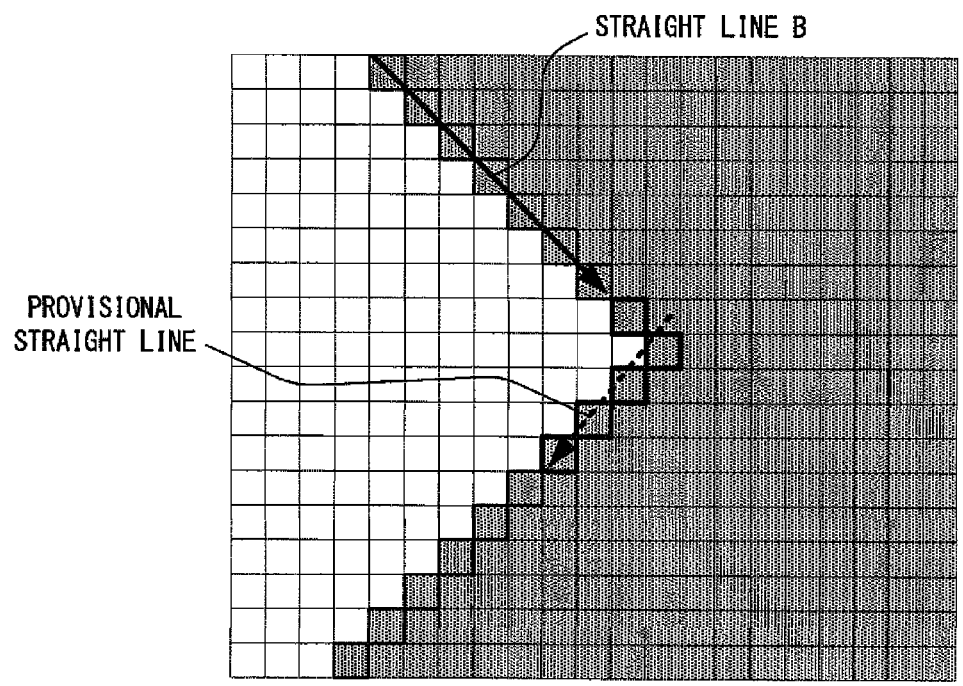
FIG. 32 is a diagram illustrating the straight line calculation process.

The case is considered where, as shown in FIG. 31, a black object is displayed so as to partially overlap a side of the black area of the marker 50 in the captured real image. In this case, in the straight line calculation process, after a straight line A and a straight line B have been generated, it is determined, as shown in FIG. 32, whether or not the straight line B and a provisional straight line ahead of the straight line B are placed on the same straight line. The angle of the provisional straight line with respect to the straight line B is smaller than −30°, and therefore, it is determined that the black area has a concave angle near the intersection of the straight line B and the provisional straight line (i.e., the black area is depressed inward near the intersection of the straight line B and the provisional straight line) (see FIG. 24). There is no concave angle in the contour of the black area of the marker 50 (i.e., there are only convex angles), and therefore, when such a concave angle has been detected, it is estimated that the provisional straight line indicates a part of the contour of an object other than the marker.

Figure 33:
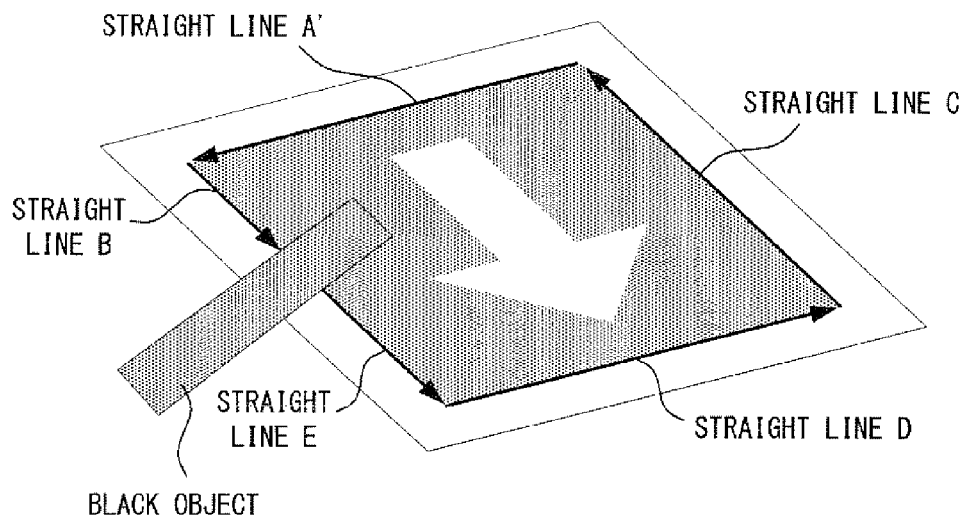
FIG. 33 is a diagram illustrating the straight line calculation process.

As described above, when a concave angle has been detected in the straight line calculation process, it is determined that it is not possible to perform a process of updating (extending) or newly generating a straight line. Then, the process is suspended of updating (extending) or newly generating a straight line counterclockwise in the black area, and a process is started of updating (extending) or newly generating a straight line in the direction opposite to the previous direction (i.e., clockwise). For example, in the example of FIG. 31, a process is performed of extending backward the straight line A, clockwise from the starting edge pixel, and also a process is performed of generating a new straight line. As a result, as shown in FIG. 33, the straight line A shown in FIG. 31 is updated to a straight line A', and straight lines C through E are sequentially generated. It should be noted that a concave angle is detected at the rear end of the straight line E, and therefore, the straight line calculation process ends at the time of the detection. As a result, five straight lines, namely the straight line A' and the straight lines B through E, are calculated.

Figure 34:
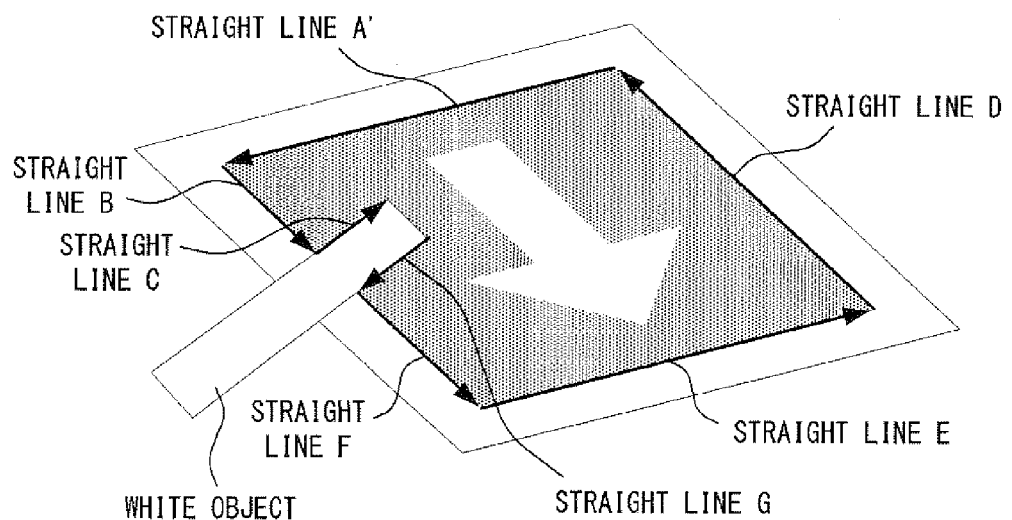
FIG. 34 is a diagram illustrating the straight line calculation process.

As yet another example, as shown in FIG. 34, the case is considered where a white object is displayed so as to partially overlap a side of the black area of the marker 50 in the captured real image. In this case, in the straight line calculation process, after straight lines A through C have been generated, a concave angle is detected. Then, a process is started of extending backward the straight line A, clockwise from the starting edge pixel, and also a process is started of generating a new straight line. The straight line A is updated to a straight line A', and straight lines D through G are sequentially generated. As a result, seven straight lines, namely the straight line A' and the straight lines B through G, are calculated.

Figure 35:
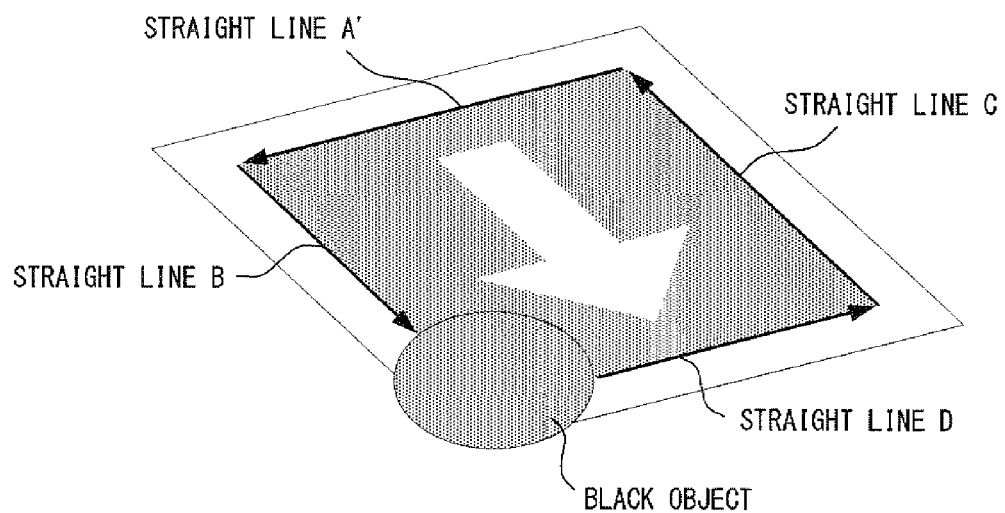
FIG. 35 is a diagram illustrating the straight line calculation process.

As yet another example, the case is considered where, as shown in FIG. 35, a black object is displayed so as to overlap a vertex of the black area of the marker 50 in the captured real image. In this case, as a result, four straight lines, namely, a straight line A' and straight lines B through D, are calculated.

Figure 36:
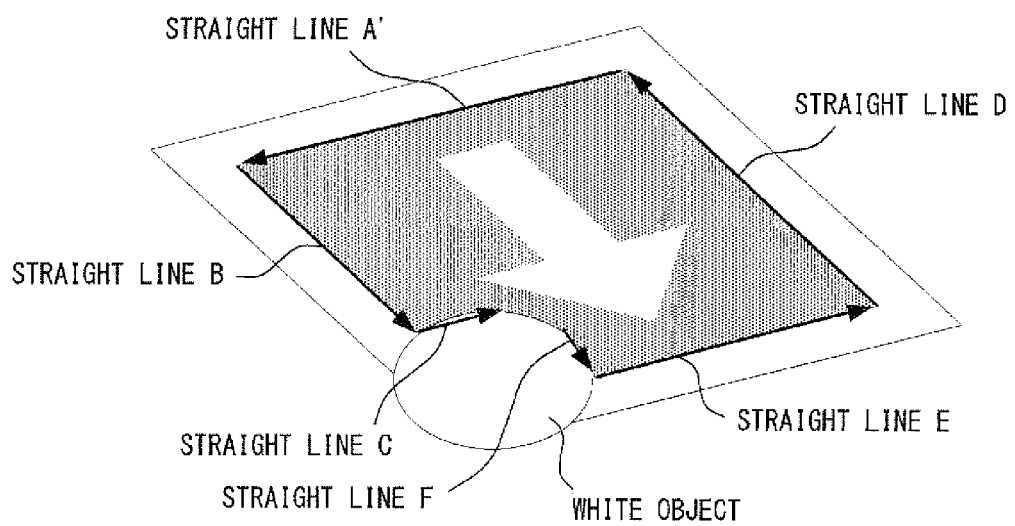
FIG. 36 is a diagram illustrating the straight line calculation process.

As yet another example, the case is considered where, as shown in FIG. 36, a white object is displayed so as to overlap a vertex of the black area of the marker 50 in the captured real image. In this case, as a result, six straight lines, namely a straight line A' and straight lines B through F, are calculated.

When the straight line calculation process is completed, the straight line integration process is subsequently performed. The straight line integration process is a process of integrating, among a plurality of straight lines calculated in the straight line calculation process, a plurality of straight lines placed on the same straight line and directed in the same direction into one straight line.

Figure 37:
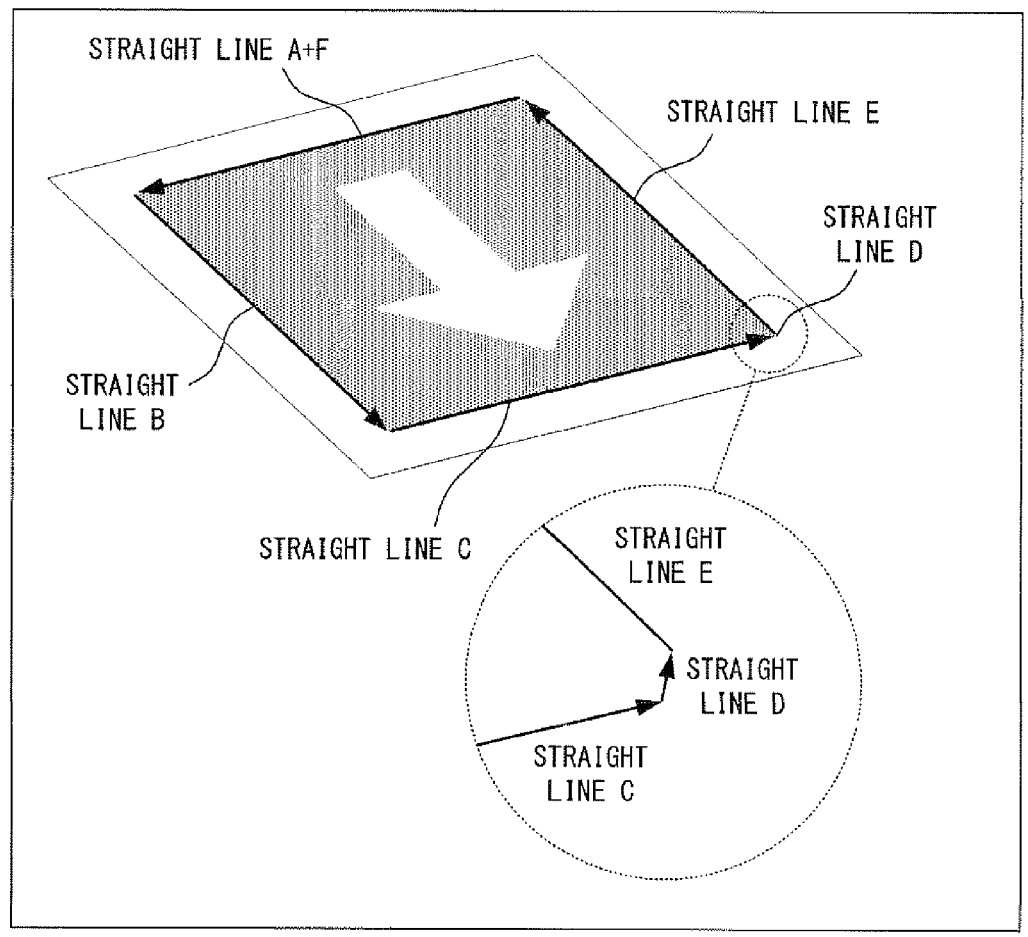
FIG. 37 is a diagram illustrating the straight line calculation process.

For example, in the example of FIG. 30, the straight line A and the straight line F are placed on the same straight line and directed in the same direction, and therefore, as shown in FIG. 37, these two straight lines are integrated into one straight line A+F.

Figure 38:
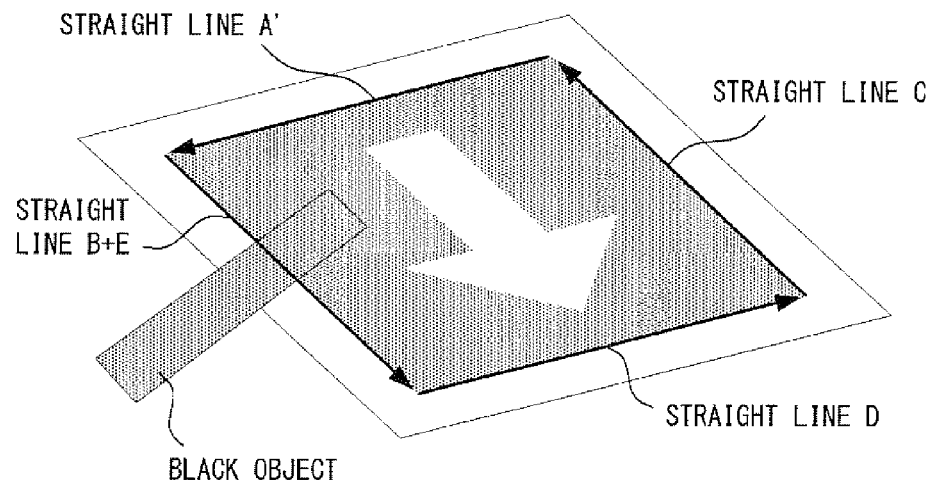
FIG. 38 is a diagram illustrating the straight line calculation process.

In addition, for example, in the example of FIG. 33, the straight line B and the straight line E are placed on the same straight line and directed in the same direction, and therefore, as shown in FIG. 38, these two straight lines are integrated into one straight line B+E.

Figure 39:
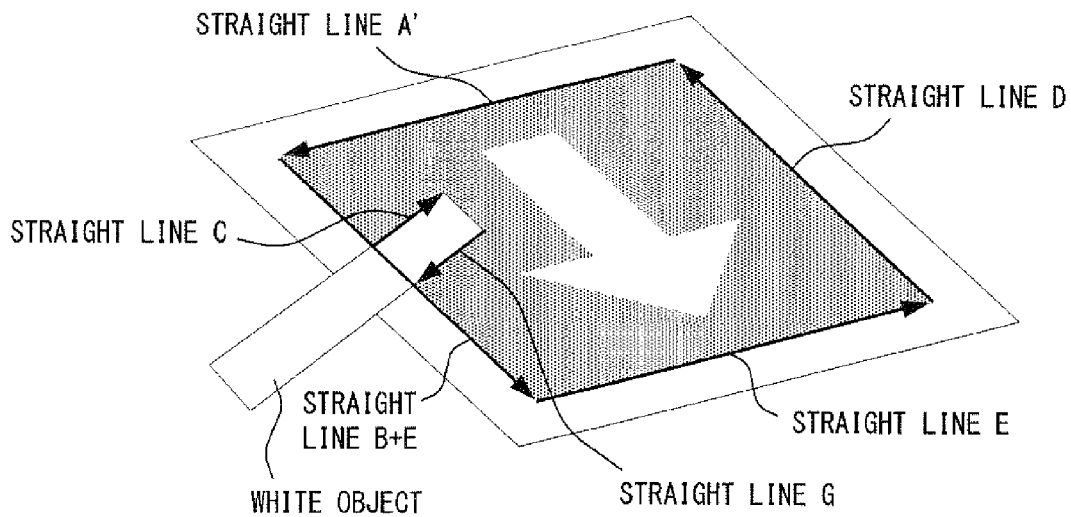
FIG. 39 is a diagram illustrating the straight line calculation process.

In addition, for example, in the example of FIG. 34, the straight line B and the straight line F are placed on the same straight line and directed in the same direction, and therefore, as shown in FIG. 39, these two straight lines are integrated into one straight line B+F.

When the straight line integration process is completed, the straight line selection process is subsequently performed. The straight line selection process is a process of selecting straight lines corresponding to the four sides of the black area of the marker 50, from among the plurality of straight lines finally remaining after the straight line calculation process and the straight line integration process.

In the present embodiment, the four longest straight lines (i.e., the longest straight line, the second longest straight line, the third longest straight line, and the fourth longest straight line) are selected as straight lines corresponding to the four sides of the black area of the marker 50, from among the plurality of finally remaining straight lines. In the following descriptions, the selected four straight lines are referred to as a "first straight line", a "second straight line", a "third straight line", and a "fourth straight line", counterclockwise from a given straight line among these lines.

Figure 40:
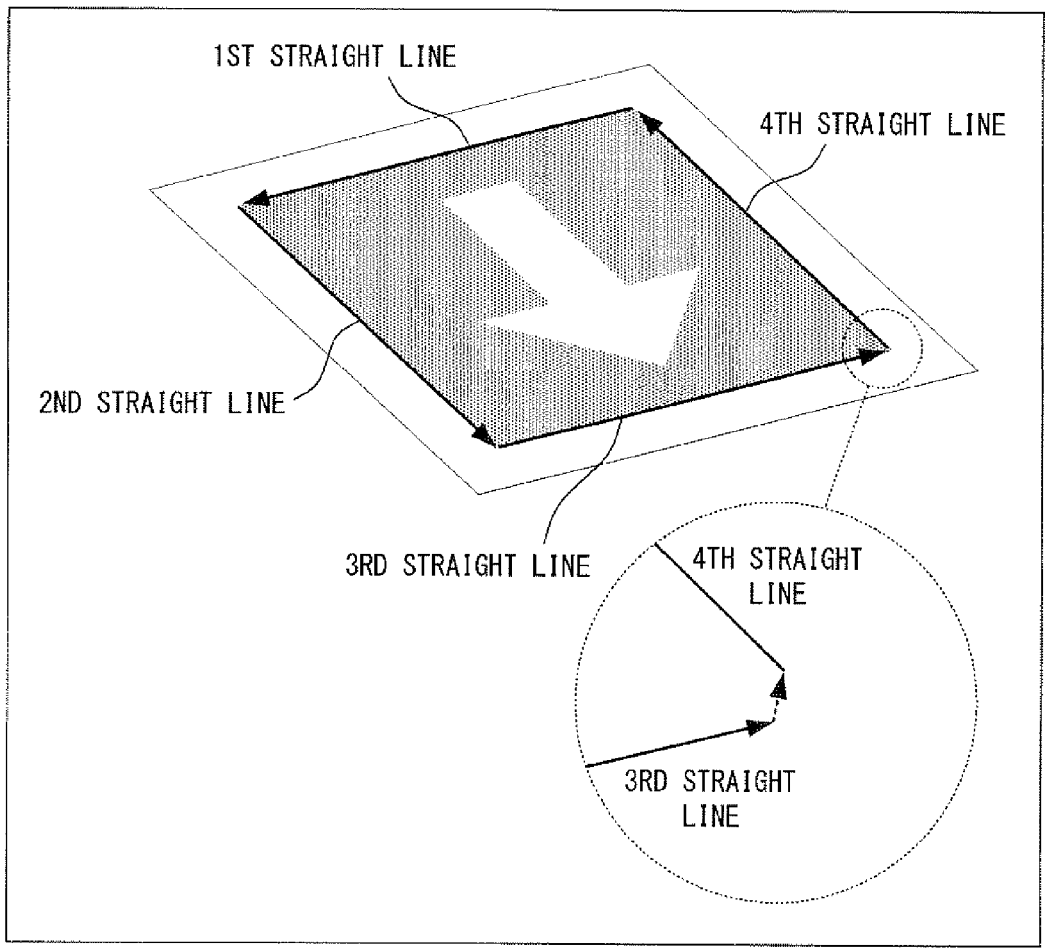
FIG. 40 is a diagram illustrating the straight line calculation process.

For example, in the example of FIG. 37, the straight line A+F, the straight line B, the straight line C, and the straight line E are selected from among five straight lines, namely the straight line A+F and the straight lines B through E, in the straight line selection process (see FIG. 40).

In addition, for example, in the example of FIG. 39, the straight line A', the straight line B+F, the straight line E, and the straight line D are selected from among six straight lines, namely the straight line A', the straight line B+F, the straight lines C through E, and the straight line G, in the straight line selection process.

Figure 41:
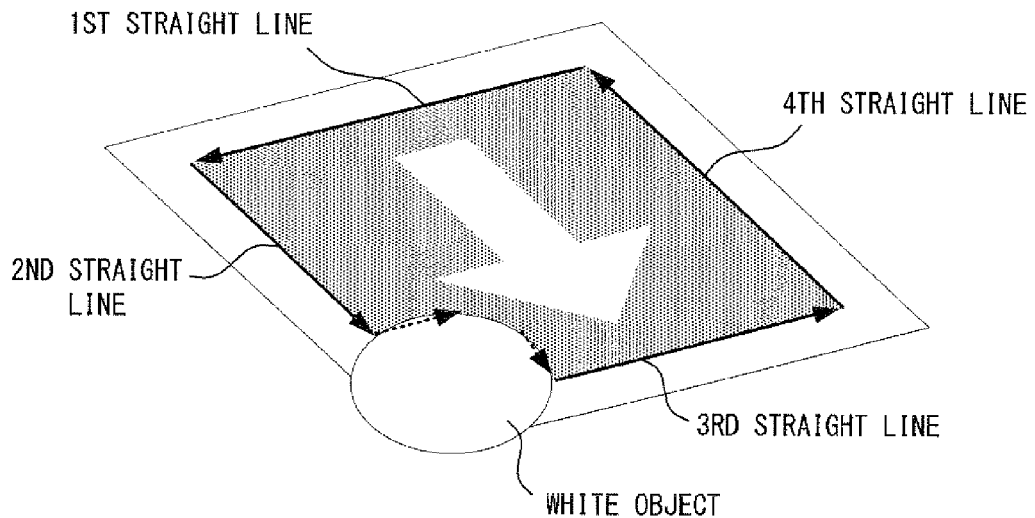
FIG. 41 is a diagram illustrating the straight line calculation process.

In addition, for example, in the example of FIG. 36, the straight line A', the straight line B, the straight line E, and the straight line D are selected from among six straight lines, namely the straight line A' and the straight lines B through F, in the straight line selection process (see FIG. 41).

It should be noted that in the examples of FIGS. 35 and 38, only four straight lines are present, and therefore, these four straight lines are selected in the straight line selection process.

It should be noted that in the straight line selection process, four straight lines are selected because the black area of the marker 50 is rectangular. Accordingly, if the black area of the marker 50 is, for example, hexagonal, six straight lines are selected in the straight line selection process.

When the straight line selection process is completed, the vertex calculation process is subsequently performed. In the vertex calculation process, the positions of the four vertices of the black area of the marker 50 are calculated on the basis of the four straight lines (first through fourth straight lines) selected in the straight line selection process.

Specifically, the position of the intersection of the first straight line and the second straight line is calculated as the position of a first vertex of the black area of the marker 50. The position of the intersection of the second straight line and the third straight line is calculated as the position of a second vertex of the black area of the marker 50. The position of the intersection of the third straight line and the fourth straight line is calculated as the position of a third vertex of the black area of the marker 50. The position of the intersection of the fourth straight line and the first straight line is calculated as the position of a fourth vertex of the black area of the marker 50.

Figure 42:
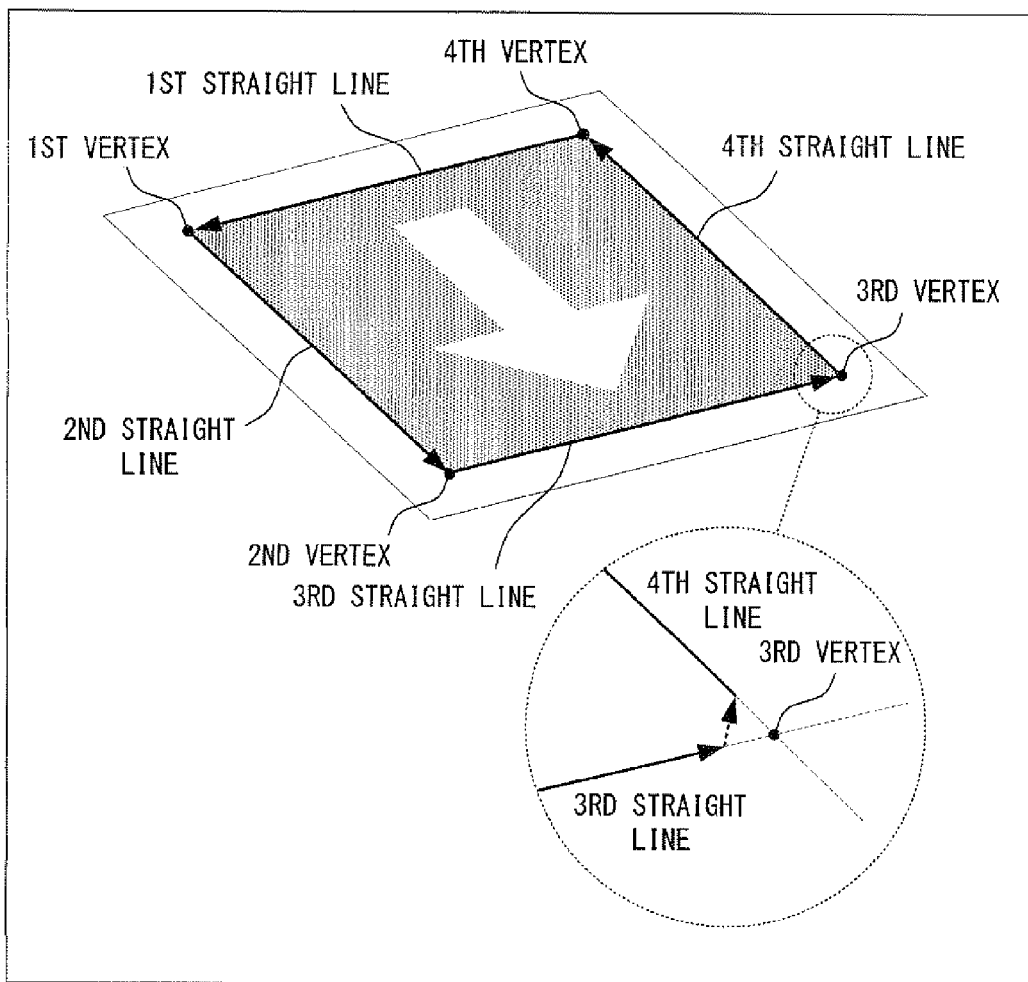
FIG. 42 is a diagram illustrating a vertex calculation process.
Figure 43:
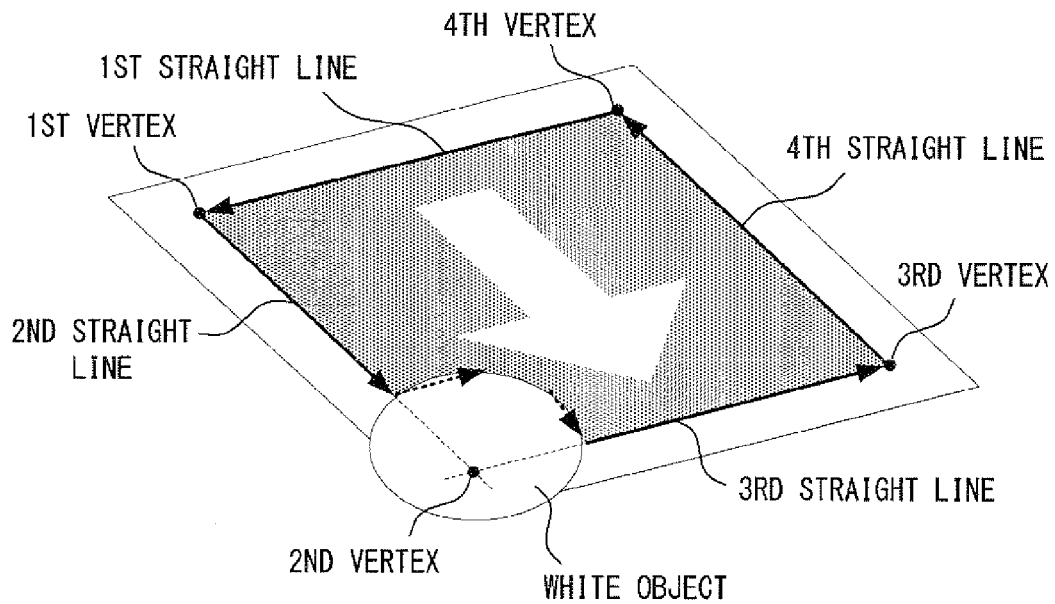
FIG. 43 is a diagram illustrating the vertex calculation process.

For example, in the example of FIG. 40, the positions of the first through fourth vertices are calculated as shown in FIG. 42. Further, for example, in the example of FIG. 41, the positions of the first through fourth vertices are calculated as shown in FIG. 43.

As described above, the four vertices of the black area of the marker 50 in the captured real image are detected through the straight line calculation process, the straight line integration process, the straight line selection process, and the vertex calculation process.

The positions of the vertices thus detected are calculated as the intersections of straight lines generated on the basis of a plurality of edge pixels placed on the same straight line, and therefore have high accuracy. For example, when any one of a series of edge pixels is determined as a vertex, the position of the vertex deviates due, for example, to the effect of environmental light. The position of a vertex detected as described above, however, is calculated on the basis of numerous edge pixels, and therefore, such a deviation does not occur.

(Rough Distinction Process)

Next, the rough distinction process is described. The rough distinction process is a process of, prior to the design distinction process described later, determining whether or not the four vertices detected in the vertex detection process are the four vertices of the marker 50, on the basis of the positional relationships between the four vertices.

In the present embodiment, when exclusion conditions A through D shown below have been satisfied, it is determined that the four vertices detected in the vertex detection process are not the four vertices of the marker 50.

Figure 44:
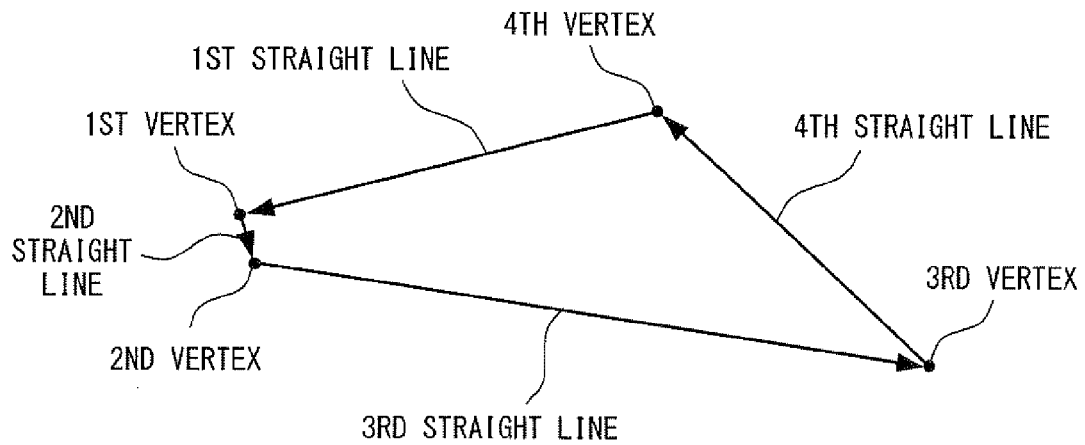
FIG. 44 is a diagram illustrating an exclusion condition A in a rough distinction process.

(Exclusion Condition A) The Case where the Distance Between any Two Adjacent Vertices is Too Small Specifically, the case is: where the distance between the first vertex and the second vertex is smaller than a predetermined threshold (a first minimum acceptable distance); where the distance between the second vertex and the third vertex is smaller than the first minimum acceptable distance; where the distance between the third vertex and the fourth vertex is smaller than the first minimum acceptable distance; or where the distance between the fourth vertex and the first vertex is smaller than the first minimum acceptable distance. For example, in the example of FIG. 44, the distance between the first vertex and the second vertex is too small, and therefore, it is determined that the first through fourth vertices are not the four vertices of the marker 50.

Figure 45:
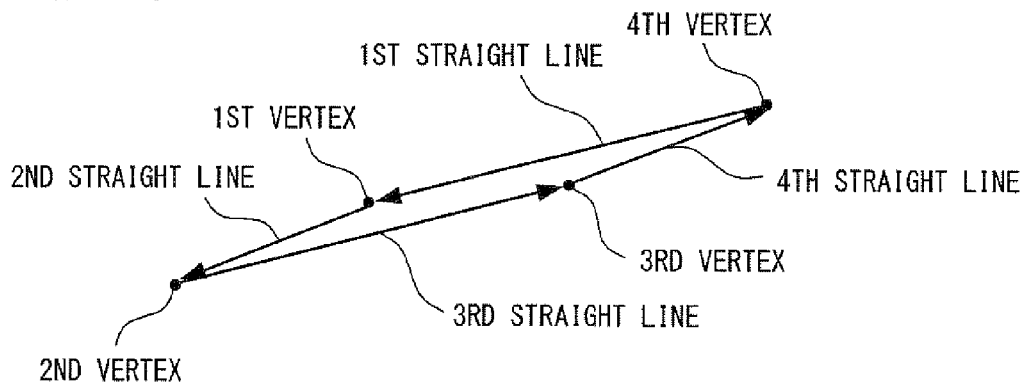
FIG. 45 is a diagram illustrating an exclusion condition B in the rough distinction process.

(Exclusion Condition B) The Case where the Distance Between any Vertex and Either One of the Two Sides not Adjacent to the Vertex is Too Small Specifically, the case is: where the distance between the first vertex and the third straight line is smaller than a predetermined threshold (a second minimum acceptable distance); where the distance between the first vertex and the fourth straight line is smaller than the second minimum acceptable distance; where the distance between the second vertex and the fourth straight line is smaller than the second minimum acceptable distance; where the distance between the second vertex and the first straight line is smaller than the second minimum acceptable distance; where the distance between the third vertex and the first straight line is smaller than the second minimum acceptable distance; where the distance between the third vertex and the second straight line is smaller than the second minimum acceptable distance; where the distance between the fourth vertex and the second straight line is smaller than the second minimum acceptable distance; or where the distance between the fourth vertex and the third straight line is smaller than the second minimum acceptable distance. For example, in the example of FIG. 45, the distance between the first vertex and the third straight line is too small, and therefore, it is determined that the first through fourth vertices are not the four vertices of the marker 50.

Figure 46:
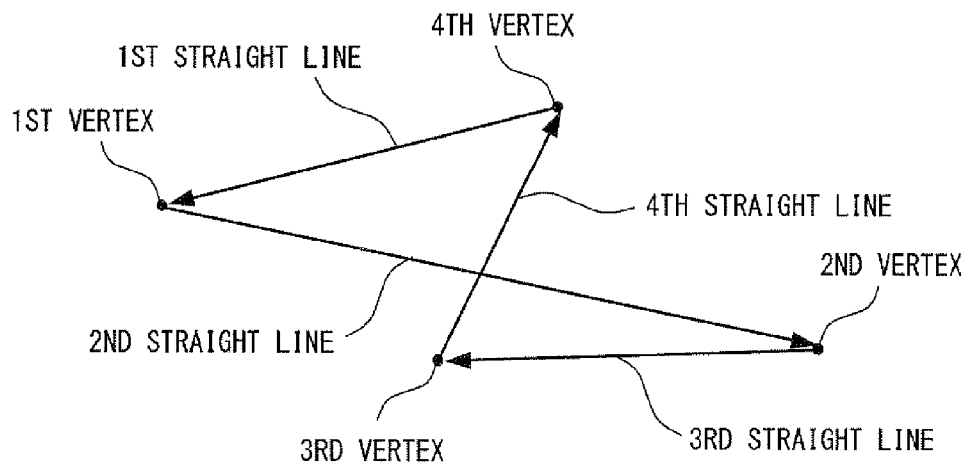
FIG. 46 is a diagram illustrating an exclusion condition C in the rough distinction process.

(Exclusion Condition C) The Case where the Straight Lines (Vectors) of any Two Opposing Sides are Directed in Generally the Same Direction Specifically, the case is: where the first straight line (the vector connecting the fourth vertex to the first vertex) and the third straight line (the vector connecting the second vertex to the third vertex) are directed in generally the same direction; or where the second straight line (the vector connecting the first vertex to the second vertex) and the fourth straight line (the vector connecting the fourth vertex to the first vertex) are directed in generally the same direction. For example, in the example of FIG. 46, the first straight line (the vector connecting the fourth vertex to the first vertex) and the third straight line (the vector connecting the second vertex to the third vertex) are directed in generally the same direction, and therefore, it is determined that the first through fourth vertices are not the four vertices of the marker 50. It should be noted that it is possible to determine whether or not two vectors are directed in generally the same direction, on the basis of the angle between the two vectors, for example, as shown in FIG. 24.

(Exclusion Condition D) The Case where a Concave Angle is Included

Figure 47:
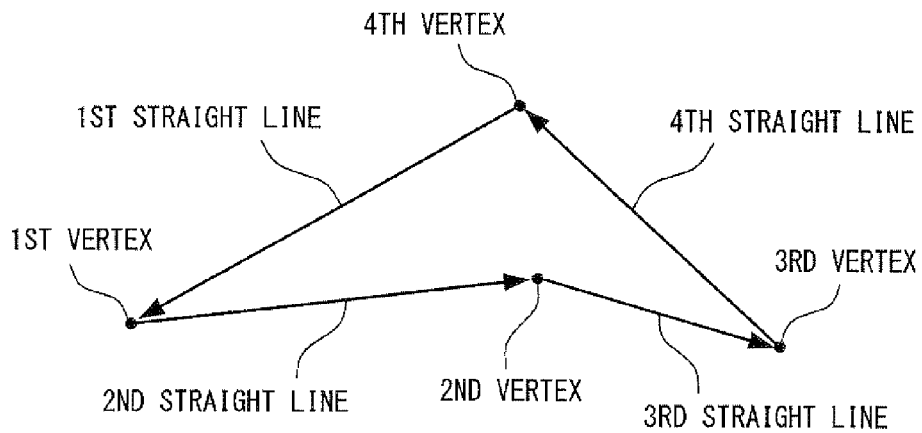
FIG. 47 is a diagram illustrating an exclusion condition D in the rough distinction process.

Specifically, the case is where any one of the first through fourth vertices has a concave angle. For example, in the example of FIG. 47, the second vertex has a concave angle, and therefore, it is determined that the first through fourth vertices are not the four vertices of the marker 50.

It should be noted that in the present embodiment, the rough distinction process is performed on the basis of the exclusion conditions A through D; however, this is merely illustrative. Alternatively, one or more of the exclusion conditions may be used, or an exclusion condition different from these exclusion conditions may be used.

When any of the exclusion conditions A through D are satisfied, it is determined that the four vertices detected in the vertex detection process are not the four vertices of the marker 50, and the detected four vertices are excluded from process objects in the design distinction process described later. This reduces processing load required in the design distinction process.

(Design Distinction Process)

Next, the design distinction process is described. The design distinction process is a process of determining whether or not the design displayed in the area surrounded by the four vertices detected in the vertex detection process is the same as the design drawn in the marker 50.

In the design distinction process, it is determined, using pattern definition data generated in advance on the basis of the design drawn in the marker 50, whether or not the design displayed in the area surrounded by the four vertices detected in the vertex detection process is the same as the design drawn in the marker 50.

Figures 48, 49:
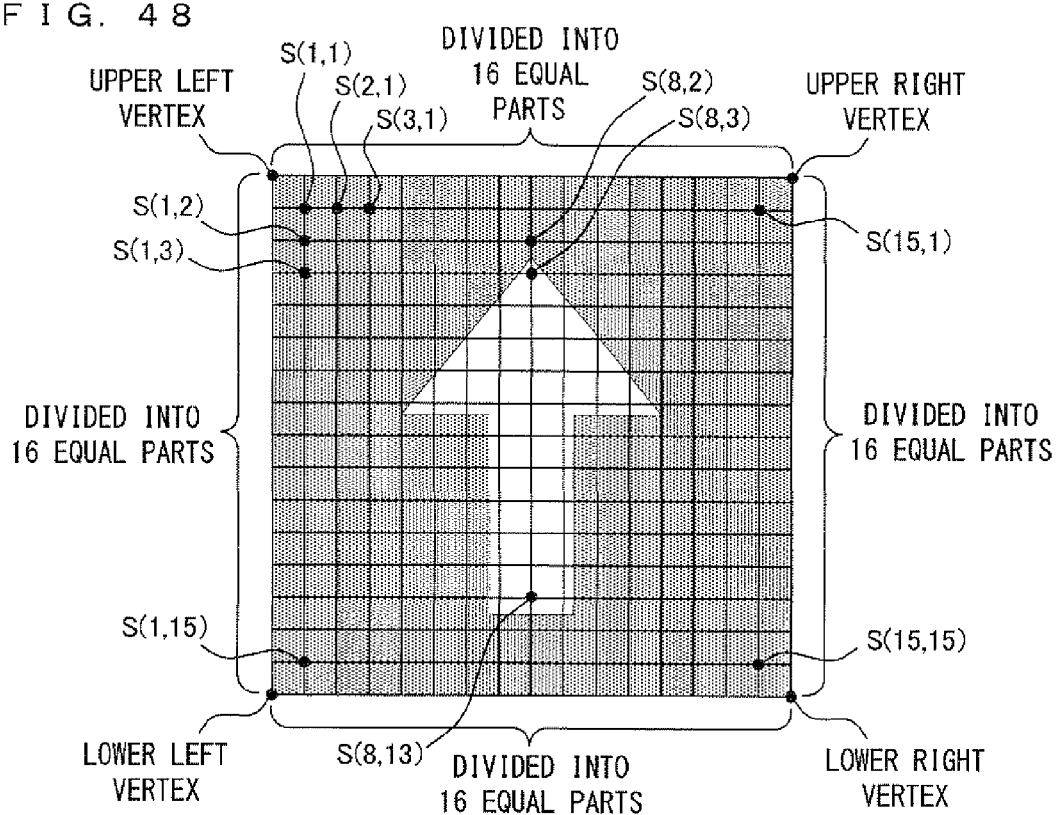
FIG. 48 is a diagram illustrating pattern definition data used in a design distinction process.
FIG. 49 is a diagram illustrating the pattern definition data used in the design distinction process.

The pattern definition data is data representing the design drawn in the marker 50, and, in the present embodiment, is data in which, as shown in FIG. 48, the intersections of the grid generated by dividing each side of the marker 50 into 16 equal parts are used as sample points (S(1, 1) through S(15, 15)), and the pixel values of the sample points in the marker 50 are defined (see FIG. 49). It should be noted that in the present embodiment, each side of the marker 50 is divided into 16 parts; however, this is merely illustrative. The present invention is not limited to division into 16 parts. Further, in the present embodiment, the intersections of the grid generated by dividing each side of the marker 50 into equal parts are used as the sample points. Alternatively, in another embodiment, the centers of the rectangles separated by the grid may be used as the sample points.

In the present embodiment, the intersection closest to the upper left vertex of the marker 50 is the sample point S(1, 1); the intersection closest to the lower left vertex of the marker 50 is the sample point S(1, 15); the intersection closest to the upper right vertex of the marker 50 is the sample point S(15, 1); and the intersection closest to the lower right vertex of the marker 50 is the sample point S(15, 15).

It should be noted that in the example of FIG. 49, the pixel values are defined as "black" or "white" in the columns of the pixel values. Alternatively, in another embodiment, the pixel values may be defined as, for example, color values (RGB value) and luminance values.

Figure 50:
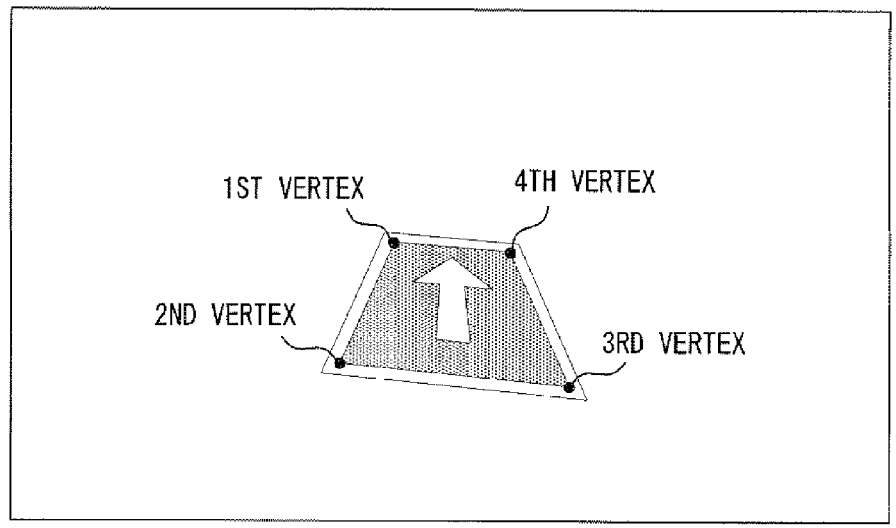
FIG. 50 is a diagram showing a captured real image including the marker 50.

FIG. 50 shows a captured real image including the marker 50. The positions of the first through fourth vertices are calculated by performing the contour detection process and the vertex detection process that are described above on the captured real image.

Figure 51:
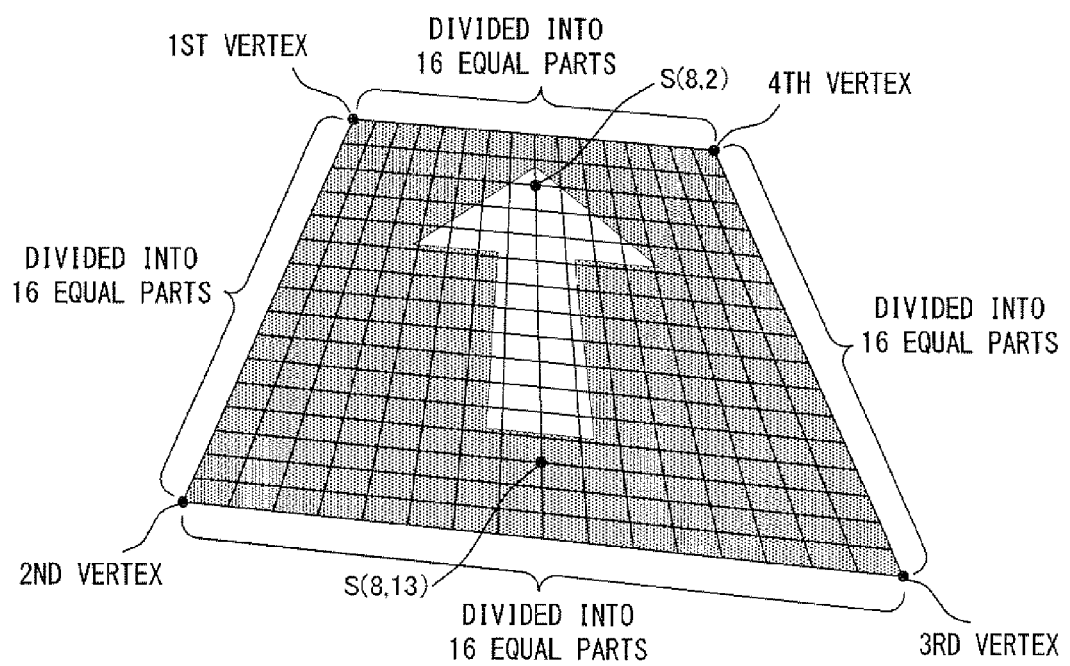
FIG. 51 is a diagram showing an example of a determination method of the positions of sample points in the captured real image.

FIG. 51 shows an example where, in the captured real image, each side of the rectangle surrounded by the first through fourth vertices is divided into 16 equal parts, whereby the positions of the sample points included in the area surrounded by these vertices are determined.

In the design distinction process, the pixel values of the sample points in the captured real image are checked against the pattern definition data (e.g., correlation coefficients are calculated), whereby it is determined whether or not the design displayed in the area surrounded by the first through fourth vertices in the captured real image is the same as the design drawn in the marker 50. However, when the sample points in the captured real image are determined by a method as shown in FIG. 51, it may not be possible to make accurate determinations. For example, the pixel value of the sample point S(8, 2) in the pattern definition data is "black", whereas the pixel value of the sample point S(8, 2) in the captured real image shown in FIG. 51 is "white". Further, the pixel value of the sample point S(8, 13) in the pattern definition data is "white", whereas the pixel value of the sample point S(8, 13) in the captured real image shown in FIG. 51 is "black". As a result, it may be erroneously determined that the marker 50 is not included in the captured real image shown in FIG. 50.

To solve the above problem, it is necessary to devise the determination method of the positions of the sample points in the captured real image. A description is given below of another example of the determination method of the positions of the sample points in the captured real image (a first determination method and a second determination method).

First, with reference to FIGS. 52 through 58, a description is given of the first determination method of determining the positions of the sample points in the captured real image.

In the first determination method, in the rectangle surrounded by the first through fourth vertices: when two opposing sides are parallel (including the case where they are generally parallel) to each other, the two sides are each divided into 16 equal parts; and when two opposing sides are not parallel to each other, the two sides are each divided into 16 unequal parts. The intersections of the grid thus generated are used as the sample points.

Figure 52:
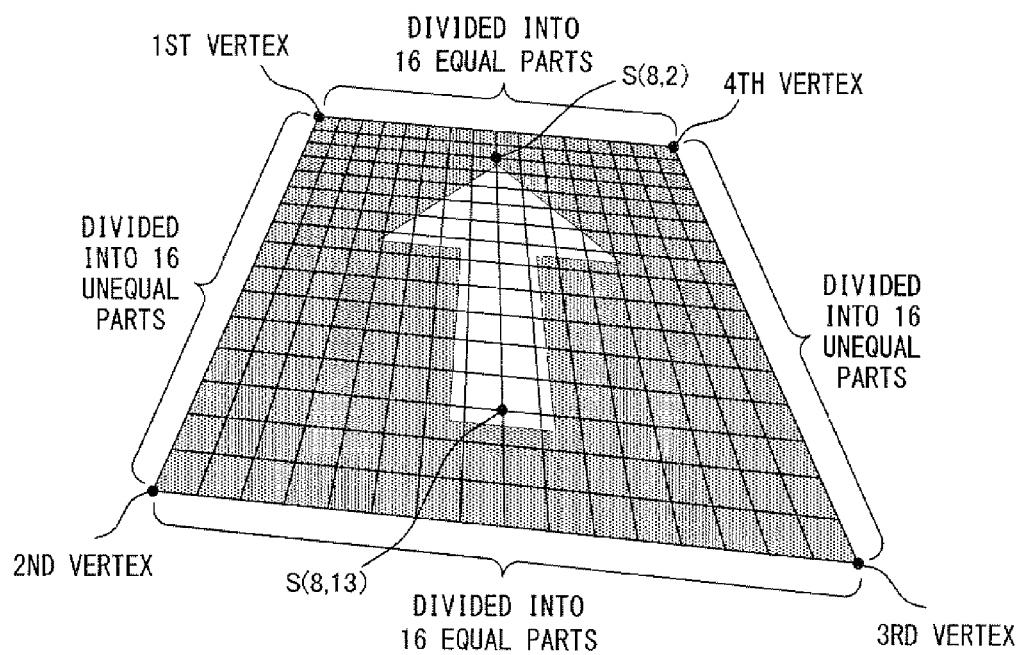
FIG. 52 is a diagram illustrating a first determination method of detettitining the positions of the sample points in the captured real image.

For example, in the example of FIG. 52, the side connecting the first vertex to the fourth vertex and the side connecting the second vertex to the third vertex are parallel to each other, and therefore, the side connecting the first vertex to the fourth vertex and the side connecting the second vertex to the third vertex are each divided into 16 equal parts. On the other hand, the side connecting the first vertex to the second vertex and the side connecting the fourth vertex to the third vertex are not parallel to each other, and therefore, the side connecting the first vertex to the second vertex and the side connecting the fourth vertex to the third vertex are not each divided into 16 equal parts, but are each divided into 16 unequal parts. That is, as shown in FIG. 52, the points dividing the side connecting the first vertex to the second vertex into 16 parts (hereinafter referred to as "division points") are shifted to the first vertex side, as compared to the case where the same side is divided into 16 equal parts. Further, the division points dividing the side connecting the fourth vertex to the third vertex into 16 parts are shifted to the fourth vertex side, as compared to the case where the same side is divided into 16 equal parts.

Figure 53:
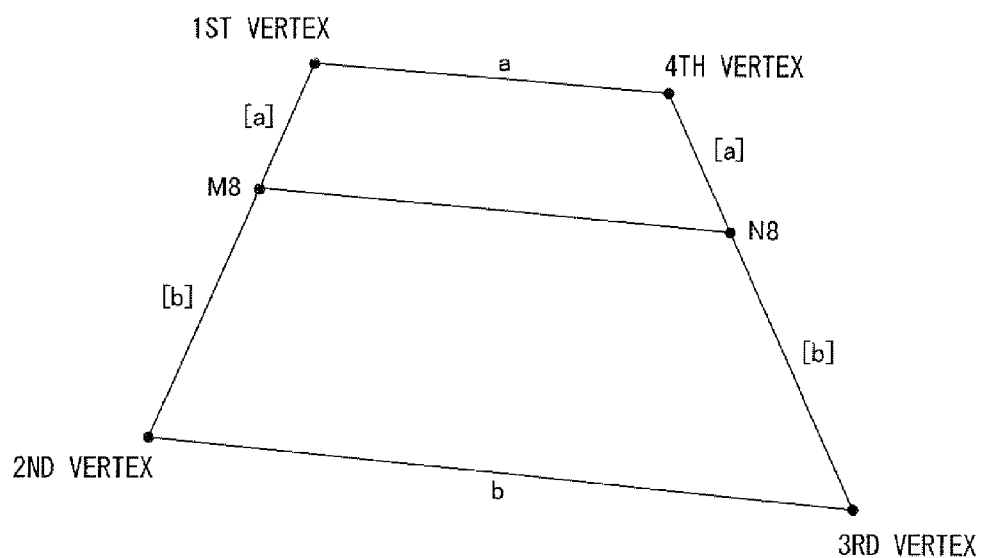
FIG. 53 is a diagram illustrating the first determination method of determining the positions of the sample points in the captured real image.
Figure 54:
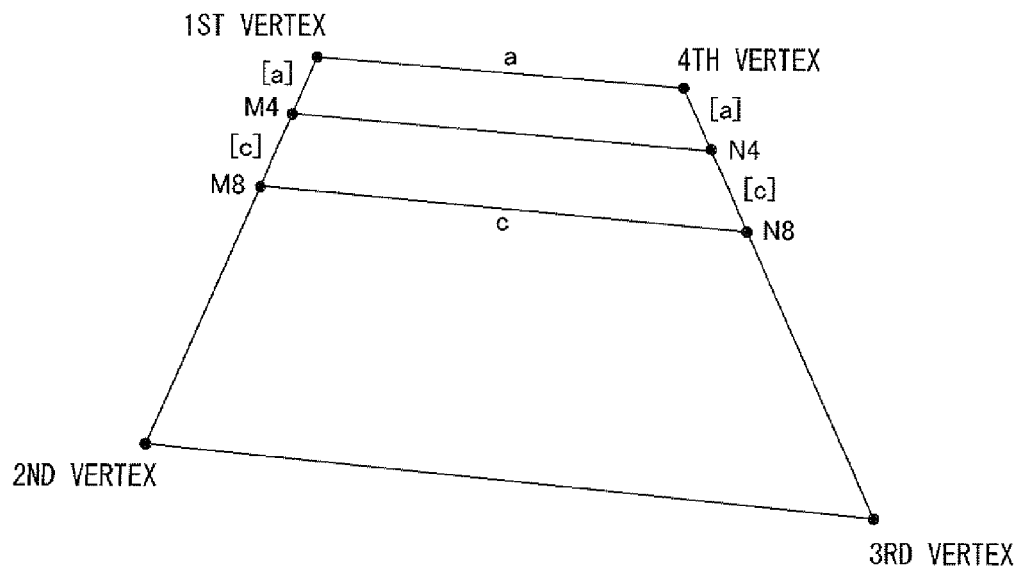
FIG. 54 is a diagram illustrating the first determination method of determining the positions of the sample points in the captured real image.
Figure 55:
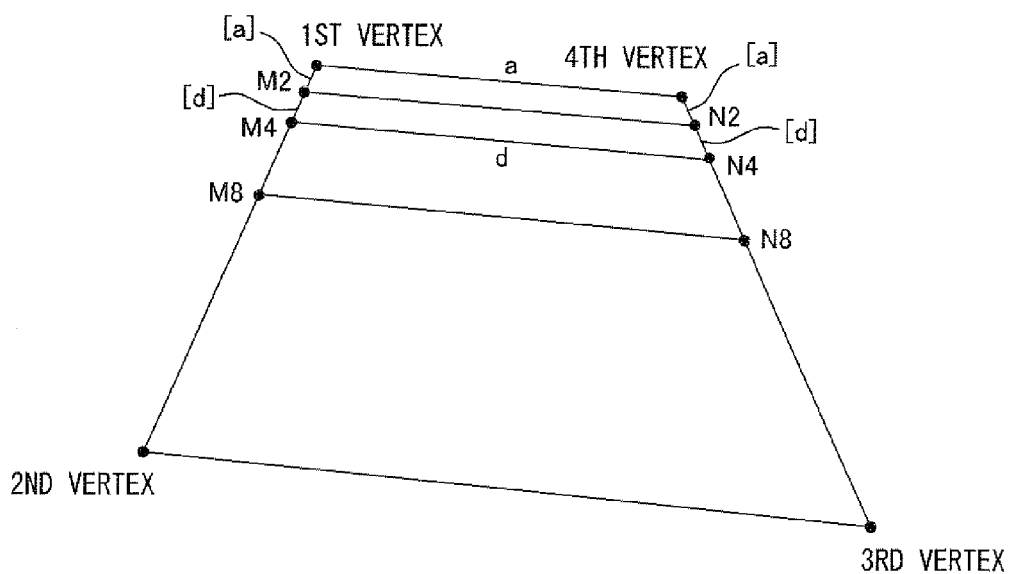
FIG. 55 is a diagram illustrating the first determination method of determining the positions of the sample points in the captured real image.

With reference to FIGS. 53 through 55, a description is given below of an example of the determination method of the division points on the side connecting the first vertex to the second vertex, and the division points on the side connecting the fourth vertex to the third vertex, in FIG. 52.

It should be noted that in the following descriptions, the 15 division points dividing the side connecting the first vertex to the second vertex into 16 parts are referred to as a "first division point M1", a "second division point M2", a "third division point M3" . . . , and a "fifteenth division point M15", in the order from the point closer to the first vertex. Similarly, the 15 division points dividing the side connecting the fourth vertex to the third vertex into 16 parts are referred to as a "first division point N1", a "second division point N2", a "third division point N3" . . . , and a "fifteenth division point N15", in the order from the point closer to the fourth vertex.

First, as shown in FIG. 53, the eighth division point M8 and the eighth division point N8 are determined. Specifically, first, the distance between the first vertex and the fourth vertex and the distance between the second vertex and the third vertex are calculated. Then, when the distance between the first vertex and the fourth vertex is a and the distance between the second vertex and the third vertex is b, the point dividing, in a ratio of a:b, the straight line connecting the first vertex to the second vertex, and the point dividing, in a ratio of a:b, the straight line connecting the fourth vertex to the third vertex are calculated. Then, the first calculated point is determined as the eighth division point M8, and the second calculated point is determined as the eighth division point N8. As a result, the eighth division point M8 is determined at a position closer to the first vertex than the midpoint of the first vertex and the second vertex is. The eighth division point N8 is determined at a position closer to the fourth vertex than the midpoint of the fourth vertex and the third vertex is.

Next, as shown in FIG. 54, the fourth division point M4 and the fourth division point N4 are determined. Specifically, first, the distance between the eighth division point M8 and the eighth division point N8 is calculated. Then, when the calculated distance is c, the point dividing, in a ratio of a:c, the straight line connecting the first vertex to the eighth division point M8, and the point dividing, in a ratio of a:c, the straight line connecting the fourth vertex to the eighth division point N8 are calculated. Then, the first calculated point is determined as the fourth division point M4, and the second calculated point is determined as the fourth division point N4. As a result, the fourth division point M4 is determined at a position closer to the first vertex than the midpoint of the first vertex and the eighth division point M8 is. The fourth division point N4 is determined at a position closer to the fourth vertex than the midpoint of the fourth vertex and the eighth division point N8 is.

Next, as shown in FIG. 55, the second division point M2 and the second division point N2 are determined. Specifically, first, the distance between the fourth division point M4 and the fourth division point N4 is calculated. Then, when the calculated distance is d, the point dividing, in a ratio of a:d, the straight line connecting the first vertex to the fourth division point M4, and the point dividing, in a ratio of a:d, the straight line connecting the fourth vertex to the fourth division point N4 are calculated. Then, the first calculated point is determined as the second division point M2, and the second calculated point is determined as the second division point N2. As a result, the second division point M2 is determined at a position closer to the first vertex than the midpoint of the first vertex and the fourth division point M4 is. The second division point N2 is determined at a position closer to the fourth vertex than the midpoint of the fourth vertex and the fourth division point N4 is.

Subsequently, similarly, the remaining division points (the first division point M1, the third division point M3, the firth division point M5 through the seventh division point M7, the ninth division point M9 through the fifteenth division point M15, the first division point N1, the third division point N3, the fifth division point N5 through the seventh division point N7, and the ninth division point N9 through the fifteenth division point N15) are determined, and the sample points as shown in FIG. 52 are ultimately determined.

Figure 56:
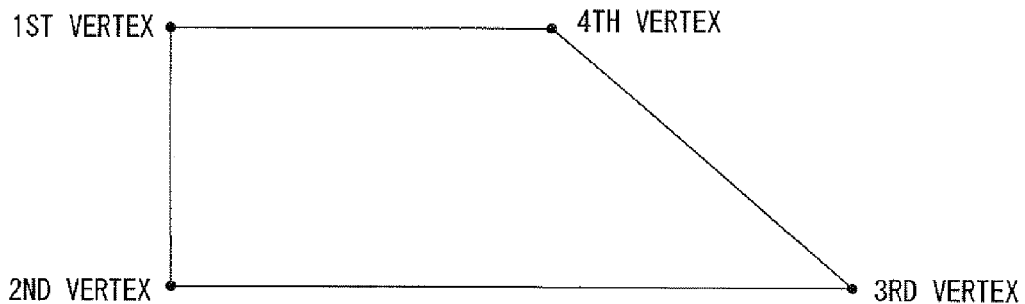
FIG. 56 is a diagram illustrating the first determination method of determining the positions of the sample points in the captured real image.
Figure 57:
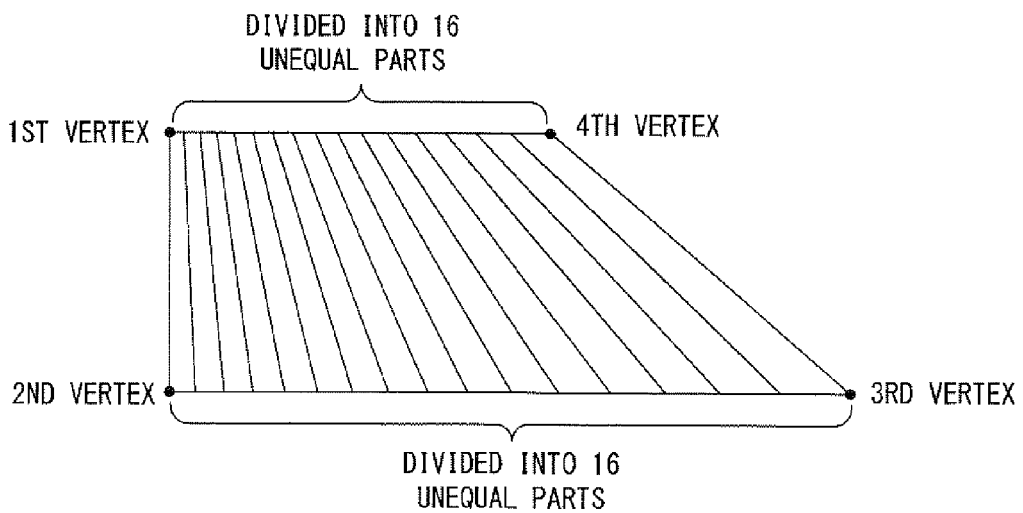
FIG. 57 is a diagram illustrating the first determination method of determining the positions of the sample points in the captured real image.
Figure 58:
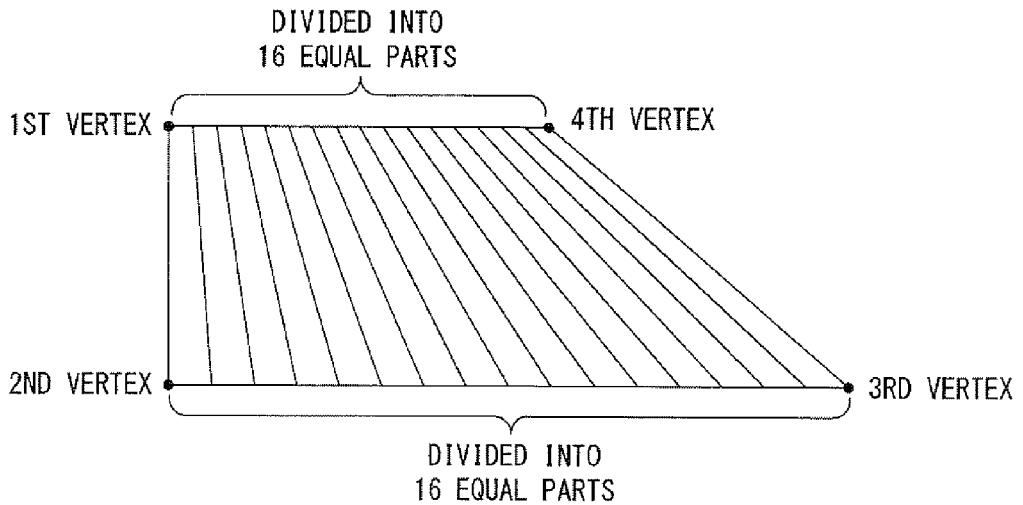
FIG. 58 is a diagram illustrating the first determination method of determining the positions of the sample points in the captured real image.

It should be noted that in the first determination method, when two opposing sides of the rectangle surrounded by the first through fourth vertices are parallel to each other, the two sides are divided into 16 equal parts. With reference to FIGS. 56 through 58, the reason for this is explained below.

When the first through fourth vertices as shown in FIG. 56 have been detected in the captured real image, the side connecting the first vertex to the fourth vertex and the side connecting the second vertex to the third vertex are parallel to each other. In such a case, if these sides are divided into 16 parts using the method shown in FIGS. 53 through 55, the division points dividing the side connecting the first vertex to the fourth vertex are placed closer to the first vertex as a whole, and the division points dividing the side connecting the second vertex to the third vertex are placed closer to the second vertex as a whole, as shown in FIG. 57.

However, when in the captured real image, the marker 50 is displayed in the shape as shown in FIG. 56 (i.e., when the side connecting the first vertex to the fourth vertex and the side connecting the second vertex to the third vertex are parallel to each other), the distance between the camera and the first vertex and the distance between the camera and the fourth vertex are almost the same. Similarly, the distance between the camera and the second vertex and the distance between the camera and the third vertex are almost the same. Accordingly, in such a case, as shown in FIG. 58, the division of the side connecting the first vertex to the fourth vertex into 16 equal parts, and the division of the side connecting the second vertex to the third vertex into 16 equal parts, make it possible to determine the positions of the sample points at more appropriate positions.

Figure 59:
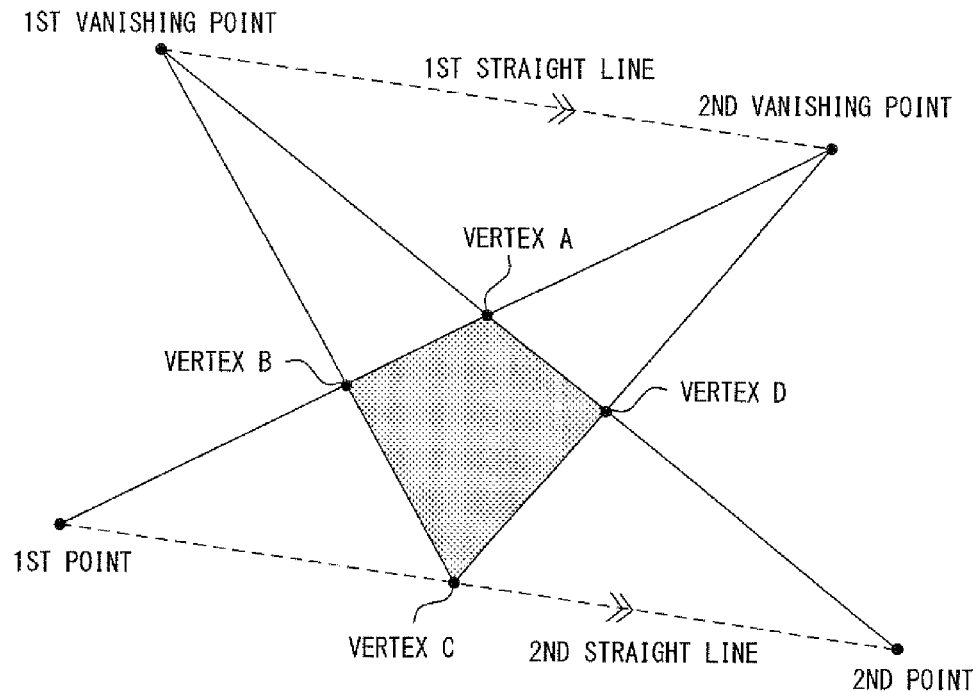
FIG. 59 is a diagram illustrating a second determination method of determining the positions of the sample points in the captured real image.
Figure 60:
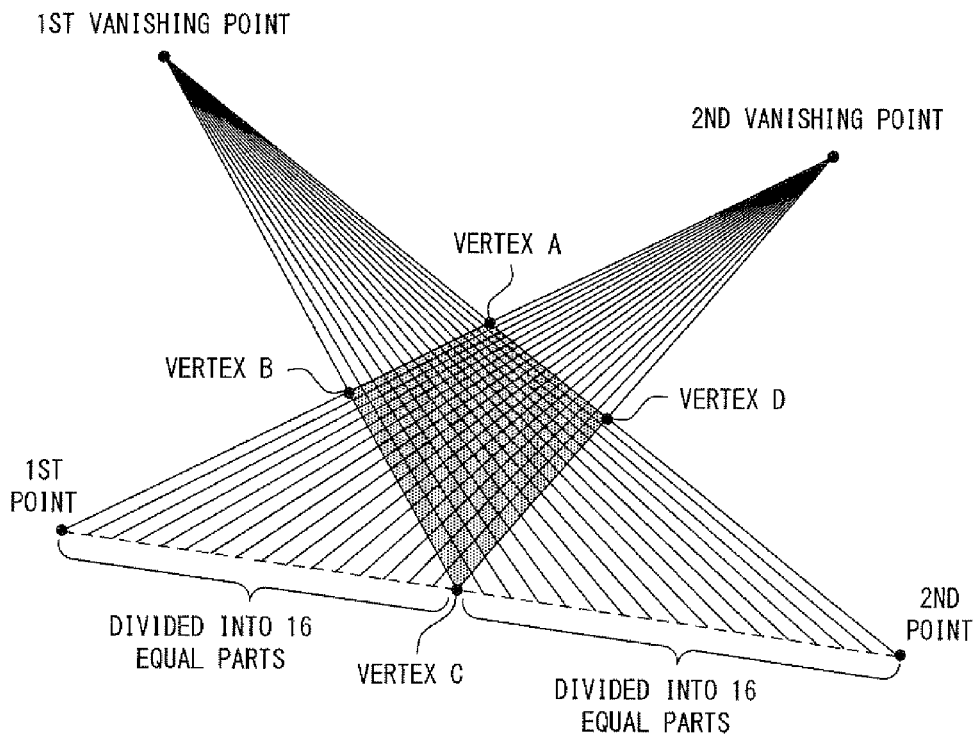
FIG. 60 is a diagram illustrating the second determination method of determining the positions of the sample points in the captured real image.

Next, with reference to FIGS. 59 and 60, a description is given of the second determination method of determining the positions of the sample points in the captured real image.

In the second determination method, as shown in FIG. 59, first, pairs of two opposing sides of the rectangle surrounded by the four vertices detected in the vertex detection process are extended, and the intersections of the respective pairs of two opposing sides (a first vanishing point and a second vanishing point) are calculated. In the following descriptions, among the four vertices detected in the vertex detection process, the vertex closest to the straight line connecting the first vanishing point to the second vanishing point (a first straight line) is referred to as a "vertex A", and the remaining vertices are referred to as a "vertex B", a "vertex C", and a "vertex D", counterclockwise from the vertex A.

Next, a straight line passing through the vertex C and parallel to the straight line (first straight line) connecting the first vanishing point to the second vanishing point (a second straight line) is calculated. Then, the intersection of a straight line passing through the vertices A and B and the second straight line (a first point), and the intersection of a straight line passing through the vertices A and D and the second straight line (a second point) are calculated.

Next, as shown in FIG. 60, 15 division points dividing the straight line connecting the first point to the vertex C into 16 equal parts are calculated, and the calculated division points are connected to the second vanishing point. Similarly, 15 division points dividing the straight line connecting the vertex C to the second point into 16 equal parts are calculated, and the calculated division points are connected to the first vanishing point. The intersections thus generated are determined as the sample points in the captured real image.

According to the result of verification carried out by the present inventor, it has been confirmed that the employment of the second determination method makes it possible to determine the sample points in the captured real image more appropriately than the first determination method. Even the first determination method, however, has a great advantage over the method shown in FIG. 51, and therefore, a designer may appropriately determine whether to employ the first determination method or the second determination method, taking into account conditions, such as a required detection accuracy and the complexity of the design of the marker 50.

As in the first determination method and the second determination method, the sample points in the captured real image are determined by dividing each side of at least one pair of two opposing sides into unequal parts, whereby it is possible to distinguish the marker 50 more accurately than the method shown in FIG. 51.

It should be noted that the method of dividing each side of two opposing sides into unequal parts is not limited to the first determination method and the second determination method, and another method may be employed.

It should be noted that, immediately after the vertex detection process, it is not possible to determine which vertex among the first through fourth vertices detected in the vertex detection process corresponds to which vertex among the upper left vertex, the lower left vertex, the lower right vertex, and the upper right vertex of the marker 50. Accordingly, there are the following four possible cases: where the first vertex corresponds to the upper left vertex; where the first vertex corresponds to the lower left vertex; where the first vertex corresponds to the lower right vertex; and where the first vertex corresponds to the upper right vertex. Thus, in the design distinction process, the pixel values of the sample points in the captured real image in each of these four cases are checked against the pattern definition data. As a result, in the captured real image, the coordinates of the upper left vertex, the coordinates of the lower left vertex, the coordinates of the lower right vertex, and the coordinates of the upper right vertex are detected, and the detected coordinates are stored in the main memory 32 as marker position information.

In the game apparatus 10, on the basis of captured real images sequentially acquired in real time from the camera, the contour detection process, the vertex detection process, the rough distinction process, and the design distinction process are performed in a predetermined cycle (e.g., in a cycle of 1/60 seconds) and repeated. This makes it possible to detect in real time the position of the marker 50 in the captured real image.

However, due, for example, to the manner of the application of light to the marker 50, even though the marker 50 is displayed in the captured real image, the detection of the contour and the vertices of the marker 50 in the captured real image may temporarily fail. When the detection of the contour and the vertices of the marker 50 has temporarily failed, for example, in the state shown in FIG. 4, the virtual object 60 temporarily disappears even though the user has not moved the game apparatus 10. If the virtual object 60 frequently disappears and appears, the user's interest is dampened.

In the present embodiment, to prevent such an unfavorable phenomenon (an unintended change in the position of the marker), when the detection of the contour and the vertices of the marker 50 has failed in the current captured real image, the design distinction process is performed on the current captured real image on the basis of the positions of the vertices (or the sample points) of the marker 50 detected from the most recent captured real image. It should be noted that the "current captured real image" means the captured real image that is currently being processed, and does not necessarily mean the latest captured real image captured by the camera.

Figure 61:
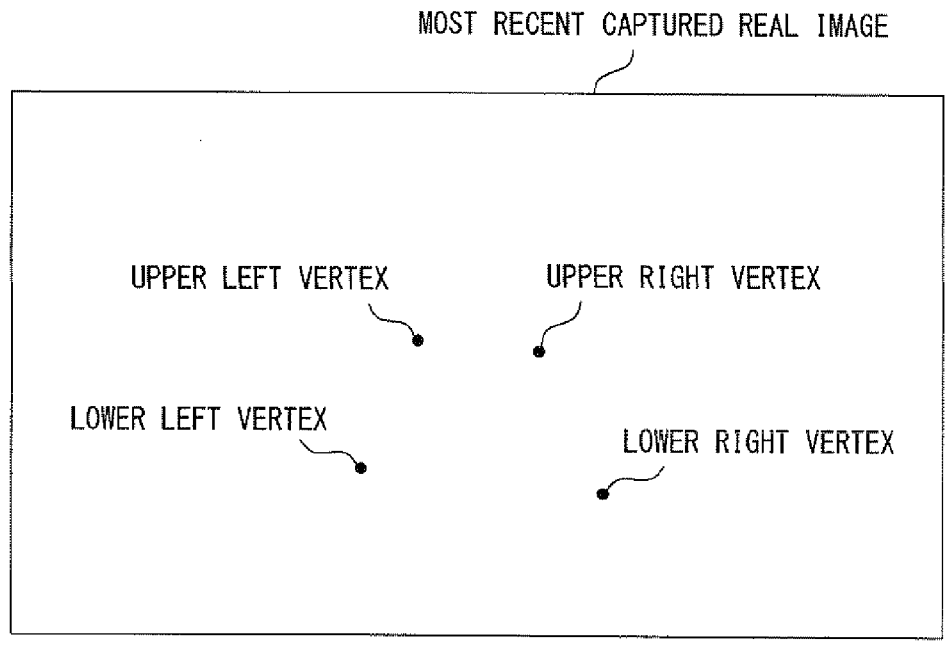
FIG. 61 is a diagram illustrating the design distinction process performed when the contours and the vertices of the marker have not been detected from a current captured real image.
Figure 62:
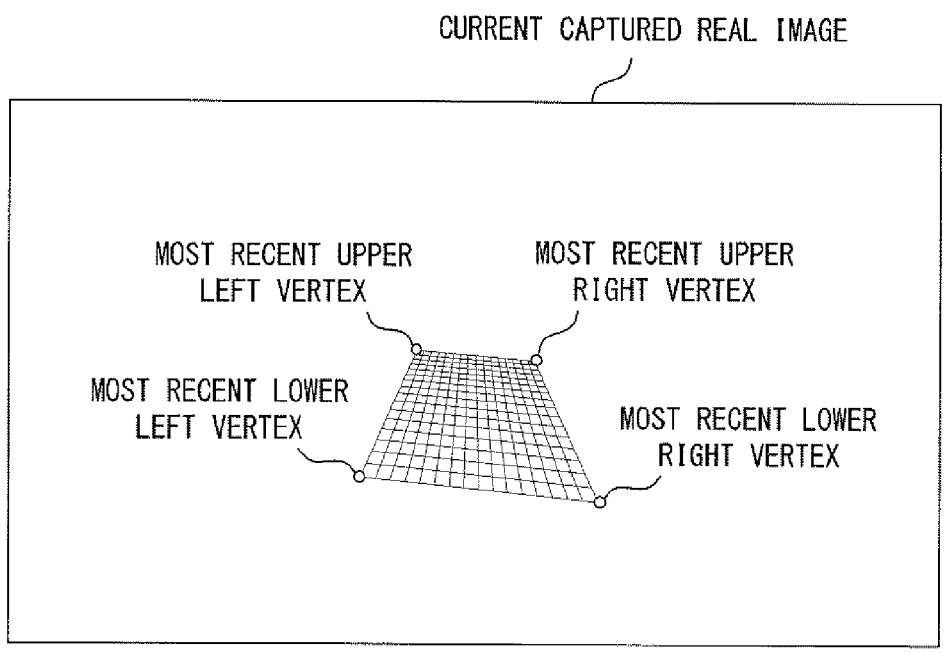
FIG. 62 is a diagram illustrating the design distinction process performed when the contours and the vertices of the marker have not been detected from the current captured real image.

Specifically, when the detection of the contour and the vertices of the marker 50 has failed in the current captured real image, the positions of the four vertices of the marker 50 detected from the most recent captured real image (or the sample points determined on the basis of the four vertices) are, as shown in FIG. 61, acquired from the marker position information stored in the main memory 32. Then, as shown in FIG. 62, on the basis of the positions of the four vertices of the marker 50 detected from the most recent captured real image, the positions of the sample points in the current captured real image are determined, and the design distinction process is performed using the pixel values of the sample points thus determined (or the sample points determined in the previous design distinction process). As a result of the design distinction process, when it is determined that in the current captured real image, the marker 50 is present at the same position as that in the most recent captured real image, the coordinates of the four vertices of the marker 50 in the most recent captured real image are stored in the main memory 32 as marker position information corresponding to the current captured real image.

By the process as described above, in the case where the user has not moved the game apparatus 10, even if the detection of the contour and the vertices of the marker 50 in the captured real image has temporarily failed, it is possible to detect the position of the marker 50. Accordingly, as described above, it is possible to prevent the virtual object 60 from frequently disappearing and appearing even though the user has not moved the game apparatus 10.

It should be noted that the position of the marker 50 in the current captured real image may be slightly shifted from the position of the marker 50 in the most recent captured real image. In response, in another embodiment, the design distinction process may be performed not only on the position of the marker 50 in the most recent captured real image, but also on the range near the position of the marker 50 in the most recent captured real image. For example, the design distinction process may be performed multiple times while slightly shifting the positions of the four vertices of the marker 50 detected from the most recent captured real image. Then, among these results, the positions of the four vertices having the highest degree of similarity to the pattern definition data may be determined as the positions of the four vertices of the marker 50 in the current captured real image.

It should be noted that in the present embodiment, when the detection of the contour and the vertices of the marker 50 in the current captured real image has failed, the design distinction process is performed on the current captured real image on the basis of the positions of the vertices (or the sample points) of the marker 50 detected from the most recent captured real image; however, the present invention is not limited to this. Alternatively, the design distinction process may be performed on the current captured real image on the basis of the positions of the vertices (or the sample points) of the marker 50 detected from another given captured real image obtained prior to the current captured real image (i.e., on the basis of marker position information corresponding to another given captured real image, the information already stored in the main memory 32).

It should be noted that in the present embodiment, when the detection of the contour and the vertices of the marker 50 in the current captured real image has failed, the design distinction process is performed on the current captured real image on the basis of the positions of the vertices (or the sample points) of the marker 50 detected from the most recent captured real image. Such a process is not limited to the case of performing the design distinction process using the pattern matching technique shown in FIGS. 48 through 60, but is also effective in the case of performing the design distinction process using another given known pattern matching technique.

(Marker Position Correction Process)

Next, the marker position correction process is described. The marker position correction process is a process of appropriately correcting the position of the marker 50 detected in the design distinction process (i.e., the positions of the four vertices of the black area of the marker 50).

Before specifically describing the marker position correction process, first, a description is given of problems that may arise if the marker position correction process is not performed.

As described above, the position of the marker 50 in the captured real image is detected on the basis of the result of the contour detection process performed on the captured real image. In the contour detection process, edge pixels are detected by comparing the edge determination threshold to the luminance value of each pixel. Here, when a pixel is present that has a luminance value very close to the edge determination threshold, the pixel may be, for example, determined as a black area in a captured real image, and then determined as a white area in the next captured real image. This can occur even when the camera (i.e., the game apparatus 10) has not been moved at all. This is because the luminance value of each pixel can slightly vary over time due, for example, to environmental light. When the results of the contour detection process vary, the position of the marker 50 ultimately detected in the captured real image also varies. Accordingly, for example, the position and the orientation of the virtual object 60 shown in FIG. 4 vary even though the user has not moved the game apparatus 10. That is, the virtual space image seems to deviate. To prevent (or reduce) such an unfavorable phenomenon, in the present embodiment, the marker position correction process is performed.

Figures 63, 64:
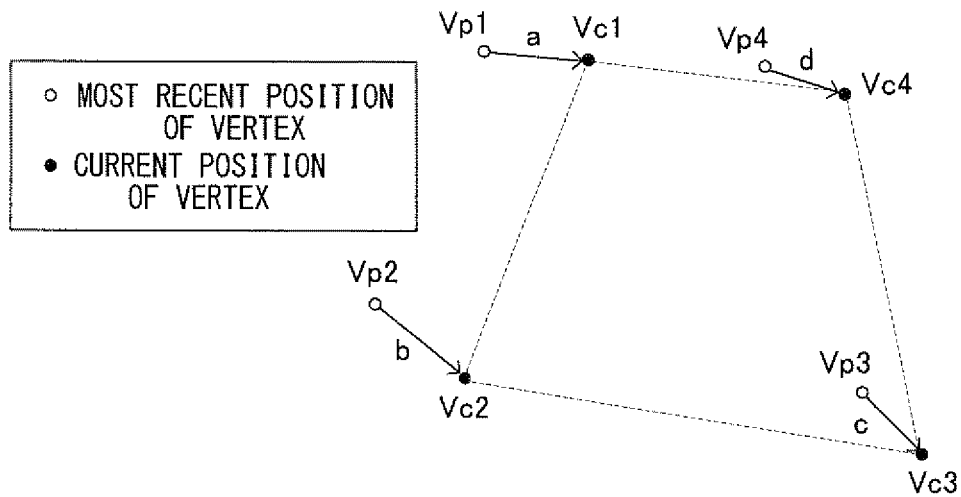
FIG. 63 is a diagram illustrating a marker position correction process.
FIG. 64 is a diagram illustrating the marker position correction process.

In the marker position correction process, first, the amount of movement of the marker 50 in the captured real image is calculated on the basis of the position of the marker 50 detected from the most recent captured real image and the position of the marker 50 detected from the current captured real image. With reference to FIG. 63, a description is given of an example of the calculation method of the amount of movement of the marker 50 in the captured real image.

As shown in FIG. 63, the upper left vertex of the marker 50 detected from the most recent captured real image is Vp1; the lower left vertex is Vp2; the lower right vertex is Vp3; and the upper right vertex is Vp4. The upper left vertex of the marker 50 detected from the current captured real image is Vc1; the lower left vertex is Vc2; the lower right vertex is Vc3; and the upper right vertex is Vc4. Then, the distance between Vp1 and Vc1 is a; the distance between Vp2 and Vc2 is b; the distance between Vp3 and Vc3 is c; and the distance between Vp4 and Vc4 is d. In this case, the amount of movement of the marker 50 in the captured real image is $a^2+b^2+c^2 \, d^2$ ("^" represents power).

It should be noted that the calculation method described above is merely illustrative, and the calculation method of the amount of movement of the marker 50 in the captured real image is not limited to this.

When the amount of movement of the marker 50 in the captured real image has been calculated, subsequently, the position of the marker 50 detected in the design distinction process is corrected on the basis of the calculated amount of movement. With reference to FIG. 64, a description is given of the correction method of the position of the marker 50.

When the amount of movement of the marker 50 is less than D1, the positions of the vertices Vc (Vc1 through Vc4 shown in FIG. 63) of the marker 50 in the current captured real image are corrected to the positions of the vertices Vp (Vp1 through Vp4 shown in FIG. 63) that have been previously detected. It should be noted that D1 is a predetermined threshold, and as described later, the value of D1 varies depending on the size of the marker 50 in the captured real image.

When the amount of movement of the marker 50 is D1 or greater but less than D2, the positions of the vertices Vc (Vc1 through Vc4 shown in FIG. 63) of the marker 50 in the current captured real image are corrected to the positions calculated by Vp×A+Vc×(1−A). It should be noted that D2 is a predetermined threshold greater than D1, and as described later, the value of D2 varies depending on the size of the marker 50 in the captured real image. Further, A is a predetermined value greater than 0 but less than 1, and as described later, the value of A varies depending on the motion vector of the marker 50.

When the amount of movement of the marker 50 is D2 or greater, the positions of the vertices Vc (Vc1 through Vc4 shown in FIG. 63) of the marker 50 in the current captured real image are not corrected.

As described above, when the amount of movement of the marker 50 is less than D1 (i.e., the amount of movement of the marker 50 is very small), it is determined that the marker 50 has not moved at all from the position of the marker 50 in the most recent captured real image. Accordingly, it is possible to prevent an unintended change in the position of the marker, and consequently, it is possible to prevent a deviation in the virtual space image.

Figure 65:
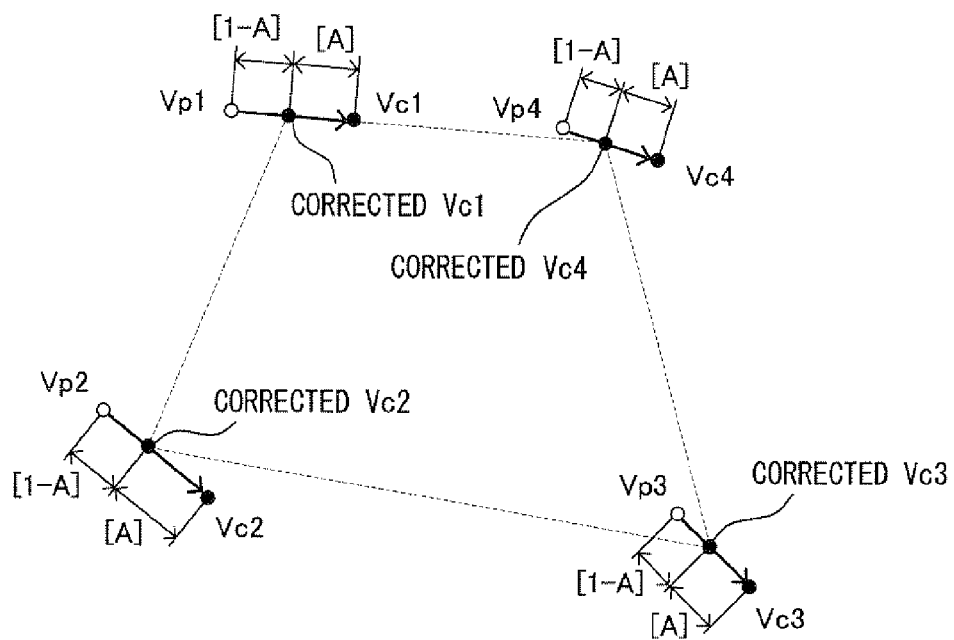
FIG. 65 is a diagram illustrating the marker position correction process.

In addition, when the amount of movement of the marker 50 is D1 or greater but less than D2 (i.e., the amount of movement of the marker 50 is small), as shown in FIG. 65, the position of the marker 50 is corrected to a position on the line segments connecting the position of the marker 50 in the most recent captured real image to the position of the marker 50 in the current captured real image (i.e., points internally dividing the line segments connecting Vp to Vc, respectively, in a ratio of (1−A):A). Accordingly, it is possible to reduce an unintended change in the position of the marker as described above, and consequently, it is possible to reduce a deviation in the virtual space image. Further, unlike the case where the amount of movement of the marker 50 is less than D1, the corrected position of the marker 50 is a position closer to the position of the marker 50 in the current captured real image than to the position of the marker 50 in the most recent captured real image. Thus, when the user has moved the game apparatus 10 by a small amount (or slowly), the position of the marker 50 (i.e., the position of the virtual object 60) is updated in accordance with the motion of the game apparatus 10, while reducing an unintended change in the position of the marker.

It should be noted that when the amount of movement of the marker 50 is D2 or greater (i.e., when the amount of movement of the marker 50 is large), the position of the marker 50 is not corrected. Accordingly, when the user has moved the game apparatus 10 rapidly by a large amount, the position of the marker 50 is updated in immediate response to such a rapid motion of the game apparatus 10. Thus, for example, the virtual object 60 shown in FIG. 4 is not displayed so as to be shifted significantly from the marker 50.

Next, a description is given of the determination method of the thresholds D1 and D2 described above.

Figure 66:
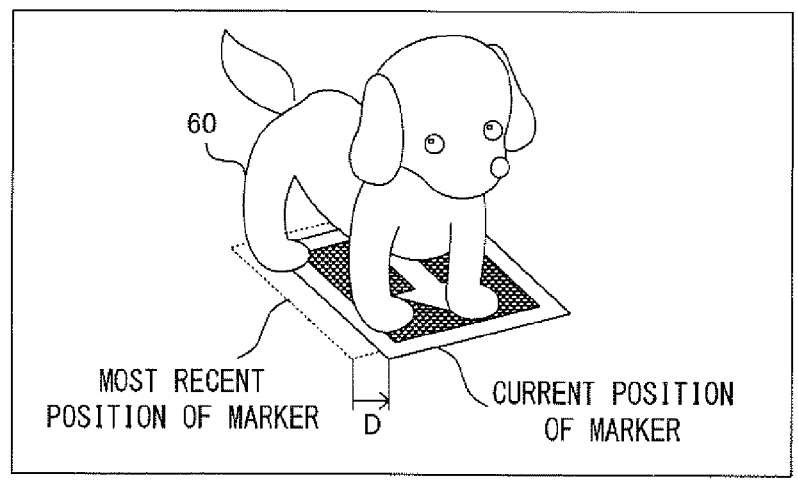
FIG. 66 is a diagram for explaining the reason why the sizes of a threshold D1 and a threshold D2 are changed in accordance with the size of the marker in a captured real image.
Figures 67, 68, 69:
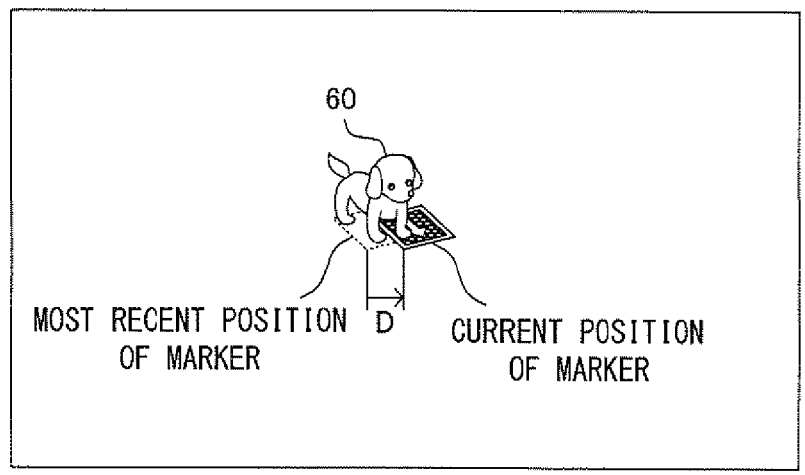
FIG. 67 is a diagram for explaining the reason why the sizes of the threshold D1 and the threshold D2 are changed in accordance with the size of the marker in the captured real image.
FIG. 68 is a diagram showing a determination method of the threshold D1.
FIG. 69 is a diagram showing a determination method of the threshold D2.

As described above, the thresholds D1 and D2 are thresholds for determining the level of the amount of movement of the marker 50 in the captured real image (i.e., very small, small, or large), and these thresholds are preferably changed depending on the size of the marker 50 in the captured real image. With reference to FIGS. 66 and 67, the reason for this is explained below.

FIG. 66 is an example where the virtual object 60 is displayed at the most recent position of the marker when the size of the marker 50 in the captured real image is large (i.e., when the position of the marker 50 is close to the camera in the real world). Here, the distance (the distance in the captured real image) between the most recent position of the marker and the current position of the marker is D. In this case, it seems to the user that the virtual object 60 is not shifted significantly from the current position of the marker.

FIG. 67 is an example where the virtual object 60 is displayed at the most recent position of the marker (i.e., the position of the marker 50 in the most recent captured real image) when the size of the marker 50 in the captured real image is small (i.e., when the position of the marker 50 is far from the camera in the real world). Here, the distance (the distance in the captured real image) between the most recent position of the marker and the current position of the marker is also D, as in FIG. 66. In this case, it seems to the user that the virtual object 60 is shifted significantly from the current position of the marker.

As is clear from FIGS. 66 and 67, even when the distance (the distance in the captured real image) between the most recent position of the marker and the current position of the marker is the same, it seems to the user that the smaller the size of the marker 50 in the captured real image is, the more significantly the most recent position of the marker is shifted from the current position of the marker.

In response, as shown in FIG. 68, it is preferable that the value of D1 should be increased when the size of the marker 50 in the captured real image is large, and the value of D1 should be decreased when the size of the marker 50 in the captured real image is small. That is, it is preferable that the smaller the size of the marker 50 in the captured real image, the smaller the value of the D1.

Similarly, as shown in FIG. 69, it is preferable that the value of D2 should be increased when the size of the marker 50 in the captured real image is large, and the value of D2 should be decreased when the size of the marker 50 in the captured real image is small. That is, it is preferable that the smaller the size of the marker 50 in the captured real image, the smaller the value of D2.

It should be noted that various possible methods can be used as the calculation method of the size of the marker 50 in the captured real image. For example, the area of the marker 50 in the captured real image may be calculated as the size of the marker 50 in the captured real image. In another embodiment, the size of the cross product of the two diagonals of the marker 50 in the captured real image may be calculated as the size of the marker 50 in the captured real image. In yet another embodiment, the diameter of a circle including the four vertices of the marker 50 in the captured real image may be calculated as the size of the marker 50 in the captured real image. In yet another embodiment, the size of the marker 50 in the captured real image may be calculated on the basis of the width in the X-axis direction and the width in the Y-axis direction of the marker 50 in the captured real image.

Next, a description is given of the determination method of the predetermined value A.

As described above, when the amount of movement of the marker 50 is D1 or greater but less than D2, the position of the marker 50 is, as shown in FIG. 65, corrected to the points internally dividing, in a ratio of (1−A):A, the line segments connecting the position of the marker 50 in the most recent captured real image to the position of the marker 50 in the current captured real image.

Here, when the value of A is fixed to a small value (e.g., 0.1), the position of the marker 50 is corrected to almost the same position as the position of the marker 50 in the most recent captured real image. Accordingly, the responsiveness decreases, and even when the position of the marker 50 in the captured real image changes, the position of the virtual object 60 does not significantly change. Thus, a problem arises where, for example, when the user has moved the game apparatus 10 slowly and continuously in a desired direction, the virtual object 60 seems to be clearly shifted from the marker 50.

Conversely, when the value of A is fixed to a large value (e.g., 0.9), the position of the marker 50 is corrected to almost the same position as the position of the marker 50 in the current captured real image. Accordingly, although the responsiveness increases, a problem arises where the effect of reducing an unintended change in the position of the marker as described above is greatly impaired.

In the present embodiment, to solve both of the above two problems, the value of A is varied in accordance with the motion vector of the marker 50.

Specifically, on the basis of the position of the marker 50 in a captured real image (e.g., the positions of the vertices of the marker 50) and the position of the marker 50 in the most recent captured real image, motion vectors indicating in which direction the marker 50 has moved are sequentially calculated and sequentially stored in the main memory 32. Then, on the basis of a newly calculated motion vector and a motion vector calculated in the past and stored in the main memory 32, it is determined whether or not the marker 50 is continuously moving in a constant direction (which may be a generally constant direction) in the captured real image.

When the marker 50 is continuously moving in a constant direction, the value of A is increased. If not, the value of A is decreased.

The variation of the value of A as described above improves the responsiveness, for example, while the user is moving the game apparatus 10 slowly in a desired direction. Accordingly, the virtual object 60 does not seem to be shifted significantly from the marker 50. Further, the responsiveness decreases in other situations, and therefore, the effect of reducing an unintended change in the position of the marker as described above is sufficiently exerted.

It should be noted that in the present embodiment, as shown in FIG. 64, the correction method of the position of the marker 50 (e.g., the positions of the four vertices) is switched between: the case where the amount of movement of the marker 50 is less than D1; the case where the amount of movement of the marker 50 is D1 or greater but less than D2; and the case where the amount of movement of the marker 50 is D2 or greater. This is, however, merely illustrative, and the correction method of the position of the marker 50 is not limited to this.

For example, as another embodiment, as shown in FIG. 70, when the amount of movement of the marker 50 is less than D3, the position of the marker 50 detected on the basis of the current captured real image may be corrected to the position of the marker 50 in the most recent captured real image. When the amount of movement of the marker 50 is D3 or greater, the position of the marker 50 detected on the basis of the current captured real image may be used as it is without being corrected. This makes it possible to prevent an unintended change in the position of the marker. It should be noted that D3 is a predetermined threshold, and therefore, the value of D3 may vary in accordance with the size of the marker 50 in the captured real image.

In addition, as yet another embodiment, as shown in FIG. 71, when the amount of movement of the marker 50 is less than D4, the position of the marker 50 detected on the basis of the current captured real image may be corrected to the points internally dividing, in a ratio of (1−A):A, the line segments connecting the position of the marker 50 in the most recent captured real image to the position of the marker 50 in the current captured real image. When the amount of movement of the marker 50 is D4 or greater, the position of the marker 50 detected on the basis of the current captured real image may be used as it is without being corrected. This makes it possible to reduce an unintended change in the position of the marker. It should be noted that D4 is a predetermined threshold, and therefore, the value of D4 may vary in accordance with the size of the marker 50 in the captured real image.

It should be noted that the marker position correction process is, as described above, performed using the amount of movement of the marker 50 and the motion vector of the marker 50. However, when a plurality of markers of the same design are included in the captured real image, it is necessary to determine where each marker has moved to. For example, as shown in FIG. 72, when a plurality of markers (a marker A and a marker B) of the same design as each other have been detected from the most recent captured real image and a plurality of markers (a first marker and a second marker) of the same design as the above have been detected from the current captured real image, it is necessary to determine the correspondence relationships between the markers.

In the present embodiment, the distance between a representative point of each marker detected from the most recent captured real image and a representative point of the corresponding marker detected from the current captured real image is calculated. When the distance is smaller than a predetermined threshold, it is determined that the two markers correspond to each other. As a representative point of each marker, for example, the coordinates obtained by averaging the coordinates of the four vertices of the marker can be used.

A specific description is given with reference to FIG. 72. First, the distance between the representative point of the marker A and the representative point of the first marker is calculated. When the distance is smaller than a predetermined threshold (it is preferable that the larger the size of the marker A or the first marker in the captured real image, the greater the threshold), it is determined that the marker A and the first marker correspond to each other.

Similarly, the distance between the representative point of the marker A and the representative point of the second marker is calculated. When the distance is smaller than a predetermined threshold (it is preferable that the larger the size of the marker A or the second marker in the captured real image, the greater the threshold), it is determined that the marker A and the second marker correspond to each other.

Yet similarly, the distance between the representative point of the marker B and the representative point of the first marker is calculated. When the distance is smaller than a predetermined threshold (it is preferable that the larger the size of the marker B or the first marker in the captured real image, the greater the threshold), it is determined that the marker B and the first marker correspond to each other.

Yet similarly, the distance between the representative point of the marker B and the representative point of the second marker is calculated. When the distance is smaller than a predetermined threshold (it is preferable that the larger the size of the marker B or the second marker in the captured real image, the greater the threshold), it is determined that the marker B and the second marker correspond to each other.

The determinations of the correspondence relationships between the markers as described above make it possible that even when a plurality of markers of the same design are included in the captured real image, the amount of movement and the motion vector of each marker are calculated.

It should be noted that when a plurality of markers of different designs are included in the captured real image, it is possible to determine the correspondence relationships between the markers on the basis of the designs.

It should be noted that in the marker position correction process described above, the amount of movement of the marker 50 in the captured real image is calculated on the basis of the position of the marker 50 detected from the most recent captured real image and the position of the marker 50 detected from the current captured real image; however, the present invention is not limited to this. Alternatively, for example, the amount of movement of the marker 50 in the captured real image may be calculated on the basis of the position of the marker 50 detected from a given captured real image acquired prior to the current captured real image (e.g., a captured real image acquired two images before the current captured real image) and the position of the marker 50 detected from the current captured real image.

As described above, the position of the marker 50 (e.g., the positions of the four vertices of the black area of the marker 50) is detected from the captured real image through the contour detection process, the vertex detection process, the rough distinction process, the design distinction process, and the marker position correction process. Then, the positional relationship between the camera (the outer capturing section (left) 23*a* or the outer capturing section (right) 23*b*) and the marker 50 in real space is calculated on the basis of the position of the marker 50 thus detected. The positional relationship between the virtual camera and the virtual object 60 in the virtual space is set on the basis of the calculation result. Then, the virtual space image is generated on the basis of the virtual camera, the virtual space image is combined with a captured real image captured by the camera, and the combined image is displayed on the upper LCD 22.

Next, a specific description is given of the flow of the image recognition process performed by the CPU 311 on the basis of the image recognition program.

Figure 73:
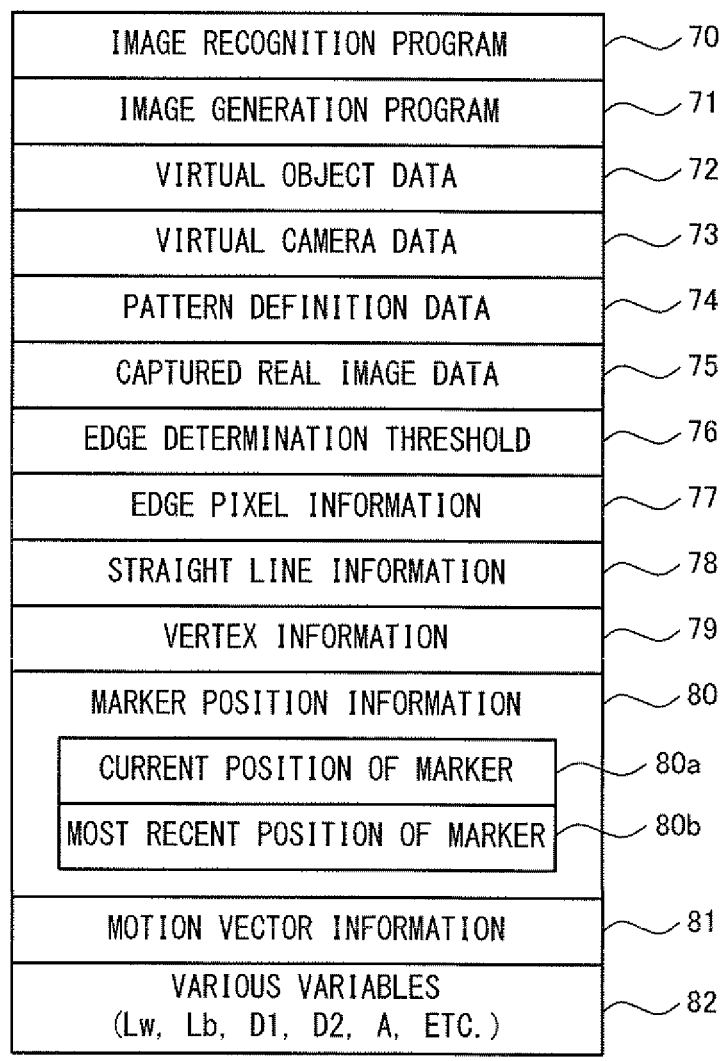
FIG. 73 is a memory map of a main memory 32.

FIG. 73 shows programs and data stored in the main memory 32.

The main memory 32 stores an image recognition program 70, an image generation program 71, virtual object data 72, virtual camera data 73, pattern definition data 74, captured real image data 75, an edge determination threshold 76, edge pixel information 77, straight line information 78, vertex information 78, marker position information 80, motion vector information 81, and various variables 82.

The image recognition program 70 is a computer program for detecting a marker from a captured real image. The image generation program 71 is a computer program for combining the captured real image with a virtual space image on the basis of the position of the marker detected on the basis of the image recognition program. These programs may be loaded into the main memory 32 from the data storage internal memory 35, or may be loaded into the main memory 32 from the external memory 44, or may be loaded into the main memory 32 from a server device or another game apparatus through the wireless communication module 36 or the local communication module 37. It should be noted that the image generation process performed by the CPU 311 on the basis of the image generation program 71 may use a known technique, and has little relevance to the present invention, and therefore is not described in detail in the present specification. Further, the image recognition program 70 and the image generation program 71 may be configured as one image processing program.

The virtual object data 72 is data concerning, for example, the shape, the color, and the pattern of the virtual object 60 placed in the virtual space.

The virtual camera data 73 is data concerning, for example, the position and the orientation of the virtual camera placed in the virtual space.

The pattern definition data 74 is data indicating the design of the marker 50, the data used to distinguish the marker 50 and stored in advance (FIG. 49).

The captured real image data 75 is image data of a captured real image captured by the camera (the outer capturing section (left) 23*a* or the outer capturing section (right) 23*b*).

The edge determination threshold 76 is a threshold for, in the contour detection process, determining whether or not each pixel of the captured real image is an edge pixel.

The edge pixel information 77 is information about a pixel determined as an edge pixel in the contour detection process.

The straight line information 78 is information about a straight line generated or updated in the straight line calculation process.

The vertex information 78 is information about a vertex calculated in the vertex calculation process.

The marker position information 80 is information indicating the position of the marker 50 (the positions of the four vertices of the black area of the marker 50) in the captured real image, the information generated in the vertex detection process and updated where necessary in the marker position correction process. The marker position information 80 includes not only information (80*a*) indicating the position of the marker 50 detected from the current captured real image, but also information (80*b*) indicating the position of the marker 50 detected from the most recent captured real image.

The motion vector information 81 is information indicating the motion vector indicating the direction in which the marker 50 has moved.

The various variables 82 are various variables (e.g., the white area luminance value Lw, the black area luminance value Lb, the threshold D1, the threshold D2, and the predetermined value A) used when the image recognition program 70 and the image generation program 71 are executed.

Figure 74:
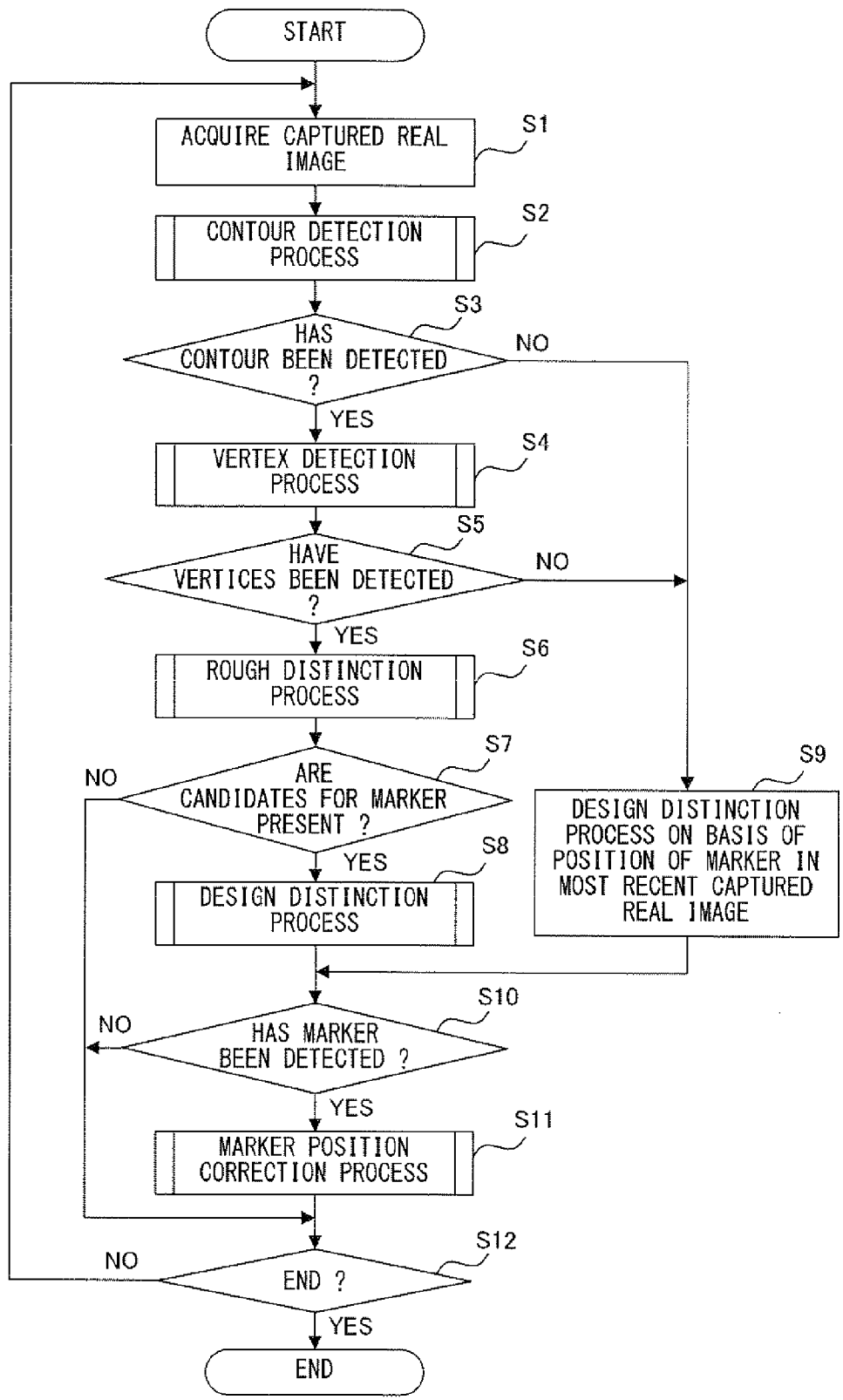
FIG. 74 is a flow chart showing the overall flow of an image recognition process.

First, with reference to FIG. 74, a description is given of the overall flow of the image recognition process performed by the CPU 311 on the basis of the image recognition program.

In step S1, the CPU 311 acquires a captured real image captured by the camera (the outer capturing section (left) 23*a* or the outer capturing section (right) 23*b*), and stores the acquired captured real image in the main memory 32.

In step S2, the CPU 311 performs the contour detection process. A specific flow of the contour detection process will be described later with reference to FIG. 75.

In step S3, the CPU 311 determines whether or not the contour has been detected in the contour detection process in step S2. When the contour has been detected, the processing proceeds to step S4. If not, the processing proceeds to step S9.

In step S4, the CPU 311 performs the vertex detection process. A specific flow of the vertex detection process will be described later with reference to FIG. 76.

In step S5, the CPU 311 determines whether or not the vertices have been detected in the vertex detection process in step S4. When the vertices have been detected, the processing proceeds to step S6. If not, the processing proceeds to step S9.

In step S6, the CPU 311 performs the rough distinction process. A specific flow of the rough distinction process will be described later with reference to FIG. 77.

In step S7, on the basis of the result of the rough distinction process in step S6, the CPU 311 determines whether or not vertices to be candidates for the marker 50 are present. When vertices to be candidates for the marker 50 have been detected, the processing proceeds to step S8. If not, the processing proceeds to step S12.

In step S8, the CPU 311 performs the design distinction process. A specific flow of the design distinction process will be described later with reference to FIG. 78.

In step S9, the CPU 311 performs the design distinction process on the basis of the position of the marker 50 in the most recent captured real image (i.e., the positions of the vertices detected in the most recent captured real image or the positions of the sample points determined in the most recent captured real image).

In step S10, the CPU 311 determines whether or not the marker 50 has been detected in the design distinction process in step S8 or step S9. When the marker 50 has been detected, the processing proceeds to step S11. If not, the processing proceeds to step S12.

In step S11, the CPU 311 performs the marker position correction process. A specific flow of the marker position correction process will be described later with reference to FIG. 79.

In step S12, the CPU 311 determines whether or not the image recognition process is to be ended. When the image recognition process is to be continued, the processing returns to step S1. When the image recognition process is to be ended, the CPU 311 ends the execution of the image recognition program.

Figure 75:
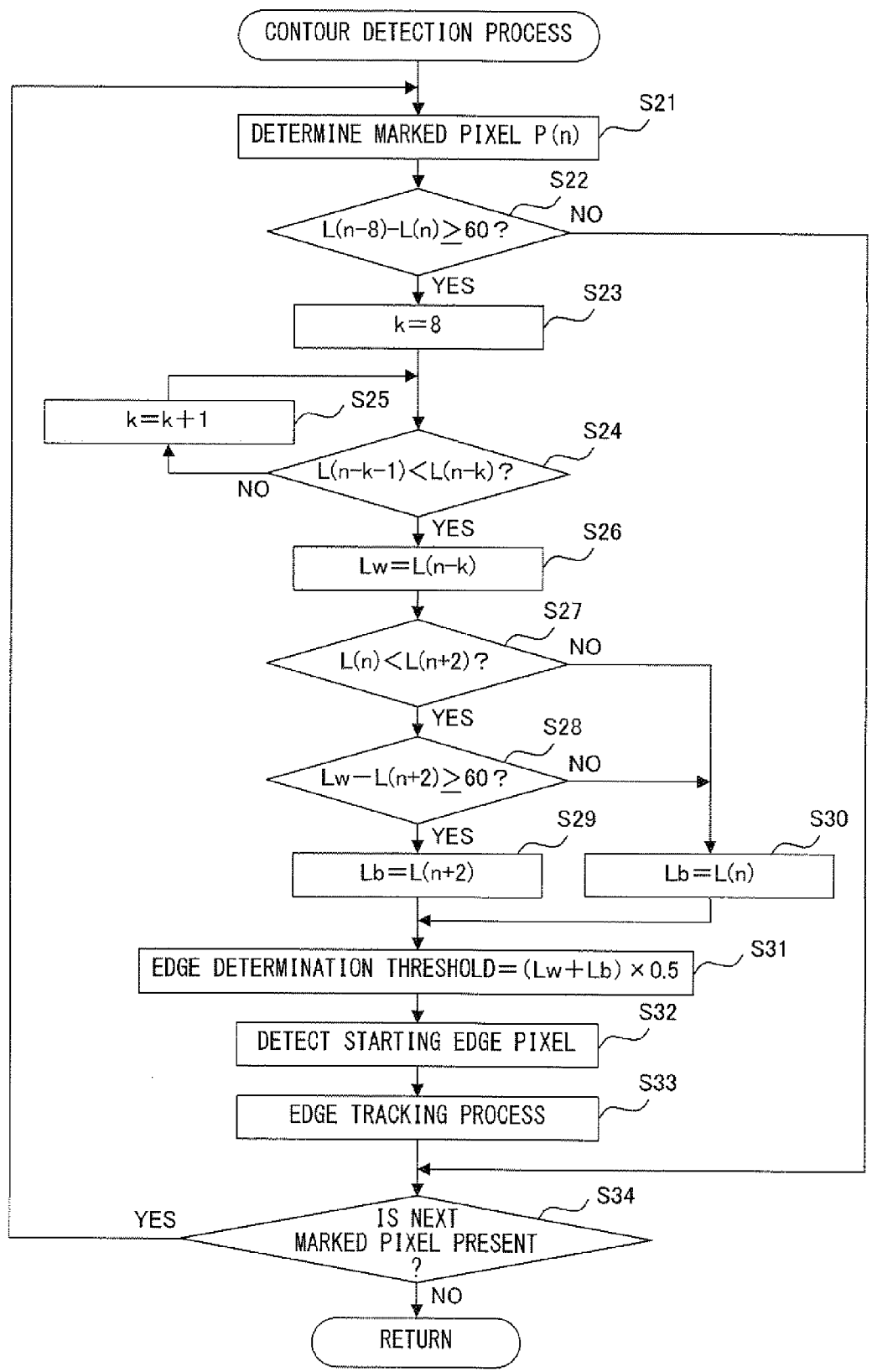
FIG. 75 is a flow chart showing the flow of a contour detection process.

Next, with reference to FIG. 75, a description is given of the flow of the contour detection process performed by the CPU 311 on the basis of the image recognition program.

In step S21, the CPU 311 determines the marked pixel P(n).

In step S22, the CPU 311 determines whether or not L(n−8)−L(n) is 60 or greater. When L(n−8)−L(n) is 60 or greater, the processing proceeds to step S23. If not, the processing proceeds to step S34.

In step S23, the CPU 311 assigns 8 to a variable k as an initial value.

In step S24, the CPU 311 determines whether or not L(n−k−1) is smaller than L(n−k). When L(n−k−1) is smaller than L(n−k), the processing proceeds to step S25. If not, the processing proceeds to step S26.

In step S25, the CPU 311 increments the variable k.

In step S26, the CPU 311 determines that L(n−k) is the white area luminance value Lw.

In step S27, the CPU 311 determines whether or not L(n) is smaller than L(n+2). When L(n) is smaller than L(n+2), the processing proceeds to step S28. If not, the processing proceeds to step S30.

In step S28, the CPU 311 determines whether or not Lw−L(n+2) is 60 or greater. When Lw−L(n+2) is 60 or greater, the processing proceeds to step S29. If not, the processing proceeds to step S30.

In step S29, the CPU 311 determines that L(n+2) is the black area luminance value Lb.

In step S30, the CPU 311 determines that L(n) is the black area luminance value Lb.

In step S31, the CPU 311 determines that the average value of w and Lb is the edge determination threshold.

In step S32, the CPU 311 detects the starting edge pixel on the basis of the edge determination threshold. The coordinates of the starting edge pixel are stored in the main memory 32 as edge pixel information.

In step S33, the CPU 311 performs the edge tracking process of sequentially tracking adjacent edge pixels such that the starting point is the starting edge pixel. The coordinates of the edge pixels sequentially detected in the edge tracking process are sequentially stored in the main memory 32 as edge pixel information.

In step S34, the CPU 311 determines whether or not a next marked pixel is present. When a next marked pixel is present, the processing returns to step S21. If not (i.e., when the processes on all the marked pixel candidates in the captured real image are completed), the contour detection process is ended.

Figure 76:
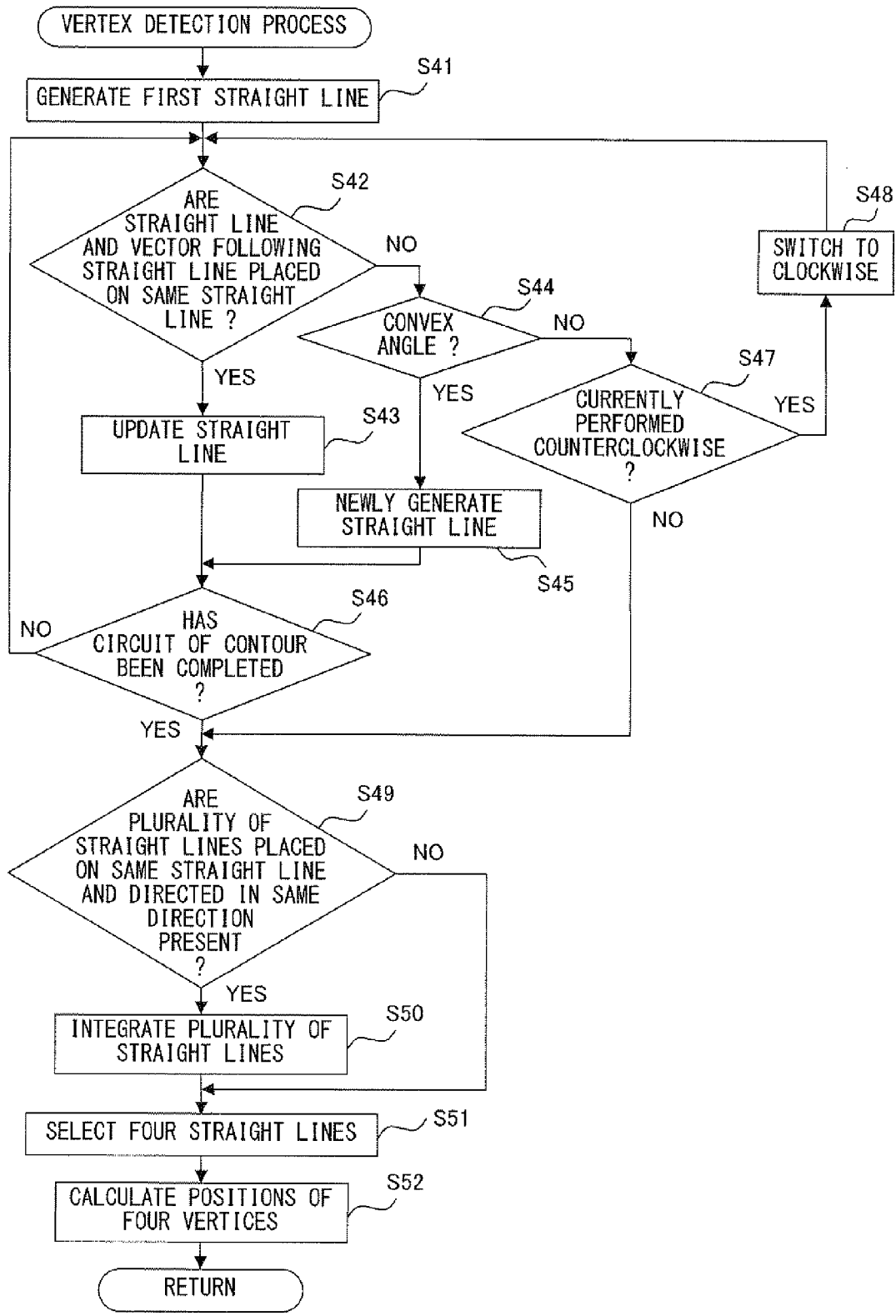
FIG. 76 is a flow chart showing the flow of a vertex detection process.

Next, with reference to FIG. 76, a description is given of the flow of the vertex detection process performed by the CPU 311 on the basis of the image recognition program.

In step S41, the CPU 311 generates a first straight line (i.e., a straight line Li(0-5) corresponding to a vector V(0-5) connecting from a starting edge pixel Pe(0) to an edge pixel Pe(5)), and stores data indicating the straight line in the main memory 32.

In step S42, the CPU 311 determines whether or not the generated straight line and a vector following the straight line are placed on the same straight line, the determination made on the basis of the angle of the vector with respect to the straight line (see FIG. 24). When it is determined that the straight line and the vector are placed on the same straight line, the processing proceeds to step S43. If not, the processing proceeds to step S44.

In step S43, the CPU 311 updates the straight line. Specifically, on the basis of sample edge pixels included from the rear end of the straight line to the head of the vector, the CPU 311 calculates the straight line by a least squares method, and updates the straight line in accordance with the calculation result (i.e., updates the data indicating the straight line stored in the main memory 32).

In step S44, on the basis of the angle of the vector with respect to the straight line, the CPU 311 determines whether or not the black area has a convex angle at the intersection of the straight line and the vector following the straight line (see FIG. 24). When it is determined that the black area has a convex angle, the processing proceeds to step S45. If not, the processing proceeds to step S47.

In step S45, the CPU 311 newly generates a straight line corresponding to the vector, and newly stores data indicating the newly generated straight line in the main memory 32.

In step S46, the CPU 311 determines whether or not a circuit of the contour of the black area has been completed (i.e., the detection has returned to the starting edge pixel). When a circuit has been completed, the processing proceeds to step S49. If not, the processing returns to step S42.

In step S47, the CPU 311 determines whether or not the straight line calculation process (i.e., the processes of steps S42 through S46) is being performed counterclockwise. When the straight line calculation process is being performed counterclockwise, the processing proceeds to step S48. If not, the processing proceeds to step S49. It should be noted that in the present embodiment, the straight line calculation process is started counterclockwise first.

In step S48, the CPU 311 switches the straight line calculation process from counterclockwise to clockwise.

In step S49, on the basis of data representing the plurality of straight lines stored in the main memory 32, the CPU 311 determines whether or not, among the plurality of straight lines, a plurality of straight lines placed on the same straight line and directed in the same direction are present. When a plurality of straight lines placed on the same straight line and directed in the same direction are present, the processing proceeds to step S50. If not, the processing proceeds to step S51.

In step S50, the CPU 311 integrates the plurality of straight lines placed on the same straight line and directed in the same direction into one straight line, and updates the data concerning the plurality of straight lines stored in the main memory 32.

In step S51, on the basis of the data concerning the plurality of straight lines stored in the main memory 32, the CPU 311 selects four straight lines from among the plurality of straight lines. Specifically, the CPU 311 calculates the length of each straight line, and selects the longest straight line, the second longest straight line, the third longest straight line, and the fourth longest straight line.

In step S52, the CPU 311 calculates the positions of the four vertices of the black area by calculating the positions of the intersections of the four straight lines. Then, the CPU 311 stores the positions of the four vertices in the main memory 32, and ends the vertex detection process.

Figure 77:
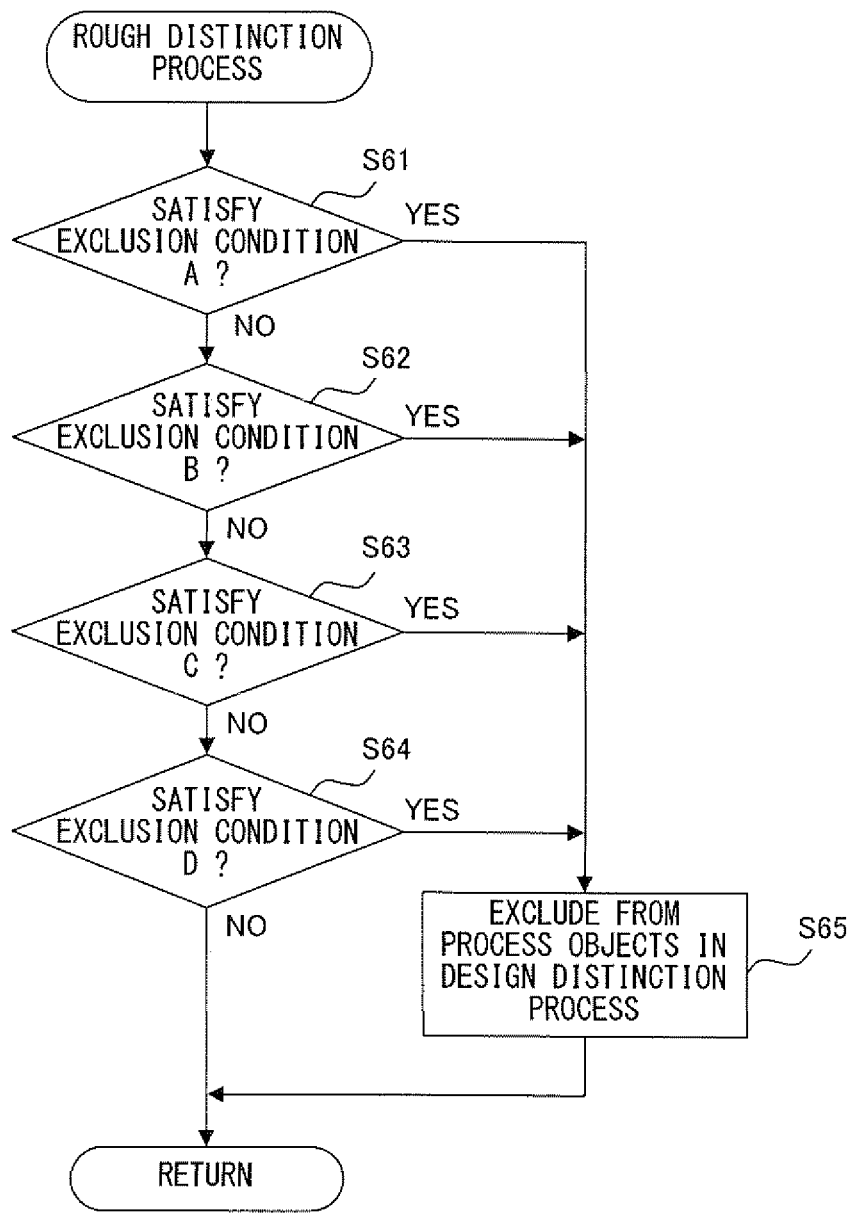
FIG. 77 is a flow chart showing the flow of the rough distinction process.

Next, with reference to FIG. 77, a description is given of the flow of the rough distinction process performed by the CPU 311 on the basis of the image recognition program.

In step S61, the CPU 311 determines whether or not the four vertices detected in the vertex detection process satisfy the exclusion condition A. The exclusion condition A is, as described above, the case where the distance between any two adjacent vertices is too small. When the exclusion condition A is satisfied, the processing proceeds to step S65. If not, the processing proceeds to step S62.

In step S62, the CPU 311 determines whether or not the four vertices detected in the vertex detection process satisfy the exclusion condition B. The exclusion condition B is, as described above, the case where the distance between any vertex and either one of the two sides not adjacent to the vertex is too small. When the exclusion condition B is satisfied, the processing proceeds to step S65. If not, the processing proceeds to step S63.

In step S63, the CPU 311 determines whether or not the four vertices detected in the vertex detection process satisfy the exclusion condition C. The exclusion condition C is, as described above, the case where the straight lines of any two opposing sides are directed in generally the same direction. When the exclusion condition C is satisfied, the processing proceeds to step S65. If not, the processing proceeds to step S64.

In step S64, the CPU 311 determines whether or not the four vertices detected in the vertex detection process satisfy the exclusion condition D. The exclusion condition D is, as described above, the case where a concave angle is included. When the exclusion condition D is satisfied, the processing proceeds to step S65. If not, the rough distinction process is ended.

In step S65, the CPU 311 excludes the four vertices detected in the vertex detection process from process objects in the design distinction process (e.g., deletes data concerning the four vertices from the main memory 32). Then, the rough distinction process is ended.

Figure 78:
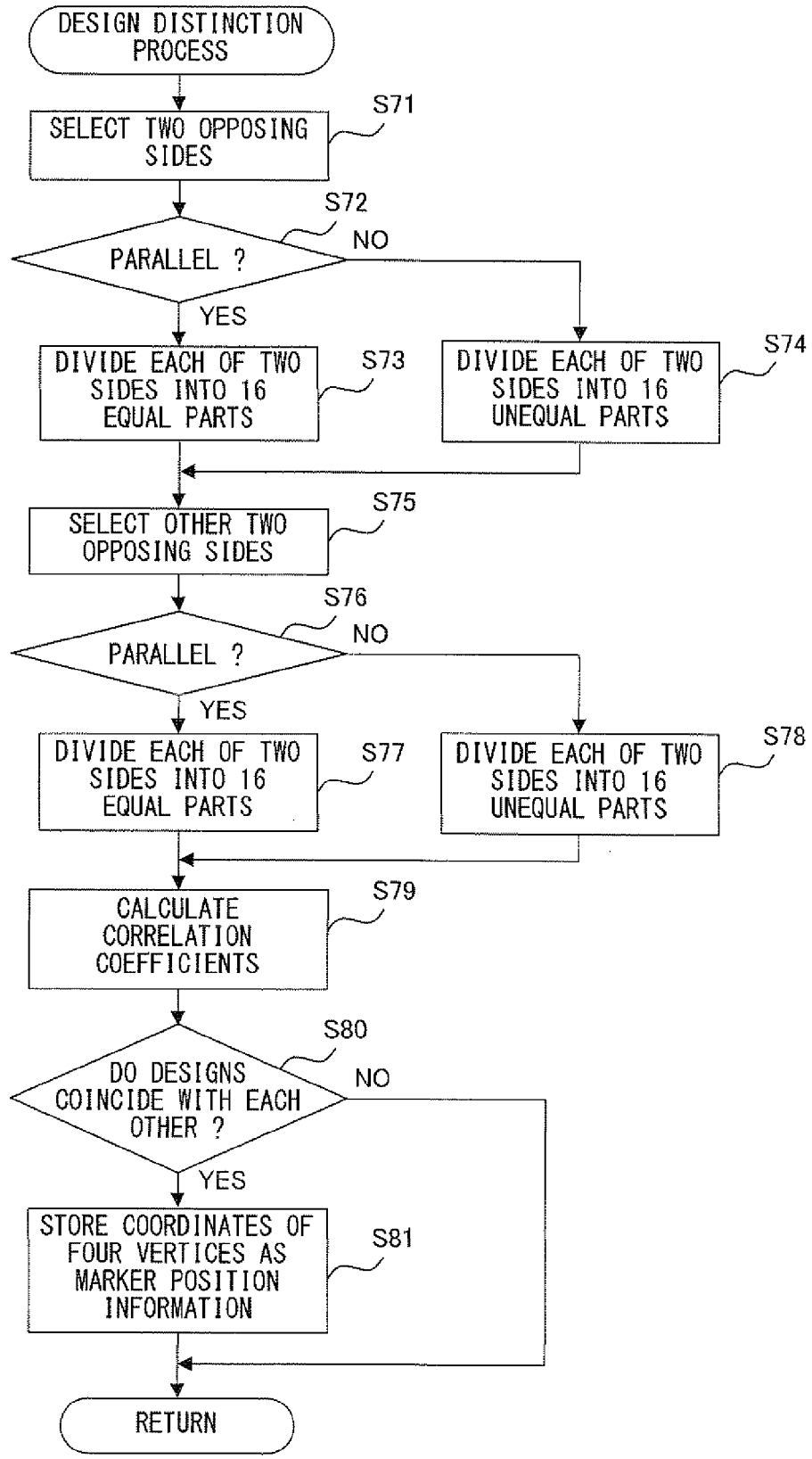
FIG. 78 is a flow chart showing the flow of the design distinction process.

Next, with reference to FIG. 78, a description is given of the flow of the design distinction process performed by the CPU 311 on the basis of the image recognition program.

In step S71, the CPU 311 selects any two opposing sides from among the four sides of the rectangle surrounded by the four vertices detected in the vertex detection process.

In step S72, the CPU 311 determines whether or not the two sides selected in step S71 are parallel (including the case where they are generally parallel) to each other. When the two sides are parallel to each other, the processing proceeds to step S73. If not, the processing proceeds to step S74.

In step S73, the CPU 311 divides each of the two sides selected in step S71 into 16 equal parts.

In step S74, the CPU 311 divides each of the two sides selected in step S71 into 16 unequal parts (e.g., by the method shown in FIGS. 53 through 55).

In step S75, the CPU 311 selects the two opposing sides that have not been selected in step S71, from among the four sides of the rectangle surrounded by the four vertices detected in the vertex detection process.

In step S76, the CPU 311 determines whether or not the two sides selected in step S75 are parallel (including the case where there are generally parallel) to each other. When the two sides are parallel to each other, the processing proceeds to step S77. If not, the processing proceeds to step S78.

In step S77, the CPU 311 divides each of the two sides selected in step S75 into 16 equal parts.

In step S78, the CPU 311 divides each of the two sides selected in step S75 into 16 unequal parts (e.g., by the method shown in FIGS. 53 through 55).

In step S79, on the basis of the pixel values of the sample points determined by dividing the four sides of the rectangle surrounded by the four vertices detected in the vertex detection process and the basis of the pixel values of the sample points defined in the pattern definition data, the CPU 311 calculates correlation coefficients representing the degrees of similarity between the pixel values.

In step S80, on the basis of the correlation coefficients calculated in step S79, the CPU 311 determines whether or not the design displayed in the area surrounded by the four vertices detected in the vertex detection process coincides with the design of the marker 50. When the designs coincide with each other, the processing proceeds to step S81. If not, the design distinction process is ended.

In step S81, the CPU 311 stores, as marker position information in the main memory 32, the coordinates of the four vertices (the upper left vertex, the lower left vertex, the lower right vertex, and the upper right vertex) of the marker 50 in the captured real image.

Figure 79:
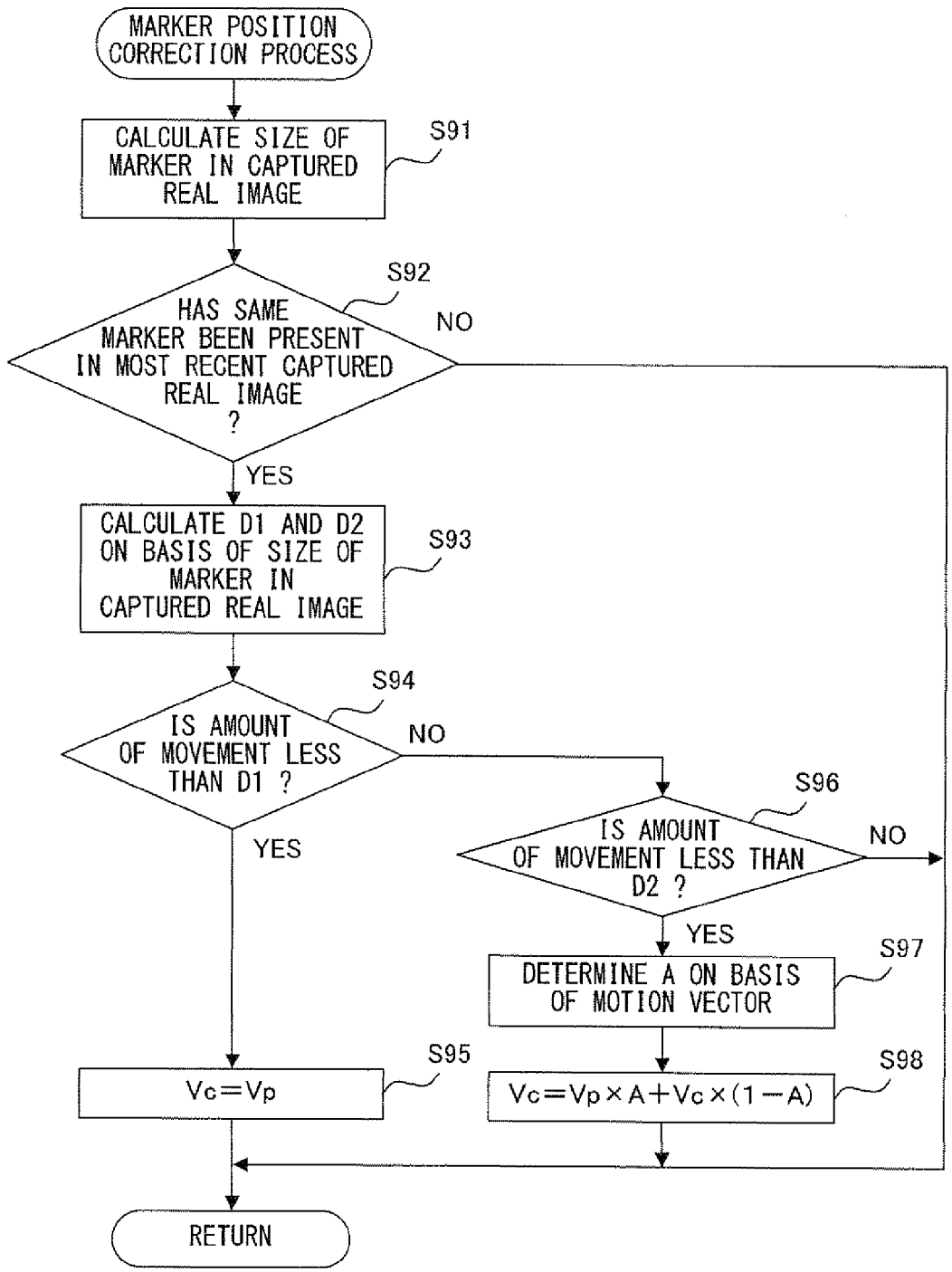
FIG. 79 is a flow chart showing the flow of the marker position correction process.

Next, with reference to FIG. 79, a description is given of the flow of the marker position correction process performed by the CPU 311 on the basis of the image recognition program.

In step S91, the CPU 311 calculates the size of the marker 50 in the captured real image, and stores the calculation result in the main memory 32.

In step S92, the CPU 311 determines whether or not the same marker as that detected from the current captured real image has been present in the most recent captured real image. When the same marker has been present, the processing proceeds to step S93. If not, the marker position correction process is ended (i.e., the position of the marker detected from the current captured real image is used as it is without being corrected). It should be noted that the determination of whether or not the same marker as that detected from the current captured real image has been present in the most recent captured real image can be made, for example, on the basis of the size of the marker 50 calculated in step S91 and by the method as described with reference to FIG. 72.

In step S93, on the basis of the size of the marker 50 calculated in step S91, the CPU 311 calculates the thresholds D1 and D2 (FIGS. 68 and 69), and stores the calculated thresholds D1 and D2 in the main memory 32.

In step S94, the CPU 311 determines whether or not the amount of movement of the marker 50 is less than D1. When the amount of movement of the marker 50 is less than D1, the processing proceeds to step S95. If not, the processing proceeds to step S96.

In step S95, the CPU 311 corrects the position of the marker 50 detected in the design distinction process to the position of the marker that has been previously detected. Then, the marker position correction process is ended.

In step S96, the CPU 311 determines whether or not the amount of movement of the marker 50 is less than D2. When the amount of movement of the marker 50 is less than D2, the processing proceeds to step S97. If not, the marker position correction process is ended (i.e., the position of the marker detected from the current captured real image is used as it is without being corrected).

In step S97, the CPU 311 calculates the motion vector of the marker 50, and determines the predetermined value A on the basis of the motion vector and a motion vector calculated in the past. Specifically, on the basis of these motion vectors, the CPU 311 determines whether or not the marker 50 is continuously moving in a constant direction in the captured real image. When the marker 50 is continuously moving in a constant direction, the value of A is increased. If not, the value of A is decreased. The motion vector calculated in this process is stored in the main memory 32 as the motion vector information 81.

In step S98, the CPU 311 corrects the position of the marker 50 to the points internally dividing, in a ratio of (1−A):A, the line segments connecting the position of the marker 50 in the most recent captured real image to the position of the marker 50 in the current captured real image. Then, the marker position correction process is ended.

(Variations)

It should be noted that in the above embodiment, specific processing methods are described for: (1) the contour detection process; (2) the vertex detection process; (3) the rough distinction process; (4) the design distinction process; and (5) the marker position correction process. Alternatively, one or more of these processes may be replaced with known techniques.

In addition, an image serving as a process object of the image recognition process is not limited to captured real images sequentially acquired in real time from the camera. Alternatively, for example, the image may be an image captured by the camera in the past and stored in the data storage internal memory 35 or the like, or may be an image received from another device, or may be an image acquired through an external storage medium.

In addition, a recognition object of the image recognition process is not limited to the black area of the marker 50. The recognition object may be a given object (e.g., a person's face or hand), or a given design, included in an image.

In addition, the result of the image recognition process can be used not only in AR technology, but also in another given application.

In addition, in the present embodiment, image processing (the image recognition process and the image generation process) is performed by the game apparatus 10; however, the present invention is not limited to this. Alternatively, image processing may be performed by a given information processing apparatus (or a given information processing system) such as a stationary game apparatus, a personal computer, and a mobile phone.

In addition, in the present embodiment, the image processing is performed by one game apparatus 10. Alternatively, in another embodiment, the image processing may be performed by a plurality of information processing apparatuses capable of communicating with one another in a shared manner.

In addition, in the present embodiment, the image recognition program and the like are performed by one CPU 311. Alternatively, in another embodiment, the image recognition program and the like may be performed by a plurality of CPUs 311 in a shared manner.

In addition, in the present embodiment, the image processing is performed by the CPU 311 on the basis of the image recognition program and the like. Alternatively, in another embodiment, part of the image processing may be achieved by hardware, instead of the CPU 311.

In addition, in the above embodiment, a captured real image captured by the camera is combined with a virtual space image, and the combined image is displayed on the upper LCD 22 (a video see-through method). Alternatively, instead of the video see-through method, an optical see-through method may be employed in which a virtual object is displayed on a transmissive display screen so that a user views an image as if the virtual object actually exists in a real world that is visible through the transmissive display screen.

While the invention has been described in detail, the foregoing description is in all aspects illustrative and not restrictive. It will be understood that numerous other modifications and variations can be devised without departing from the scope of the invention.

What is claimed is:

1. A non-transitory computer-readable storage medium having stored thereon an image recognition program which, when executed by a computer of an information processing apparatus, causes the computer to perform operations comprising:

sequentially acquiring images;

sequentially detecting a contour or vertices from the sequentially acquired images;

determining whether or not a contour or vertices are detected from an image of the sequentially acquired images;

when the determining determines that a contour or vertices are detected from the image, performing a pattern matching process on an area, in the image, surrounded by the contour or the vertices detected from the image, to determine whether or not an object or a design is present in the area;

when the pattern matching determines that the object or the design is present in the area, storing, in a storage area, detection position information indicating a position related to the area; and when the determining determines that no contour or vertices are detected from the image, performing a pattern matching process on the image on the basis of detection position information previously stored in the storage area, to determine whether or not, in the image, the object or the design is present in an area corresponding to the detection position information previously stored in the storage area.

2. The non-transitory computer-readable storage medium according to claim 1, wherein when the determining determines that no contour or vertices are detected from the image, performing a pattern matching process on the image on the basis of the detection position information previously stored in the storage area on the basis of another image, from the sequentially acquired images, acquired immediately before the image.

3. The non-transitory computer-readable storage medium according to claim 1, wherein when the determining determines that no contour or vertices are detected from the image, performing a pattern matching process on the image by, in addition to the detection position information previously stored in the storage area, shifting a position indicated by the detection position information previously stored in the storage area.

4. The non-transitory computer-readable storage medium according to claim 1, the image recognition program further causing the computer to perform operations comprising:

on the basis of the detection position information stored in the storage area, setting a virtual camera placed in a virtual space; and displaying on a display device a virtual space image obtained by capturing the virtual space with the virtual camera.

5. An image recognition apparatus comprising:

at least one processor configured to perform operations comprising:

sequentially acquiring images;

sequentially detecting a contour or vertices from the sequentially acquired images;

determining whether or not a contour or vertices are detected from an image of the sequentially acquired images;

when the determining determines that a contour or vertices are detected from the image, performing a pattern matching process on an area, in the image, surrounded by the contour or the vertices detected from the image, to determine whether or not an object or a design is present in the area;

when the pattern matching determines that the object or the design is present in the area, storing, in a storage area, detection position information indicating a position related to the area; and when the determining determines that no contour or vertices are detected from the image, performing a pattern matching process on the image on the basis of detection position information previously stored in the storage area, to determine whether or not, in the image, the object or the design is present in an area corresponding to the detection position information previously stored in the storage area.

6. An image recognition method comprising:

sequentially acquiring images;

sequentially detecting a contour or vertices from the sequentially acquired images;

determining whether or not a contour or vertices are detected from an image of the sequentially detected images;

when the determining determines that a contour or vertices are detected from the image, performing a pattern matching process on an area, in the image, surrounded by the contour or the vertices detected from the image, to determine whether or not an object or a design is present in the area;

when the pattern matching determines that the object or the design is present in the area, storing, in a storage area, detection position information indicating a position related to the area; and when the determining determines that no contour or vertices are detected from the image, performing a pattern matching process on the image on the basis of detection position information previously stored in the storage area, to determine whether or not, in the image, the object or the design is present in an area corresponding to the detection position information previously stored in the storage area.

7. An image recognition system comprising:

a camera; and at least one processor configured to perform operations comprising:

sequentially acquiring images from the camera;

sequentially detecting a contour or vertices from the sequentially acquired images;

determining whether or not a contour or vertices are detected from an image of the sequentially acquired images;

when the determining determines that a contour or vertices are detected from the image, performing a pattern matching process on an area, in the image, surrounded by the contour or the vertices detected from the image, to determine whether or not an object or a design is present in the area;

when the pattern matching determines that the object or the design is present in the area, storing, in a storage area, detection position information indicating a position related to the area; and when the determining determines that no contour or vertices are detected from the image, performing a pattern matching process on the image on the basis of detection position information previously stored in the storage area, to determine whether or not, in the image, the object or the design is present in an area corresponding to the detection position information previously stored in the storage area.

8. An image recognition system including an image recognition apparatus and a marker in which a design is drawn, the image recognition apparatus comprising:

a capturing section for capturing the marker; and at least one processor configured to perform operations comprising:

sequentially acquiring images from the capturing section;
sequentially detecting a contour or vertices of the marker or of the design from the sequentially acquired images;
determining whether or not the contour or the vertices are detected from an image of the sequentially acquired images;
when the determining determines that the contour or the vertices are detected from the image, performing a pattern matching process on an area, in the image, surrounded by the contour or the vertices, to determine whether or not the marker or the design is present in the area;
when the pattern matching determines that the marker or the design is present in the area, storing, in a storage area, detection position information indicating a position related to the area; and
when the determining determines that no contour or vertices are detected from the image, performing a pattern matching process on the image on the basis of detection position information previously stored in the storage area, to determine whether or not, in the image, the marker or the design is present in an area corresponding to the detection position information previously stored in the storage area.

9. The image recognition apparatus according to claim 5, wherein
when the determining determines that no contour or vertices are detected from the image, performing a pattern matching process on the image on the basis of the detection position information previously stored in the storage area on the basis of another image, from the sequentially acquired images, acquired immediately before the image.

10. The image recognition apparatus according to claim 5, wherein
when the determining determines that no contour or vertices are detected from the image, performing a pattern matching process on the image by, in addition to the detection position information previously stored in the storage area, shifting a position indicated by the detection position information previously stored in the storage area.

11. The image recognition apparatus according to claim 5, wherein the at least one processor is further configured to:
on the basis of the detection position information stored in the storage area, set a virtual camera placed in a virtual space; and
display on a display device a virtual space image obtained by capturing the virtual space with the virtual camera.

12. The image recognition method according to claim 6, wherein
when the determining determines that no contour or vertices are detected from the image, performing a pattern matching process on the image on the basis of the detection position information previously stored in the storage area on the basis of another image, from the sequentially acquired images, acquired immediately before the image.

13. The image recognition method according to claim 6, wherein
when the determining determines that no contour or vertices are detected from the image, performing a pattern matching process on the image by, in addition to the detection position information previously stored in the storage area, shifting a position indicated by the detection position information previously stored in the storage area.

14. The image recognition method according to claim 6, further comprising:
on the basis of the detection position information stored in the storage area, setting a virtual camera placed in a virtual space; and
displaying on a display device a virtual space image obtained by capturing the virtual space with the virtual camera.

15. The image recognition system according to claim 7, wherein
when the determining determines that no contour or vertices are detected from the image, performing a pattern matching process on the image on the basis of the detection position information previously stored in the storage area on the basis of another image, from the sequentially acquired images, acquired immediately before the image.

16. The image recognition system according to claim 7, wherein
when the determining determines that no contour or vertices are detected from the image, performing a pattern matching process on the image by, in addition to the detection position information previously stored in the storage area, shifting a position indicated by the detection position information previously stored in the storage area.

17. The image recognition system according to claim 7, wherein the at least one processor is further configured to:
on the basis of the detection position information stored in the storage area, set a virtual camera placed in a virtual space; and
display on a display device a virtual space image obtained by capturing the virtual space with the virtual camera.

18. The image recognition system according to claim 8, wherein
when the determining determines that no contour or vertices are detected from the image, performing a pattern matching process on the image on the basis of the detection position information previously stored in the storage area on the basis of another image, from the sequentially acquired images, acquired immediately before the image.

19. The image recognition system according to claim 8, wherein
when the determining determines that no contour or vertices are detected from the image, performing a pattern matching process on the image by, in addition to the detection position information previously stored in the storage area, shifting a position indicated by the detection position information previously stored in the storage area.

20. The image recognition system according to claim 8, wherein the at least one processor is further configured to:
on the basis of the detection position information stored in the storage area, set a virtual camera placed in a virtual space; and
display on a display device a virtual space image obtained by capturing the virtual space with the virtual camera.

* * * * *